(12) United States Patent
Garrod et al.

(10) Patent No.: US 11,138,334 B1
(45) Date of Patent: Oct. 5, 2021

(54) USE OF ASR CONFIDENCE TO IMPROVE RELIABILITY OF AUTOMATIC AUDIO REDACTION

(71) Applicant: MEDALLIA, INC., San Francisco, CA (US)

(72) Inventors: David Garrod, Pittsburgh, PA (US); Jay R. Pascarella, Cranberry Township, PA (US)

(73) Assignee: Medallia, Inc., San Francisco, CA (US)

(*) Notice: Subject to any disclaimer, the term of this patent is extended or adjusted under 35 U.S.C. 154(b) by 287 days.

(21) Appl. No.: 16/162,997

(22) Filed: Oct. 17, 2018

(51) Int. Cl.
*G06F 21/62* (2013.01)
*G10L 15/02* (2006.01)
*G10L 25/78* (2013.01)

(52) U.S. Cl.
CPC .......... *G06F 21/6245* (2013.01); *G10L 15/02* (2013.01); *G10L 25/78* (2013.01); *G10L 2015/025* (2013.01)

(58) Field of Classification Search
CPC ............. G06F 21/6218; G06F 21/6245; G06F 21/6254; G06F 2221/2107; G06F 2221/2125; G10L 25/48; G10L 25/51; G10L 25/78; G10L 2025/783; G10L 15/02; G10L 2015/025
See application file for complete search history.

(56) References Cited

U.S. PATENT DOCUMENTS

| | | | | |
|---|---|---|---|---|
| 5,276,629 A * | 1/1994 | Reynolds | ........... | G06K 9/00536 324/76.13 |
| 7,774,202 B2 * | 8/2010 | Spengler | ................. | G10L 15/22 704/236 |
| 7,974,843 B2 * | 7/2011 | Schneider | ............. | G10L 15/005 704/254 |
| 8,898,058 B2 * | 11/2014 | Shin | ........................ | G10L 25/78 704/208 |
| 8,954,332 B2 * | 2/2015 | Lee | ....................... | H04L 9/3231 704/273 |
| 9,190,061 B1 * | 11/2015 | Shemer | ................... | G10L 25/78 |
| 9,218,806 B1 * | 12/2015 | Salvador | ................ | G10L 15/02 |

(Continued)

OTHER PUBLICATIONS

Frank Wessel aus Mönchengladbach; https://www-i6.informatik.rwth-aachen.de/publications/download/521/WesselF.--WordPosteriorProbabilitiesforLargeVocabularyContinuousSpeechRecognition-2002.pdf; hereinafter Frank (Year: 2002).*

*Primary Examiner* — Minh Dinh

(57) ABSTRACT

A method includes removing sensitive information from an audio recording. The method includes receiving a digitally encoded audio recording; transcoding, if necessary, the audio recording to a pre-defined audio format; identifying periods of voice in/activity in the audio recording; segregating the audio recording into a sequence of separated utterances or words; streaming the sequence of separated utterances or words to an ASR server; receiving, for each streamed utterance or word, an associated ASR decoding; receiving, for each ASR decoding, an associated confidence score indicative of a probability that the associated ASR decoding is correct; identifying for redaction; any ASR decoding that contains sensitive information, and any ASR decoding with a confidence score less than a redaction threshold; and preparing a redacted audio recording by eliminating or masking those word(s) and/or utterance(s) for which an associated ASR decoding was identified for redaction.

21 Claims, 54 Drawing Sheets

(56) References Cited

U.S. PATENT DOCUMENTS

| | | | | |
|---|---|---|---|---|
| 9,413,891 B2* | 8/2016 | Dwyer | | G10L 15/30 |
| 9,437,207 B2* | 9/2016 | Jacob | | G10L 15/02 |
| 9,514,741 B2* | 12/2016 | Jost | | G10L 15/06 |
| 9,544,438 B1* | 1/2017 | Andraszek | | G10L 21/06 |
| 9,641,676 B1* | 5/2017 | Mandic | | H04M 3/42221 |
| 10,002,639 B1* | 6/2018 | Gaeta | | G10L 15/02 |
| 10,074,361 B2* | 9/2018 | Song | | G10L 15/16 |
| 10,147,428 B1* | 12/2018 | Shastry | | G10L 15/04 |
| 10,332,508 B1* | 6/2019 | Hoffmeister | | G06N 3/084 |
| 10,332,517 B1* | 6/2019 | Wang | | G06F 3/167 |
| 10,468,026 B1* | 11/2019 | Newman | | G10L 15/04 |
| 10,529,328 B2* | 1/2020 | Singh | | G10L 15/04 |
| 10,529,336 B1* | 1/2020 | Matthews | | G06F 16/635 |
| 10,565,985 B1* | 2/2020 | Huang | | G06F 21/60 |
| 10,747,894 B1* | 8/2020 | Cline | | G06F 21/6254 |
| 2004/0128130 A1* | 7/2004 | Rose | | G10L 19/06 |
| | | | | 704/236 |
| 2004/0215449 A1* | 10/2004 | Roy | | G10L 15/08 |
| | | | | 704/211 |
| 2006/0020462 A1* | 1/2006 | Reich | | G10L 15/187 |
| | | | | 704/254 |
| 2006/0020463 A1* | 1/2006 | Reich | | G10L 15/187 |
| | | | | 704/257 |
| 2006/0075228 A1* | 4/2006 | Black | | H04L 63/104 |
| | | | | 713/167 |
| 2006/0259983 A1* | 11/2006 | Sperry | | H04L 9/3234 |
| | | | | 726/28 |
| 2007/0088552 A1* | 4/2007 | Olsen | | G10L 15/08 |
| | | | | 704/256.2 |
| 2008/0159560 A1* | 7/2008 | Song | | G10L 25/78 |
| | | | | 381/94.1 |
| 2008/0221882 A1* | 9/2008 | Bundock | | G10L 15/26 |
| | | | | 704/235 |
| 2012/0310646 A1* | 12/2012 | Hu | | G10L 15/02 |
| | | | | 704/238 |
| 2013/0266127 A1* | 10/2013 | Schachter | | H04M 3/5175 |
| | | | | 379/88.01 |
| 2013/0339028 A1* | 12/2013 | Rosner | | H04R 29/004 |
| | | | | 704/275 |
| 2014/0129222 A1* | 5/2014 | Okamoto | | G10L 15/02 |
| | | | | 704/243 |
| 2014/0278366 A1* | 9/2014 | Jacob | | G10L 15/26 |
| | | | | 704/9 |
| 2014/0278426 A1* | 9/2014 | Jost | | G10L 15/06 |
| | | | | 704/257 |
| 2015/0058013 A1* | 2/2015 | Pakhomov | | G10L 25/48 |
| | | | | 704/243 |
| 2015/0161998 A1* | 6/2015 | Park | | G10L 25/78 |
| | | | | 704/231 |
| 2015/0195406 A1* | 7/2015 | Dwyer | | G10L 15/26 |
| | | | | 379/265.07 |
| 2015/0265206 A1* | 9/2015 | Sheinkopf | | A61B 5/4803 |
| | | | | 600/586 |
| 2015/0278449 A1* | 10/2015 | La Borde | | G16H 40/63 |
| | | | | 705/3 |
| 2015/0309987 A1* | 10/2015 | Epstein | | G06F 40/279 |
| | | | | 704/9 |
| 2016/0049164 A1* | 2/2016 | Nelson | | G10L 15/02 |
| | | | | 704/240 |
| 2016/0063990 A1* | 3/2016 | Nelson | | G10L 15/02 |
| | | | | 704/240 |
| 2016/0240188 A1* | 8/2016 | Seto | | G06F 40/242 |
| 2016/0379639 A1* | 12/2016 | Weinstein | | G06F 21/6254 |
| | | | | 704/235 |
| 2017/0011233 A1* | 1/2017 | Xue | | G06F 40/30 |
| 2017/0147829 A1* | 5/2017 | Cismas | | G06F 21/6218 |
| 2017/0301346 A1* | 10/2017 | Selfridge | | G10L 15/197 |
| 2018/0158449 A1* | 6/2018 | Tang | | G10L 13/04 |
| 2018/0261307 A1* | 9/2018 | Couse | | G16H 80/00 |
| 2018/0350395 A1* | 12/2018 | Simko | | G10L 15/065 |
| 2019/0005952 A1* | 1/2019 | Kruse | | G10L 25/51 |
| 2019/0013038 A1* | 1/2019 | Thomson | | H04L 63/0407 |
| 2019/0043506 A1* | 2/2019 | Rivkin | | G06N 5/003 |
| 2019/0104124 A1* | 4/2019 | Buford | | G10L 13/00 |
| 2019/0138661 A1* | 5/2019 | Paltanavicius | | G10L 15/08 |
| 2019/0147905 A1* | 5/2019 | Mai | | G06F 3/16 |
| | | | | 704/275 |
| 2019/0348065 A1* | 11/2019 | Talwar | | G10L 15/22 |
| 2019/0348066 A1* | 11/2019 | Funakoshi | | G10L 21/06 |
| 2019/0371328 A1* | 12/2019 | Wang | | G06F 21/64 |
| 2020/0014541 A1* | 1/2020 | Streit | | H04L 63/0428 |
| 2020/0020340 A1* | 1/2020 | Sheikh | | G06F 3/165 |
| 2020/0044852 A1* | 2/2020 | Streit | | G06F 21/6245 |
| 2020/0057866 A1* | 2/2020 | Levy | | G06F 21/6245 |
| 2020/0065514 A1* | 2/2020 | Keen | | H04W 12/65 |
| 2020/0228336 A1* | 7/2020 | Streit | | G06N 3/04 |

\* cited by examiner

| encoded_audio_data | ASR_decoding | warp_factor(s) |
|---|---|---|
| | | ASR_confidence |
| | sentiment_score | gender_ID |

USE OF ASR CONFIDENCE TO IMPROVE RELIABILITY OF AUTOMATIC AUDIO REDACTION

FIELD OF THE INVENTION

This invention relates generally to the fields of audio/speech data processing, audio/speech data archiving, and audio/speech data analytics. More specifically, the invention relates to improved processes/systems for redacting, masking, or anonymizing sensitive data—such as Personally Identifiable Information (PII), Nonpublic Personal Information (NPI), Personal Health Information (PHI), Sensitive Personal Information (SPI), Personal Credit Information (PCI), etc.—from audio/speech recordings.

BACKGROUND OF THE INVENTION

Automatic speech recognition (ASR) is a well-known and widely available technology. State-of-the-art ASR systems are available from companies such as Nuance Communications, Google, and Voci Technologies. There are also several open source ASR packages, such as Sphinx, HTK, and Kaldi. See https://en.wikipedia.org/wiki/List_of_speech_recognition_software#Open_source_acoustic_models_and_speech_corpus_(compilation).

In ASR, "confidence" represents an estimate of the likelihood that the ASR engine has correctly recognized a given word or utterance. Various approaches are known for estimating ASR confidence. The most common approaches involve comparing the relative ranking(s) of the selected decoding versus the non-selected decoding(s). If the selected decoding was ranked far higher by the recognizer than the alternative(s), then the confidence in its correctness is higher; whereas if the selected decoding was not strongly preferred by the recognizer, then the confidence in its correctness is lower.

Other approaches to estimating ASR confidence are known and available in the prior art. See, L H Jiang, "Confidence measures for speech recognition: a survey," Speech Communication, April 2005 (incorporated by reference herein; copy available at http://www-gth.die.upm.es/research/documentation/referencias/Jang_Confidence.pdf); D J Brems, et al., "Automatic speech recognition (ASR) processing using confidence measures," U.S. Pat. No. 5,566,272 (incorporated by reference herein); D J Litman, et al., "Predicting automatic speech recognition performance using prosodic cues," Proceedings of the 1st North American chapter of the Association for Computational Linguistics conference, 2000 (incorporated by reference herein; copy available at https://aclanthology.info/pdf/A/A00/A00-2029.pdf); P S Huang, et al., "Predicting speech recognition confidence using deep learning with word identity and score features," IEEE International Conference on Acoustics, Speech and Signal Processing, 2013 (incorporated by reference herein; copy available at https://www.microsoft.com/en-us/research/wp-content/uploads/2016/02/ConfidenceEstimator.pdf)

As explained in https://en.wikipedia.org/wiki/Speaker_recognition (downloaded Jun. 11, 2018), Speaker recognition is the identification of a person from characteristics of voices (voice biometrics). It is also called voice recognition. There is a difference between speaker recognition (recognizing who is speaking) and speech recognition (recognizing what is being said). These two terms are frequently confused, and "voice recognition" can be used for both. In addition, there is a difference between the act of authentication (commonly referred to as speaker verification or speaker authentication) and identification. Finally, there is a difference between speaker recognition (recognizing who is speaking) and speaker diarization (recognizing when the same speaker is speaking) . . . .

Speaker recognition has a history dating back some four decades and uses the acoustic features of speech that have been found to differ between individuals. These acoustic patterns reflect both anatomy (e.g., size and shape of the throat and mouth) and learned behavioral patterns (e.g., voice pitch, speaking style). Speaker verification has earned speaker recognition its classification as a "behavioral biometric" . . . .

Speaker recognition is a pattern recognition problem. The various technologies used to process and store voice prints include frequency estimation, hidden Markov models, Gaussian mixture models, pattern matching algorithms, neural networks, matrix representation, Vector Quantization and decision trees. Some systems also use "anti-speaker" techniques, such as cohort models, and world models. Spectral features are predominantly used in representing speaker characteristics.

Technology currently exists that enables voice-based determination of a caller's demographic profile information. One example is the caller's speaking dialect. See, e.g., F Biadsy, "Automatic Dialect and Accent Recognition and its Application to Speech Recognition," Ph.D. Thesis, Columbia Univ., 2011 (incorporated by reference herein; copy available at http://www.cs.columbia.edu/speech/ThesisFiles/fadi_biadsv.pdf); F Biadsy, et al., "Dialect-specific acoustic language modeling and speech recognition," U.S. Pat. Pub. No. 2015/0287405, Oct. 8, 2015 (incorporated by reference herein); G Talwar, et al., "Speech dialect classification for automatic speech recognition," U.S. Pat. Pub. No. 2012/0109649, May 3, 2012 (incorporated by reference herein); and G Choueiter, et al., "An empirical study of automatic accent classification," IEEE ICASSP 2008, pp. 4265-4268 (incorporated by reference herein; copy available at https://groups.csai.mit.edu/ss/publications/2008/ICASSP08_Choueiter_MSR.pdf).

Another example is the caller's gender. See g, Y Hu, et al., "Pitch-based Gender Identification with Two-stage Classification," Security and Communication Networks 5(2):211-225 (2012) (incorporated by reference herein; copy available at http://www.wu.ece.ufl.edu/mypapers/Genderidentification.pdf); H Printz, et al., "Method and Apparatus for Automatically Determining Speaker Characteristics for Speech-Directed Advertising or Other Enhancement of Speech-Controlled Devices or Services," U.S. Pat. Pub. No. 2008/0103761 (incorporated by reference herein); E Fokoue, et al., "Speaker Gender Recognition via MFCCs and SVMs" Rochester Inst. of Tech., 2013 (incorporated by reference herein; copy available at http://scholarworks.rit.edu/article/1749).

Yet another example is the caller's (approximate) age. See, e.g., P Nguyen, et al., "Automatic classification of speaker characteristics," Communications and Electronics (ICCE), 2010 (incorporated by reference herein; copy available at http://fit.hcmup.edu.vn/~haits/Conferences/ICCE%202010/Full%20Papers/SA/Automatic%20Classification%20of%20Speaker%20Characteristics.pdf); H Meinedo, et al., "Age and Gender Detection in the I-DASH Project," ACM Trans. on Speech & Lang. Process., August 2011 (incorporated by reference herein; copy available at http://www.inescid.pt/pt/indicadores/Ficheiros/7554.pdf); O Chen, et al., "Method of recognizing gender or age of a speaker according to speech emotion or arousal," U.S. Pat. No. 9,123,342 (incorporated by reference herein); Y Cao, et al., "Method and apparatus for determining a user age range," U.S. Pat. No. 9,105,053 (incorporated by reference herein).

The term "sentiment analysis," as used herein, refers to the use of natural language processing (NLP), text analysis, and/or computational linguistics to identify, extract, quantify, and/or study affective states and subjective information. Sentiment analysis is traditionally applied to voice-of-the-customer (VoC) materials, such as reviews and survey responses, online and social media, and healthcare materials for applications that range from marketing to customer service to clinical medicine. See e.g., U.S. Pat. No. 7,136,877, "System and method for determining and controlling the impact of text," incorporated herein by reference. Most sentiment analysis systems attempt to classify a sentence (or other text grouping) as "positive," "negative," or "neutral." Others may, instead or in addition, assign emotional state labels—such as "angry," "sad," or "happy"- to the analyzed text. Numerous open source sentiment analysis packages are available, as described in https://en.wikipedia.org/wiki/Sentiment_analysis (incorporated by reference herein). Sentiment analysis is also available as a cloud-based service. See M Sidana, "Top Five Emotion/Sentiment Analysis APIs for understanding user sentiment trends," available at https://medium.com/(@sifium/top-five-emotional-sentiment-analysis-apis-116cd8d42055.

Technology currently exists for redacting (or scrubbing) sensitive information from unstructured text records. See, e.g., L Hirschman, "Hiding in Plain Sight: De-identification of Clinical Narrative," MITRE Corp., Oct. 26, 2015 (incorporated herein by reference; copy available at http://proiects.iq.harvard.edu/files/researchdataaccessandinnovationsymposium/files/hiding_in_plain_sight_lynettehirschman.pdf); see also "MIST: The MITRE Identification Scrubber Toolkit," v. 2.04 (incorporated herein by reference; available at http://mist-deid.sourceforge.net). See also scrubadub, v.1.2.0 (incorporated herein by reference; available at http://scrubadub.readthedocs.io/en/stable/index.html); "De-identifying sensitive data in text content," Google Cloud (incorporated herein by reference; available at https://cloud.google.com/dip/docs/deidentify-sensitive-data).

An important part of the redaction process involves identification of named entities. See, g, Project t3as-redact ("The redaction application uses automatic Named Entity Recognition to highlight names of people, organizations, locations, dates/times/durations and numbers; which are likely targets for redaction.") (incorporated herein by reference; available at https://github.com/NICTA/t3as-redact). Several named entity recognizers—CoreNLP with Corefs; CoreNLP; OpenNLP; and NICTA NER—are available as part of the t3as-redact package. Id. ASR confidence can be used to improve the recognition of named entities in ASR derived transcripts. See K Sudoh, et al., "Incorporating speech recognition confidence into discriminative named entity recognition of speech data," ACL-44: Proceedings of the 21st International Conference on Computational Linguistics and the 44th annual meeting of the Association for Computational Linguistics (incorporated herein by reference; copy available at http://www.aclweb.organthology/P06-1078).

Certain redaction systems permit flexible control over the strictness of the redaction process. See, e.g., D Sanchez, et al., "C-sanitized: a privacy model for document redaction and sanitization," 2014 (incorporated by reference herein; copy available at https://arxiv.org/pdf/1406.4285.pdf; as parameter "∝" is increased from its nominal value of 1, redactions become stricter—thus reducing the likelihood of inadvertently leaving a sensitive entity "C" in the redacted output) and U.S. Pat. No. 8,938,386, "Classification-based redaction in natural language text" (incorporated by reference herein; "For lower values of p, more features will be sanitized and one would expect to see greater privacy with some loss of utility.").

Technology exists to mask the identity of a speaker's voice. See, f. J Qian, et al., "VoiceMask: Anonymize and Sanitize Voice Input on Mobile Devices," Nov. 30, 2017 (incorporated herein by reference; copy available at https://arxiv.org/pdf/1711.11460.pdf), J Qian, et al., "Towards Privacy-Preserving Speech Data Publishing," IEEE INFOCOM, April 2018 (incorporated herein by reference; copy available at https://www.researchgate.net/publication/322993280 Towards_Privacy-Preserving_Speech_Data_Publishing). See also A Raghunathan, "EVALUATION OF INTELLIGIBILITY AND SPEAKER SIMILARITY OF VOICE TRANSFORMATION," M.S. Thesis, Univ. of Kentucky, 2011 (incorporated herein by reference; copy available at http://www.vis.uky.edu/~cheung/doc/thesis-Anusha.pdf); Q Jin, et al., "Speaker de-identification via voice transformation," MIPRO 2014 (incorporated herein by reference; copy available at https://www.researchgate.net/publication/224096965 Speaker de-identification_via_voice_transformation); S He, "Speaker De-identification for Privacy Protection," Loughborough University, September 2016 (incorporated herein by reference; copy available at http://ctoresearch.irdeto.com/materials/shufei_1st_year_report.pdf); C G Mateo, et al., "Voice Conversion Fundamentals for Speaker De-identification Applications," Universida de Vigo, 2016 (incorporated herein by reference; copy available at http://costic1206.uvigo.es/sites/defaut/files/TrainingSchool2016/Presentations/Carmen%20Garc%C3%ADa%20Mateo.pdf).

Technology also exists that permits the transformation of accented speech to a normalized (unaccented) state, or to a different accented state. "In contrast with voice conversion, which seeks to transform utterances from a speaker so they sound as if another speaker had produced them, accent conversion seeks to transform only those features of an utterance that contribute to accent while maintaining those that carry the identity of the speaker." D Felps, et al., "Foreign accent conversion in computer assisted pronunciation training," *Speech Communication* 51 (2009), pp. 920-932, at 922 (incorporated by reference herein; copy available at http://research.cse.tamu.edu/prism/publications/sc09_felps.pdf). See also Q Yan, et al., "Analysis by synthesis of acoustic correlates of British, Australian and American accents," *Proc.* 2004 *IEEE Int. Conf. on Acoustics, Speech, and Signal Processing* (incorporated by reference herein; copy available at https://www.computer.org/csdl/proceedings/icassp/2004/8484/01/01326066.pdf).

While systems that attempt to automatically redact sensitive information from an audio/speech recording currently exist—see, e.g., U.S. Pat. Pub. 2013/0266127A1, "System and method for removing sensitive data from a recording" and U.S. Pat. No. 9,413,891, "Real-time conversational analytics facility," both incorporated by reference herein—such existing systems are fundamentally flawed, in that they essentially presume near-100% accuracy for the pre-redaction ASR decoding. Embodiments of the invention are provided that address this flaw.

SUMMARY OF THE INVENTION

As illustrated and claimed hereinbelow, embodiments of this invention utilize ASR confidence estimation to reduce or eliminate the shortcomings of traditional, automatic audio/speech redaction systems.

Accordingly, generally speaking, and without intending to be limiting, one aspect of the invention relates to automatic, computer-implemented process(es) for automatically removing sensitive information from an audio recording, such process(es) including, for example, the following computer-implemented acts: (1) receiving a digitally encoded audio recording; (2) transcoding, if necessary, the audio recording to a pre-defined audio format; (3) using a voice activity detector to identify periods of voice activity and/or inactivity in the audio recording; (4) using an utterance or word separator to segregate the audio recording into a sequence of separated utterances or words; (5) streaming the sequence of separated utterances or words to an ASR server; (6) receiving, for each streamed utterance or word, an associated ASR decoding; (7) receiving, for each ASR decoding, an associated confidence score indicative of a probability that the associated ASR decoding is correct; (8) identifying for redaction: (a) any ASR decoding that contains sensitive information, and (b) any ASR decoding with a confidence score less than a redaction threshold; and (9) preparing a redacted audio recording by eliminating or masking those word(s) and/or utterance(s) for which an associated ASR decoding was identified for redaction.

In some embodiments, receiving an associated confidence score may involve receiving the confidence score from the ASR server, along with the associated ASR decoding. And in some embodiments, receiving an associated confidence score may involve receiving the confidence score from a classifier that is separate from the ASR server.

In some embodiments, the confidence scores may be derived from normalized likelihood scores. In some embodiments, the confidence scores may be computed using an N-best homogeneity analysis. In some embodiments, the confidence scores may be computed using an acoustic stability analysis. In some embodiments, the confidence scores may be computed using a word graph hypothesis density analysis. In some embodiments, the confidence scores may be derived from associated state, phoneme, or word durations. In some embodiments, the confidence scores may be derived from language model (LM) scores or LM back-off behaviors. In some embodiments, the confidence scores may be computed using a posterior probability analysis. In some embodiments, the confidence scores may be computed using a log-likelihood-ratio analysis. In some embodiments, the confidence scores may be computed using a neural net that includes word identity and aggregated words as predictors.

And in some embodiments, the confidence scores may be computed using a combination of two or more of the above techniques.

Identifying an ASR decoding that contains sensitive information may involve one or more of: (a) determining whether the ASR decoding contains Personally Identifiable Information (PII); (b) determining whether the ASR decoding contains Nonpublic Personal Information (NPI); (c) determining whether the ASR decoding contains Personal Health Information (PHI); (d) determining whether the ASR decoding contains Sensitive Personal Information (SPI); and/or (e) determining whether the ASR decoding contains Personal Credit Information (PCI).

In some embodiments, identifying an ASR decoding that contains sensitive information includes use of a redaction strictness factor that, depending upon its setting, affects the likelihood of a given ASR decoding being identified as containing sensitive information.

In some embodiments, eliminating or masking those word(s) and/or utterance(s) for which an associated ASR decoding was identified for redaction further involves retaining an encrypted version of the eliminated word(s)/utterance(s).

And in some embodiments, preparing a redacted audio recording further includes de-identifying the voices of speaker(s) in the redacted audio recording.

BRIEF DESCRIPTION OF THE FIGURES

Aspects, features, and advantages of the present invention, and its numerous exemplary embodiments, can be further appreciated with reference to the accompanying set of figures, in which:

FIG. 44 depicts a structured data record, in accordance with certain exemplary embodiments herein;

FURTHER DESCRIPTION OF ILLUSTRATIVE EMBODIMENTS

Referring to FIGS. 10-28, the depicted data link(s) are each preferably provisioned as one or more secure data tunnels, using, for example, a secure shell (SSH) protocol. See https://en.wikipedia.org/wiki/Tunneling protocol (incorporated by reference herein). Indeed, such SSH-provisioned data link(s) may be used to support any, or all, of the data communication links between functional or structural components of the various embodiments herein.

Figure 1:
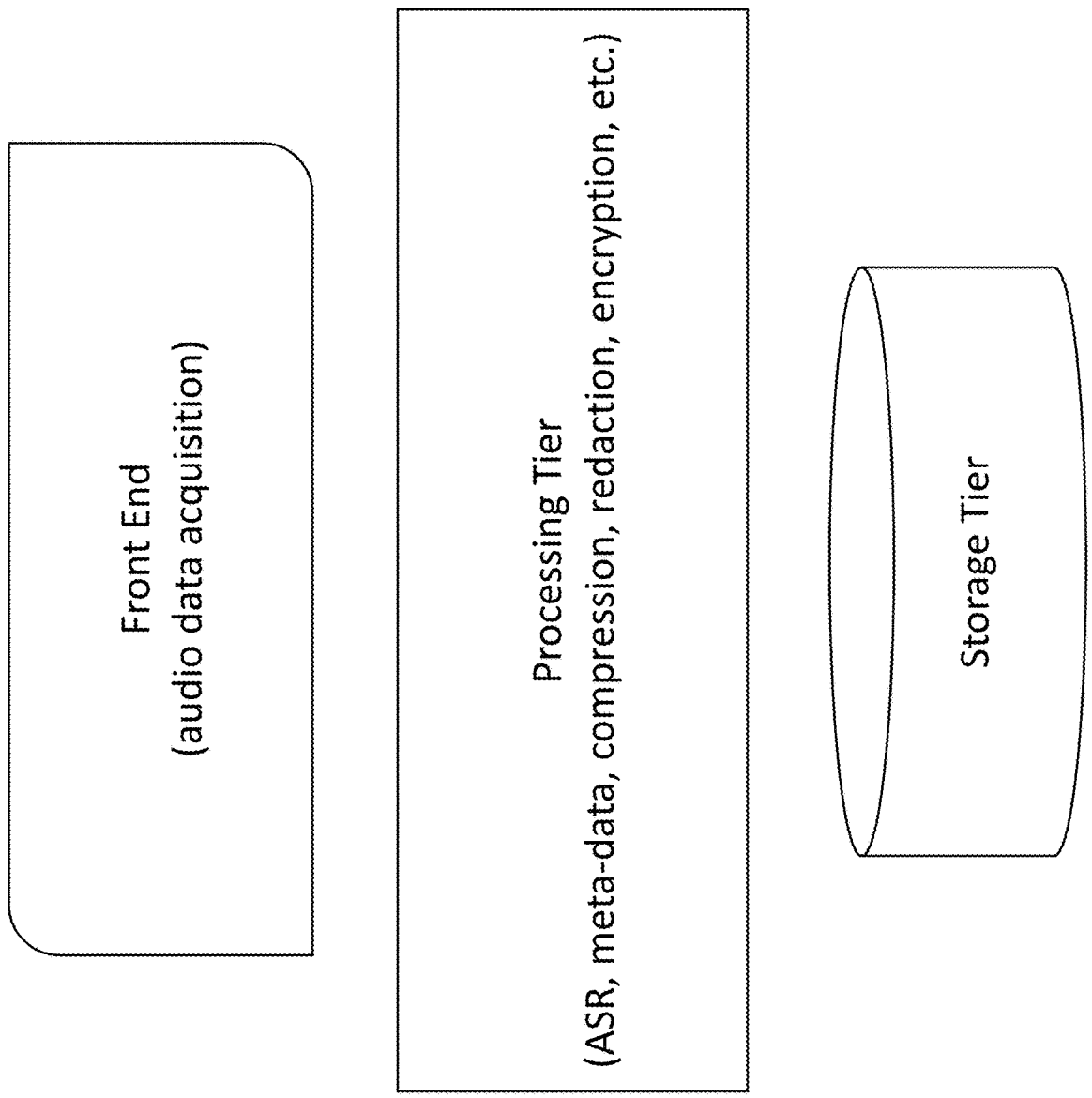
FIG. 1 is a high-level block diagram, showing a Front End, Processing Tier, and Storage Tier.
Figure 2:
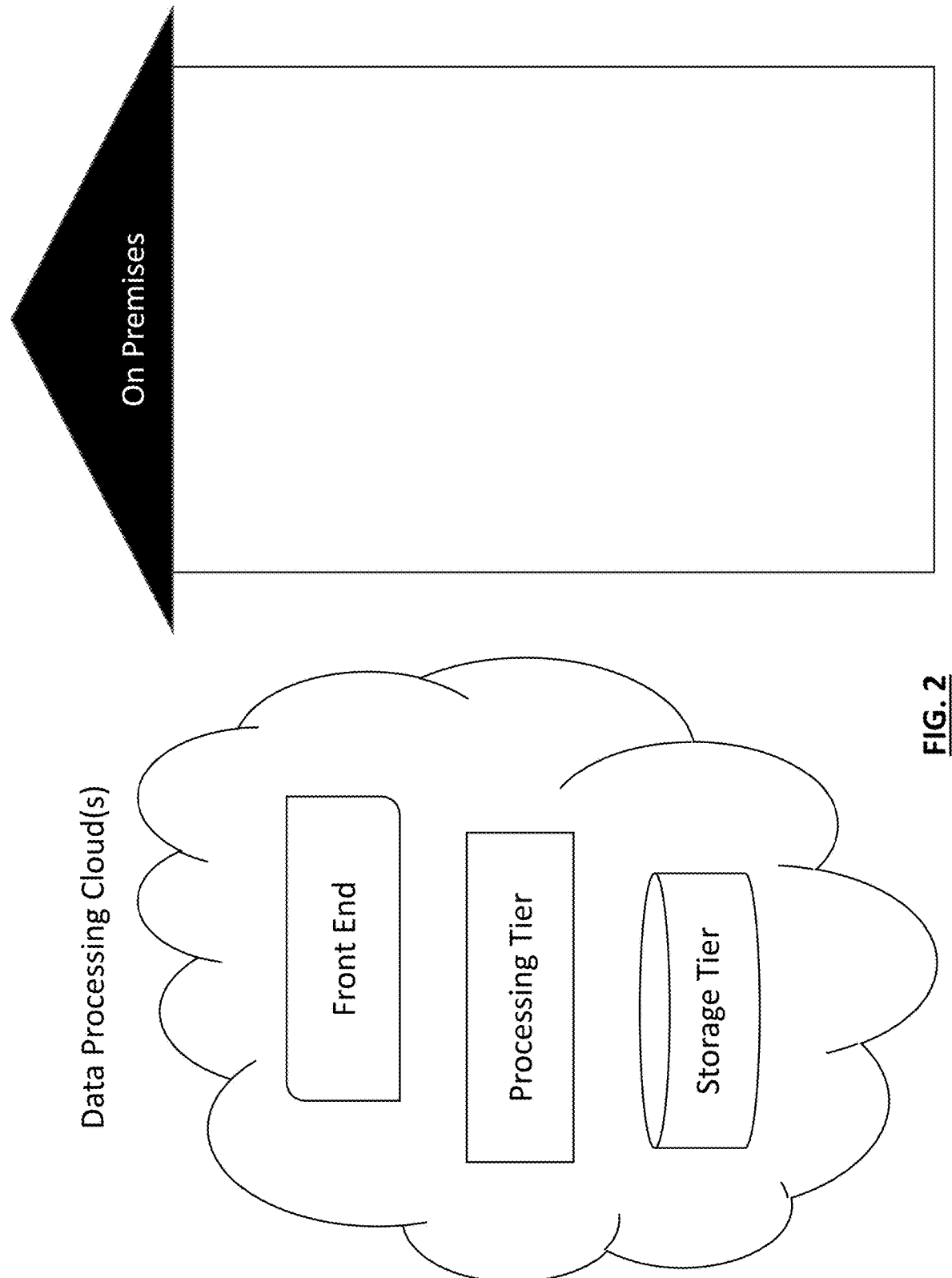
FIG. 2 depicts an exemplary embodiment in which the Front End, Processing Tier, and Storage Tier are all provisioned in one or more Data Processing Cloud(s)
Figure 3:
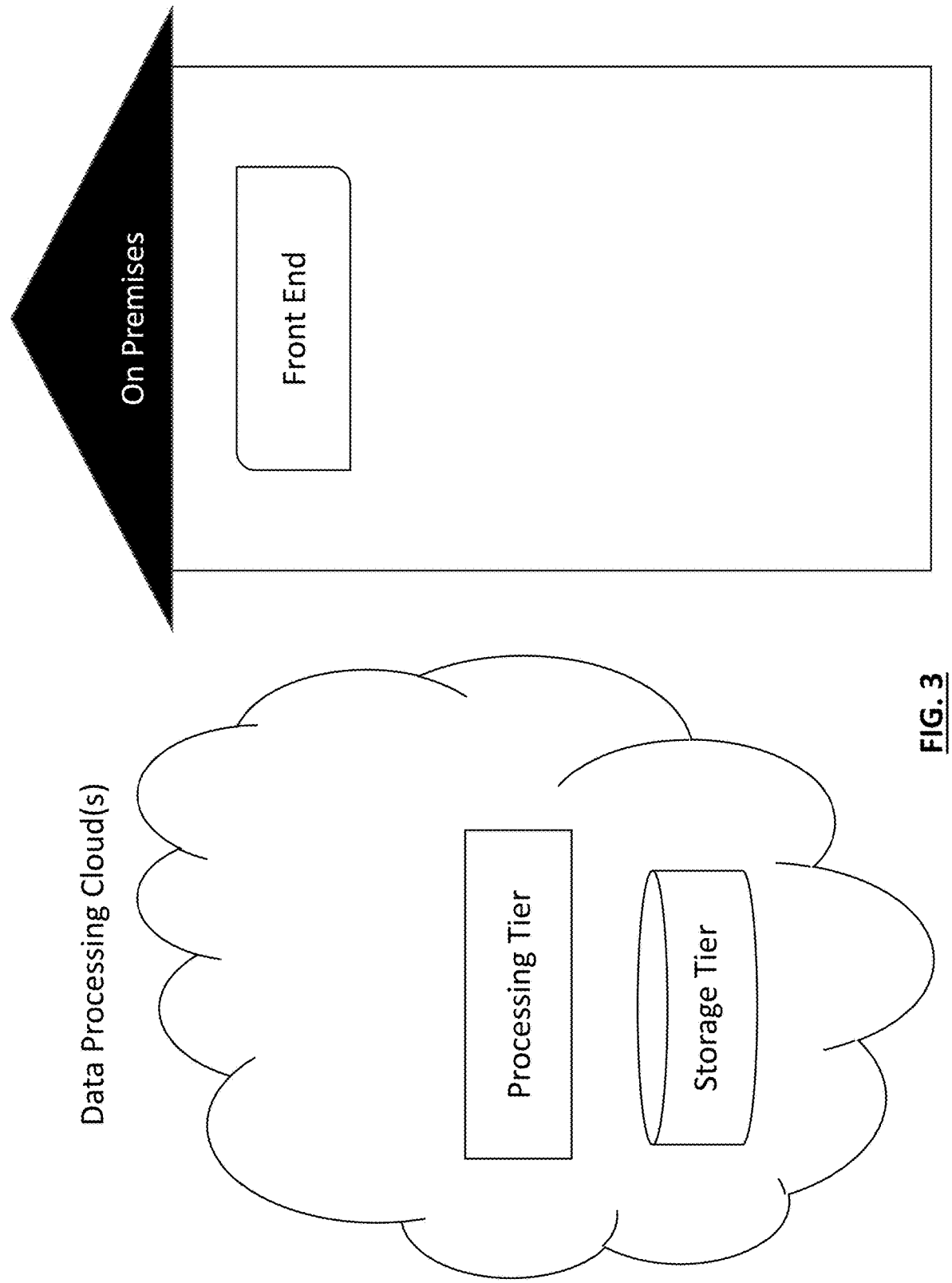
FIG. 3 depicts an exemplary embodiment in which the Processing and Storage Tiers are provisioned in Data Processing Cloud(s), and the Frond End is provisioned On Premises.
Figure 4:
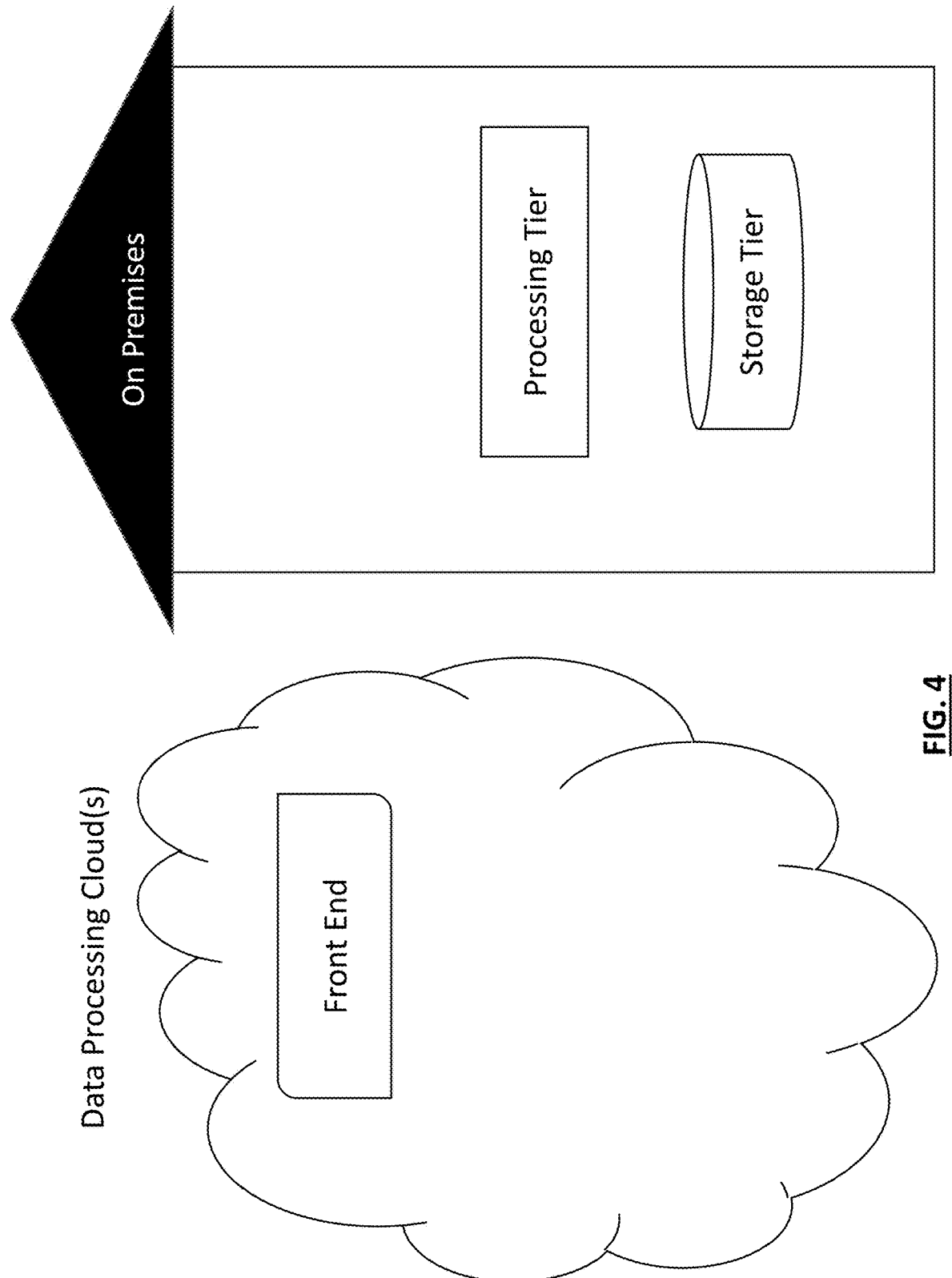
FIG. 4 depicts an exemplary embodiment in which the Front End is provisioned in a Data Processing Cloud, and the Processing and Storage Tiers are provisioned On Premises.
Figure 5:
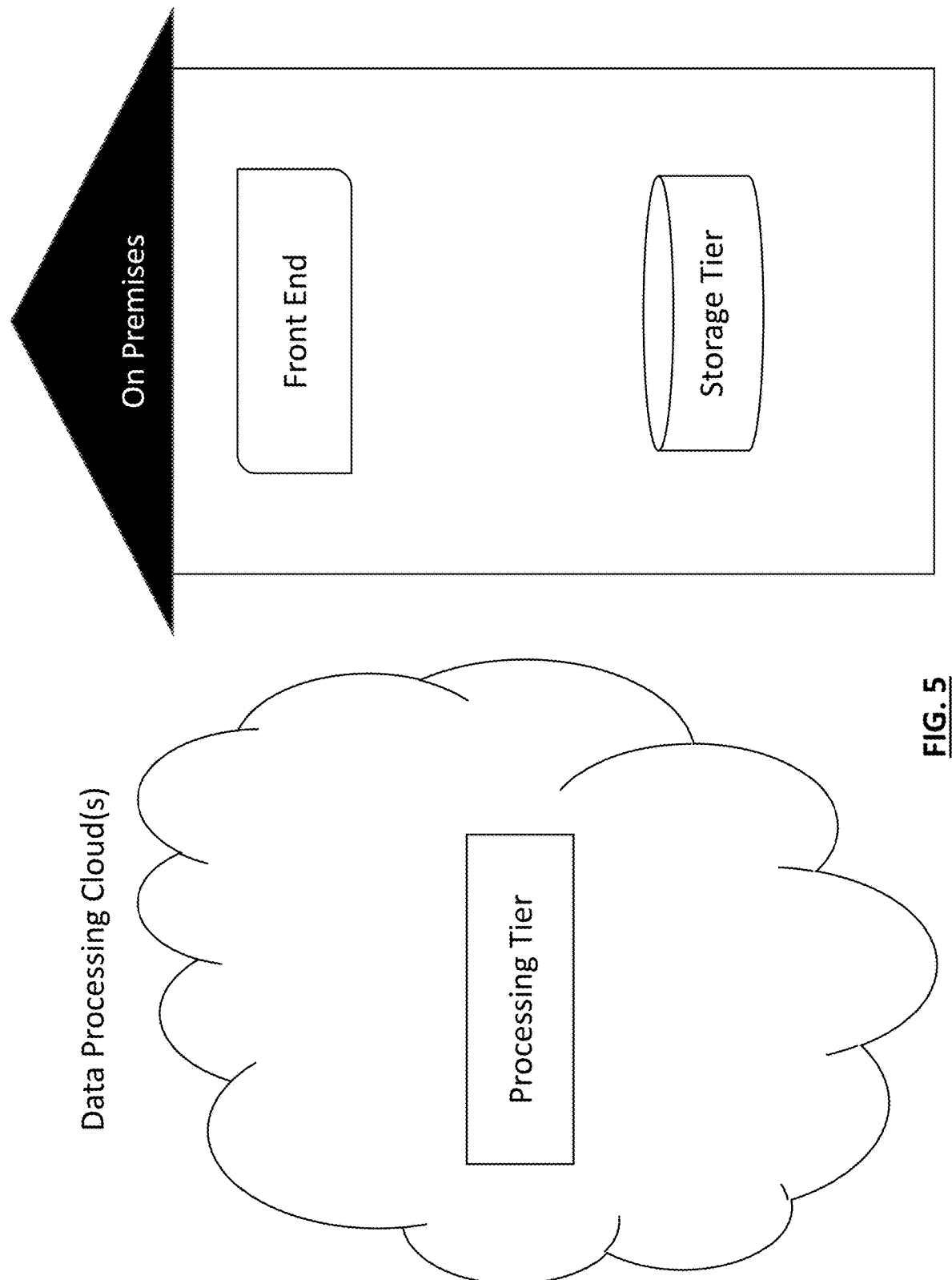
FIG. 5 depicts an exemplary embodiment in which the Processing Tier is provisioned in a Data Processing Cloud, and the Front End and Storage Tier are provisioned On Premises.
Figure 6:
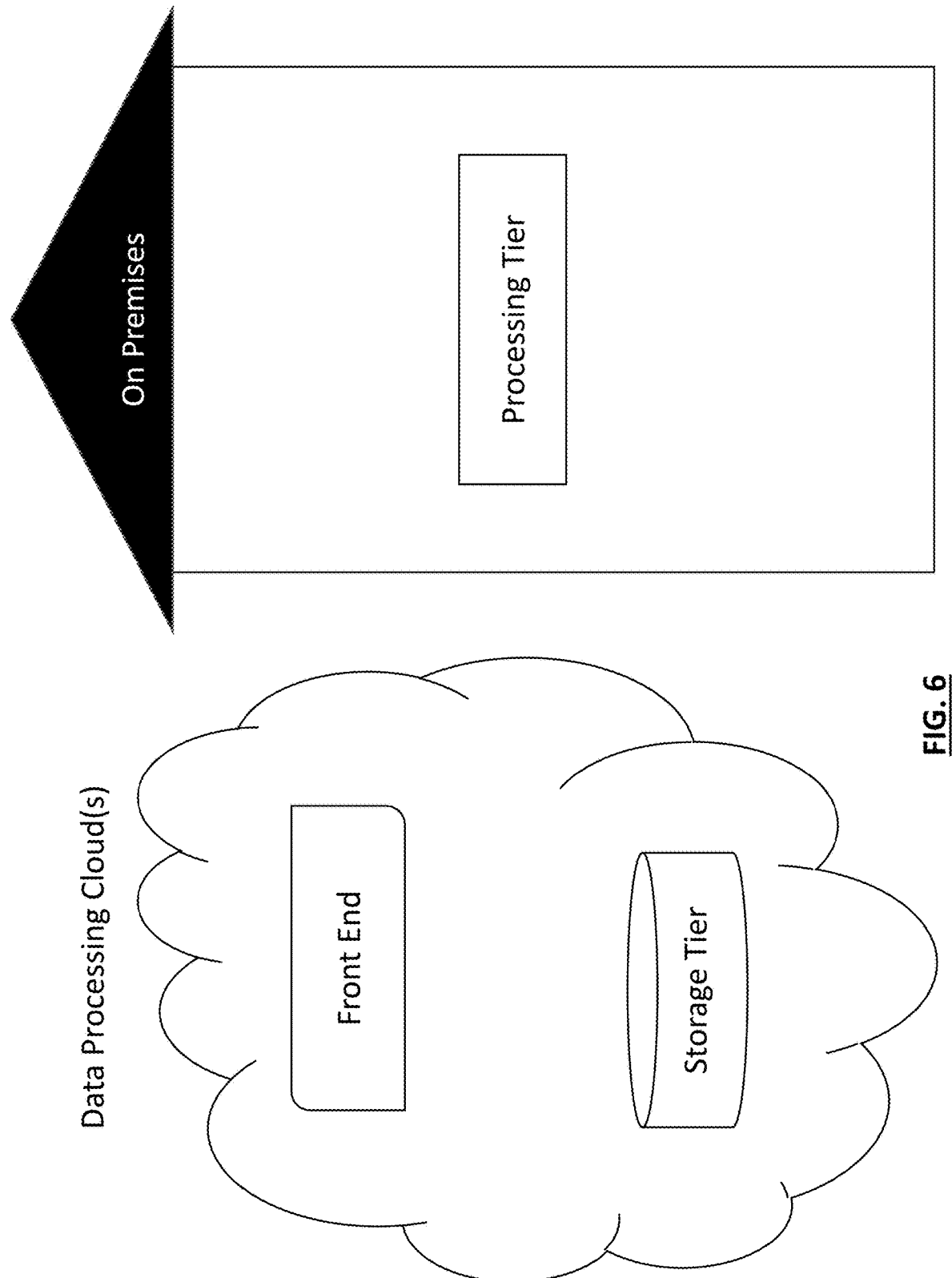
FIG. 6 depicts an exemplary embodiment in which the Front End and Storage Tier are provisioned in Data Processing Cloud(s), and the Processing Tier is provisioned On Premises.
Figure 7:
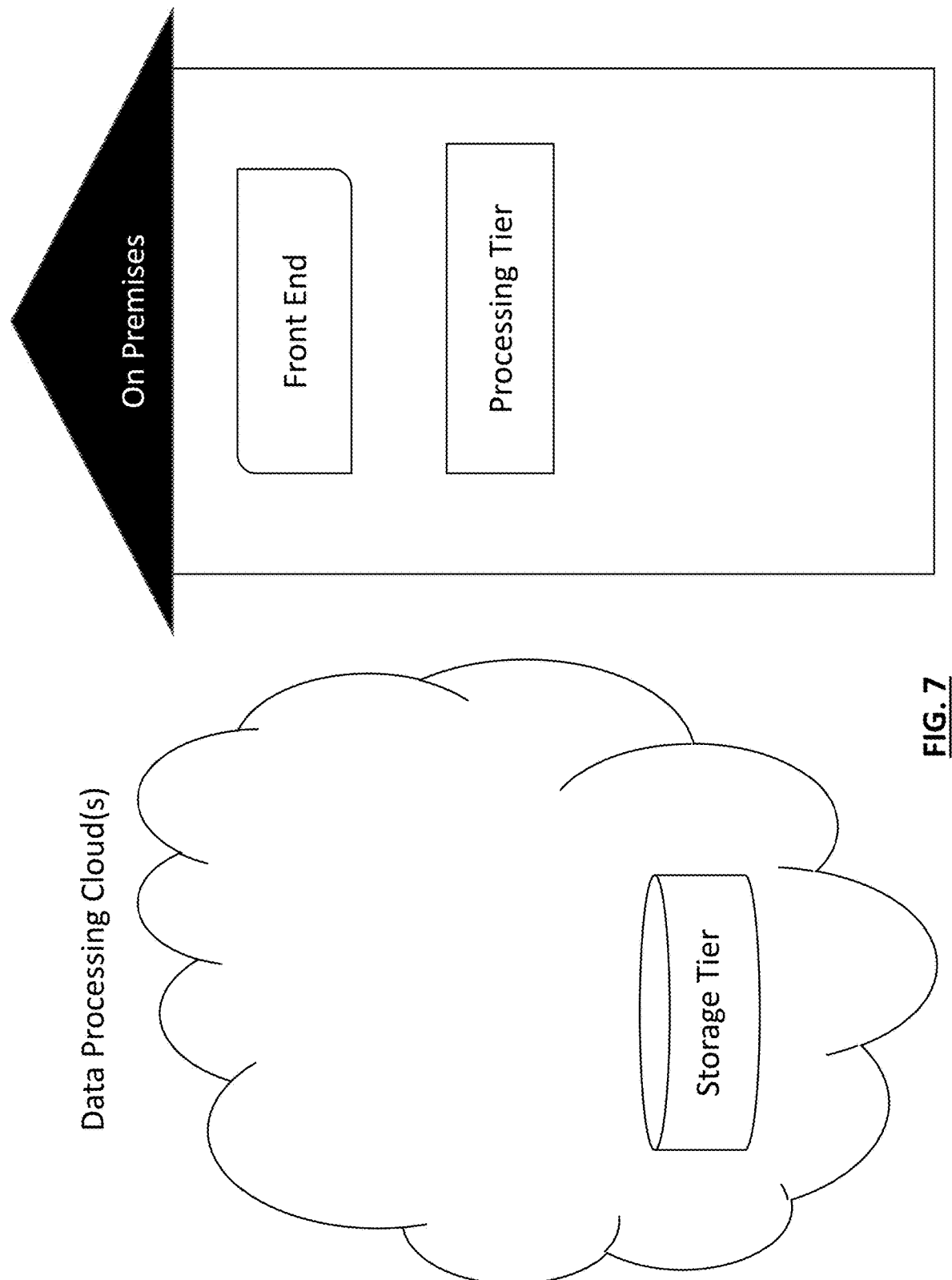
FIG. 7 depicts an exemplary embodiment in which the Storage Tier is provisioned in a Data Processing Cloud, and the Front End and Processing Tier are provisioned On Premises.
Figure 8:
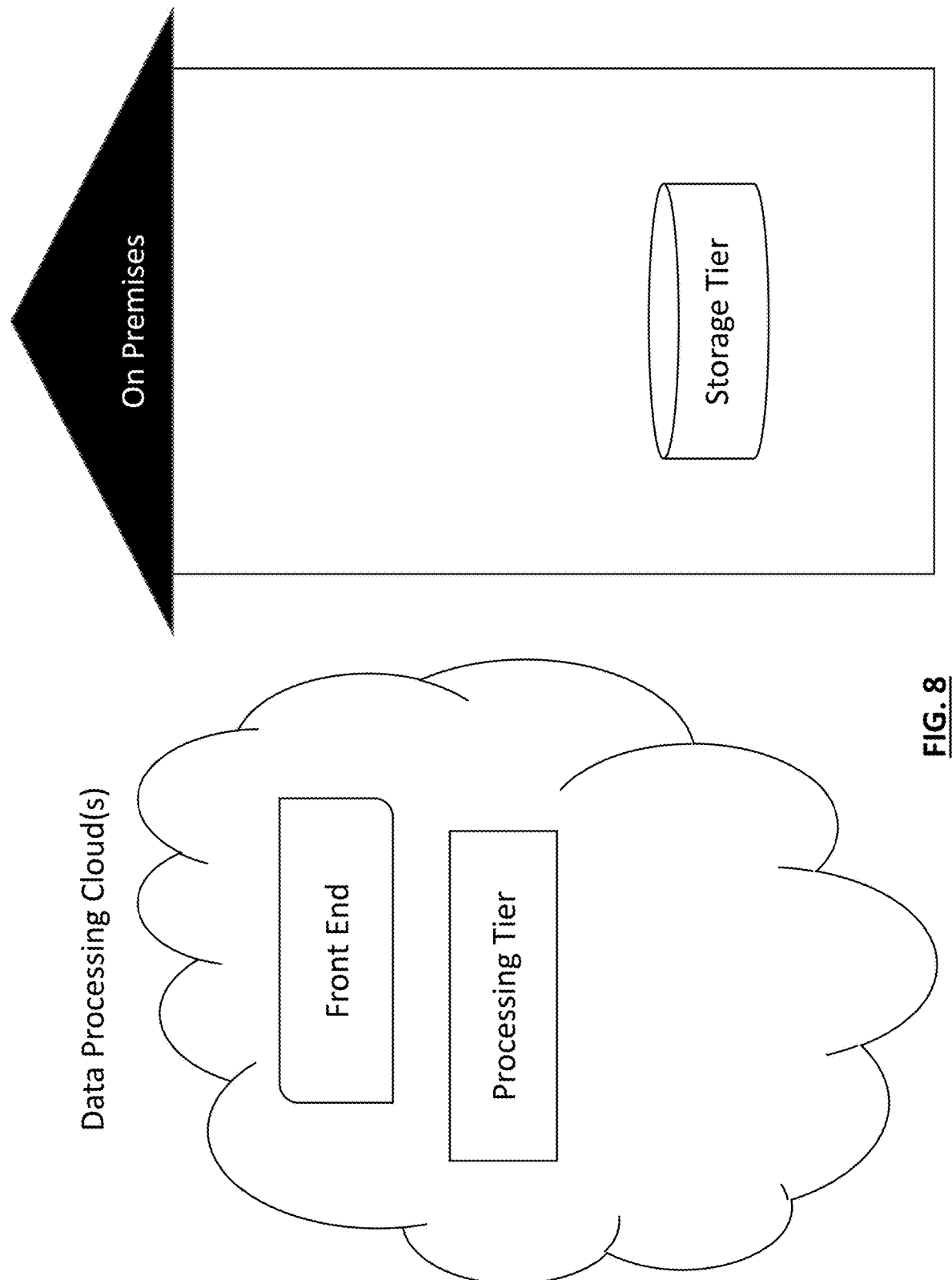
FIG. 8 depicts an exemplary embodiment in which the Front End and Processing Tier are provisioned in Data Processing Cloud(s), and the Storage Tier is provisioned On Premises.
Figure 9:
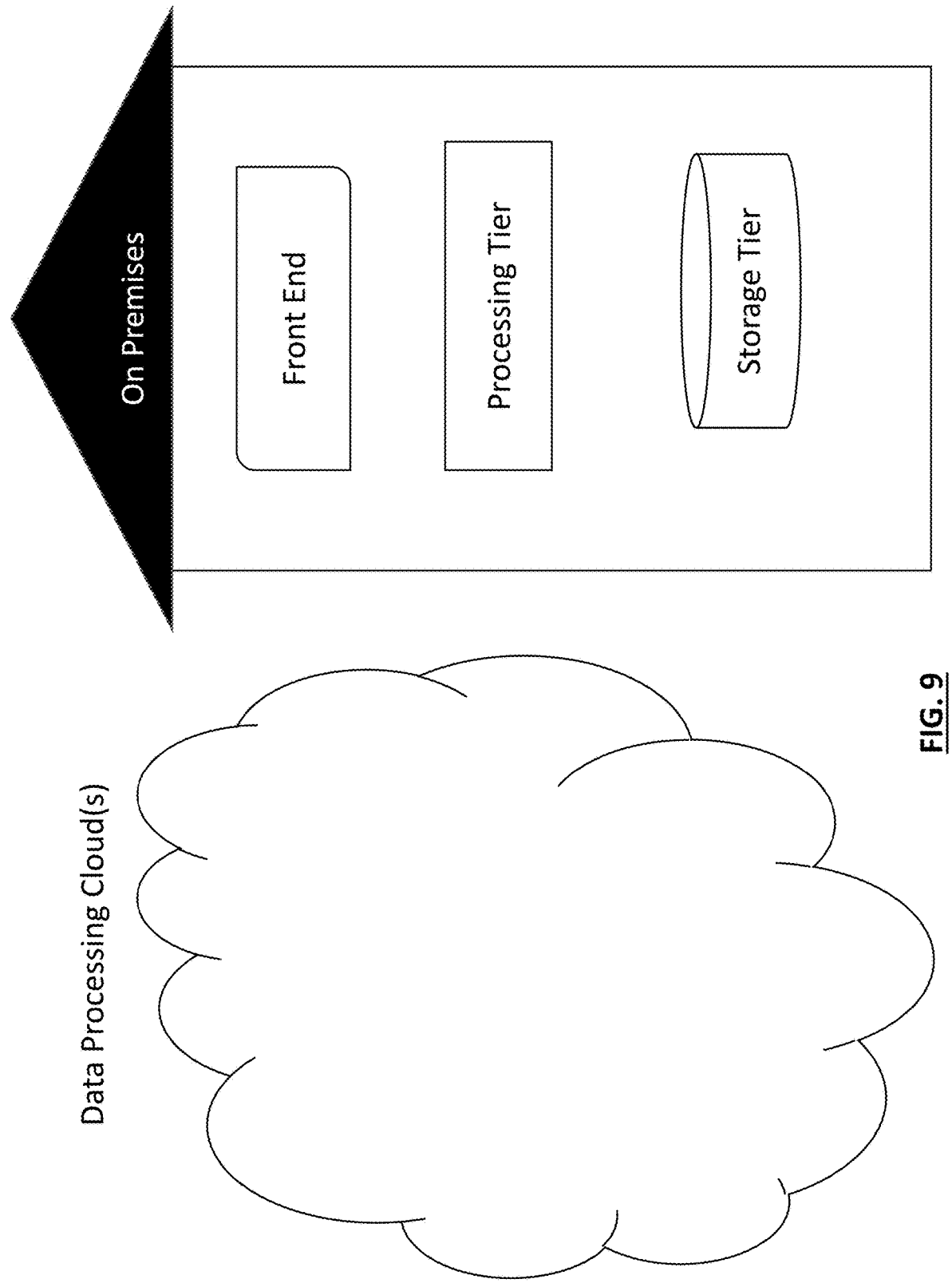
FIG. 9 depicts an exemplary embodiment in which the Front End, Processing Tier, and Storage Tier are provisioned On Premises.
Figure 10:
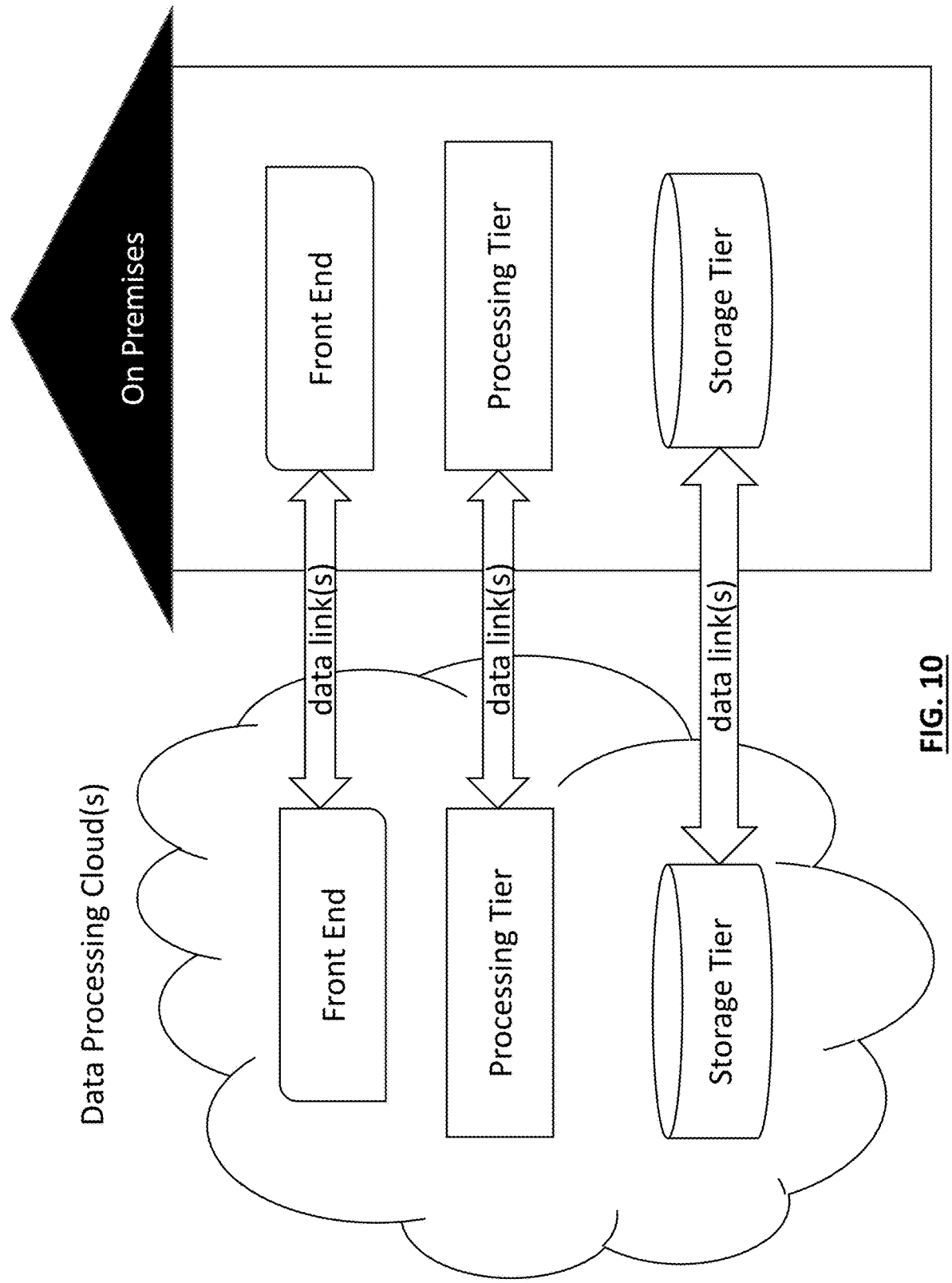
FIG. 10 depicts an exemplary embodiment in which the Front End, Processing Tier, and Storage Tier are provisioned partly in Data Processing Cloud(s) and partly On Premises.
Figure 11:
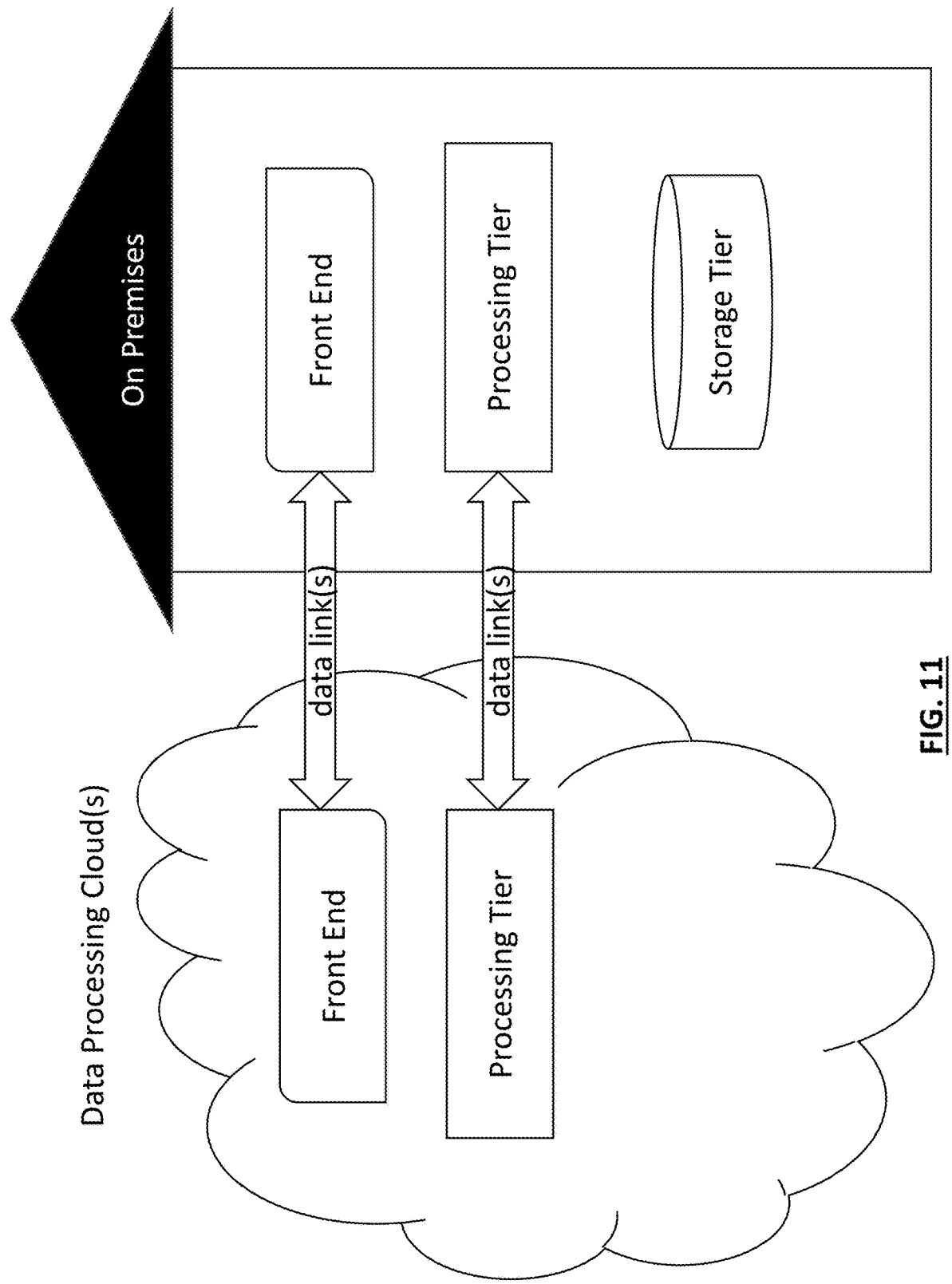
FIG. 11 depicts an exemplary embodiment in which the Front End and Processing Tier are provisioned partly in Data Processing Cloud(s) and partly On Premises, and the Storage Tier is provisioned On Premises.
Figure 12:
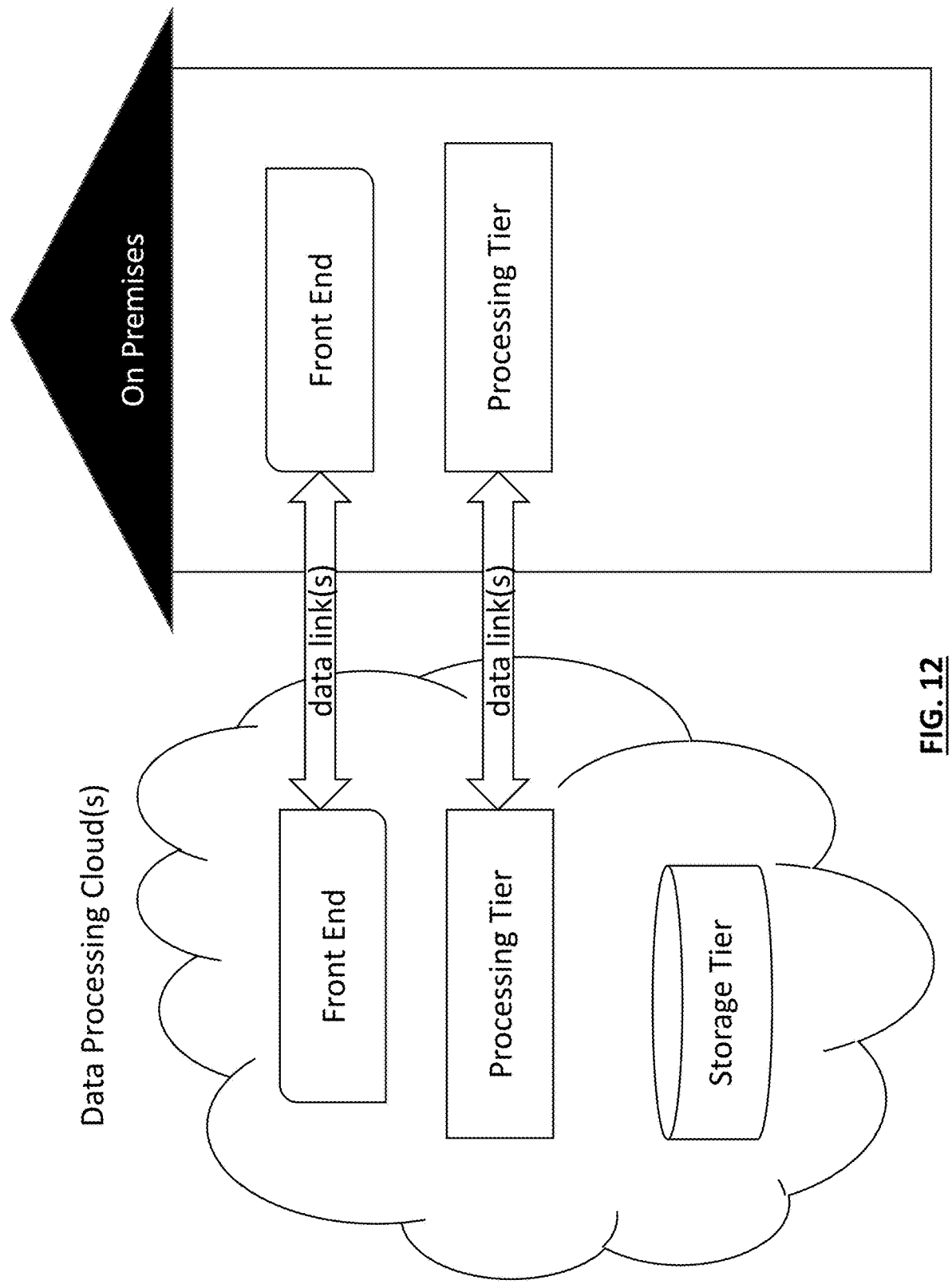
FIG. 12 depicts an exemplary embodiment in which the Front End and Processing Tier are provisioned partly in Data Processing Cloud(s) and partly On Premises, and the Storage Tier is provisioned in a Data Processing Cloud.
Figure 13:
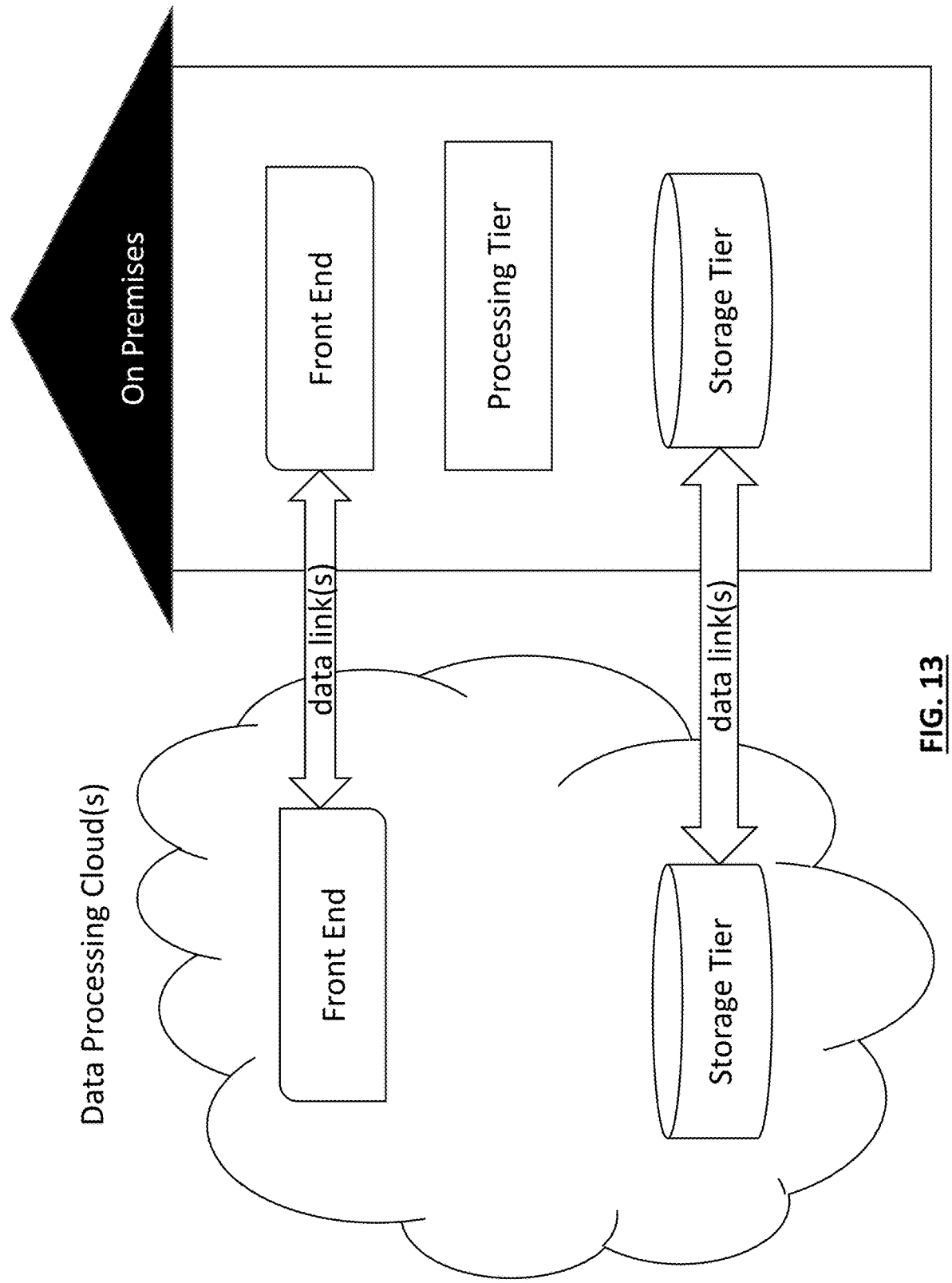
FIG. 13 depicts an exemplary embodiment in which the Front End and Storage Tier are provisioned partly in Data Processing Cloud(s) and partly On Premises, and the Processing Tier is provisioned On Premises.
Figure 14:
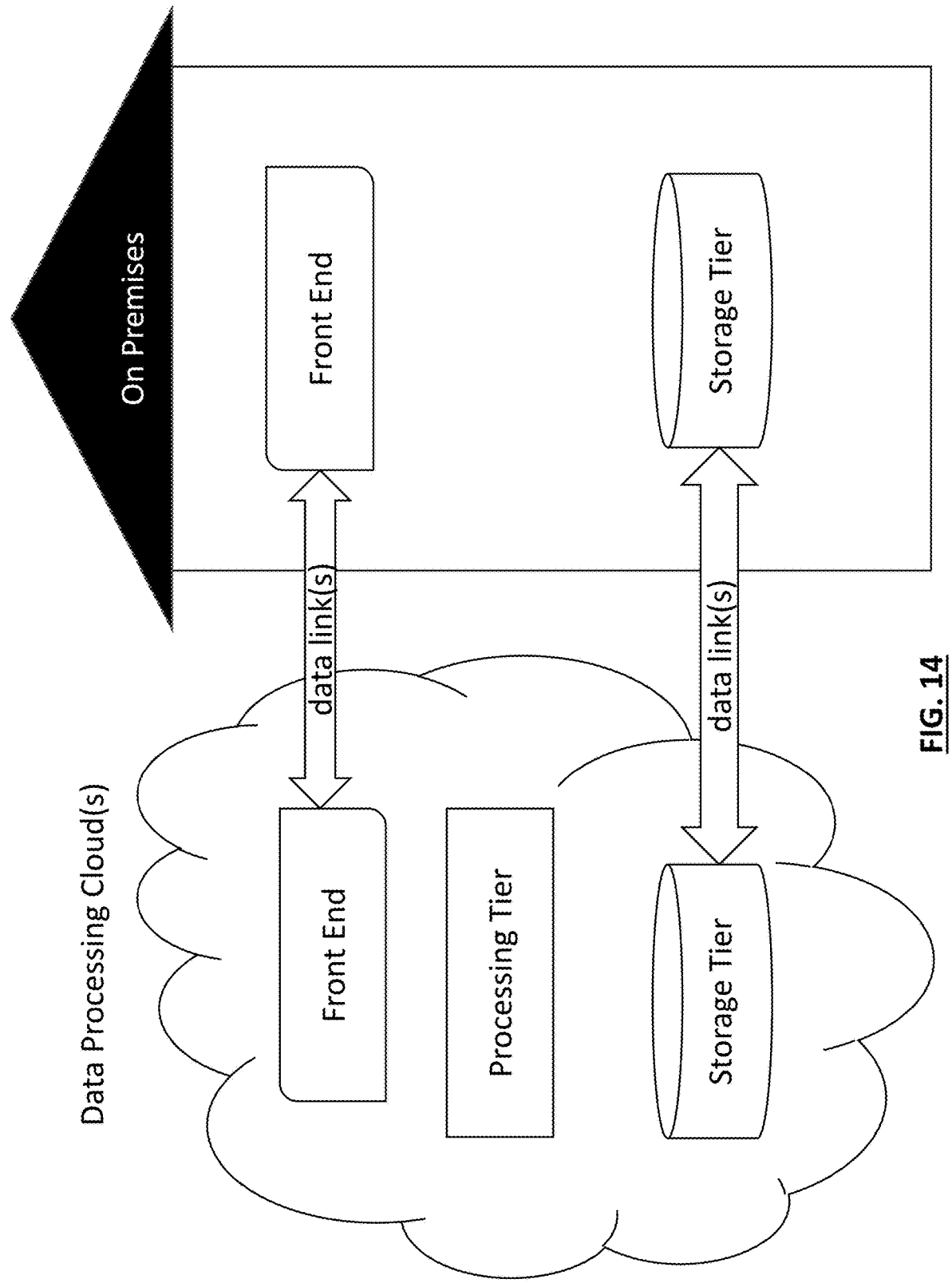
FIG. 14 depicts an exemplary embodiment in which the Front End and Storage Tier are provisioned partly in Data Processing Cloud(s) and partly On Premises, and the Processing Tier is provisioned in a Data Processing Cloud.
Figure 15:
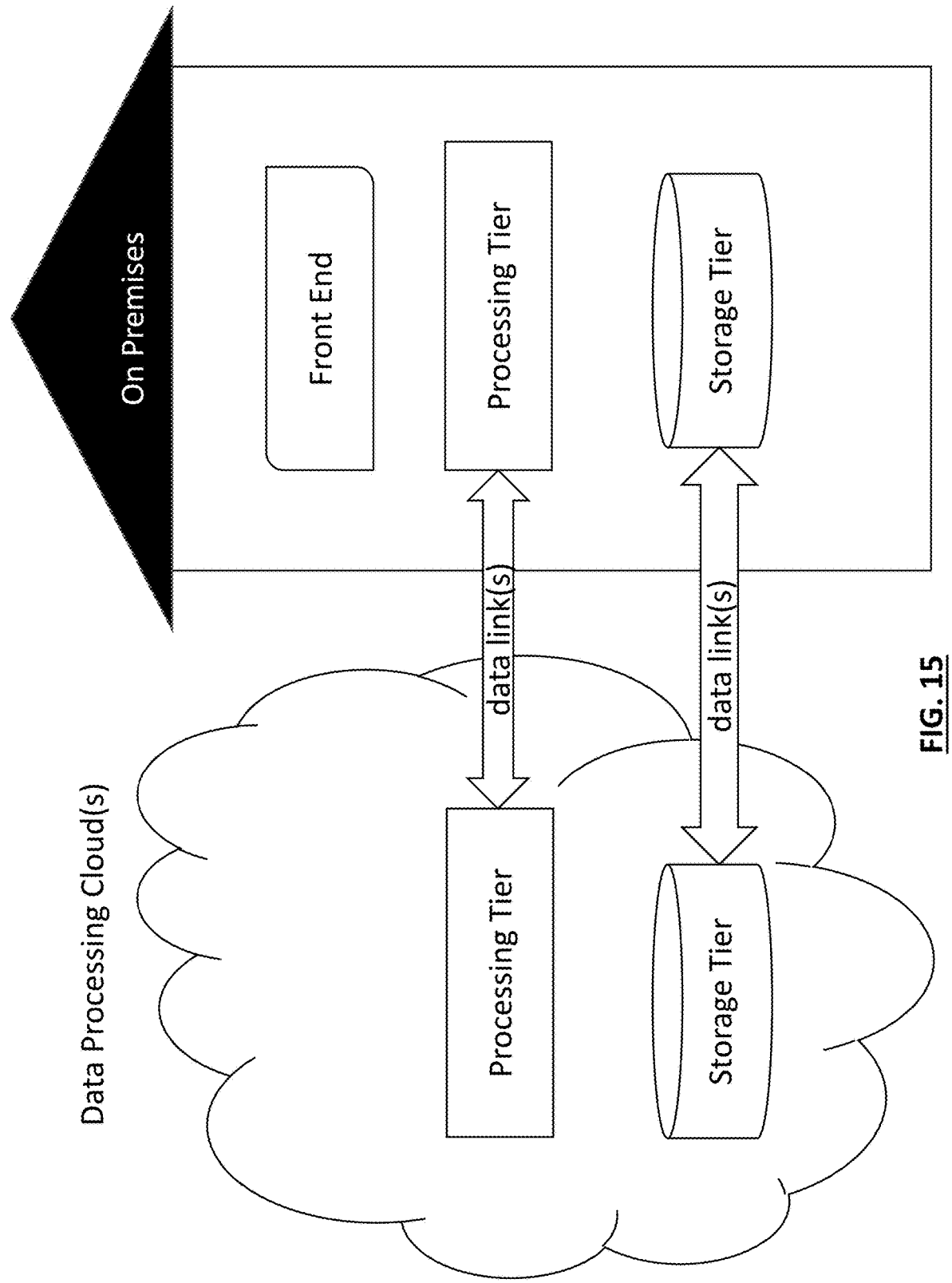
FIG. 15 depicts an exemplary embodiment in which the Processing and Storage Tiers are provisioned partly in Data Processing Cloud(s) and partly On Premises, and the Front End is provisioned On Premises.
Figure 16:
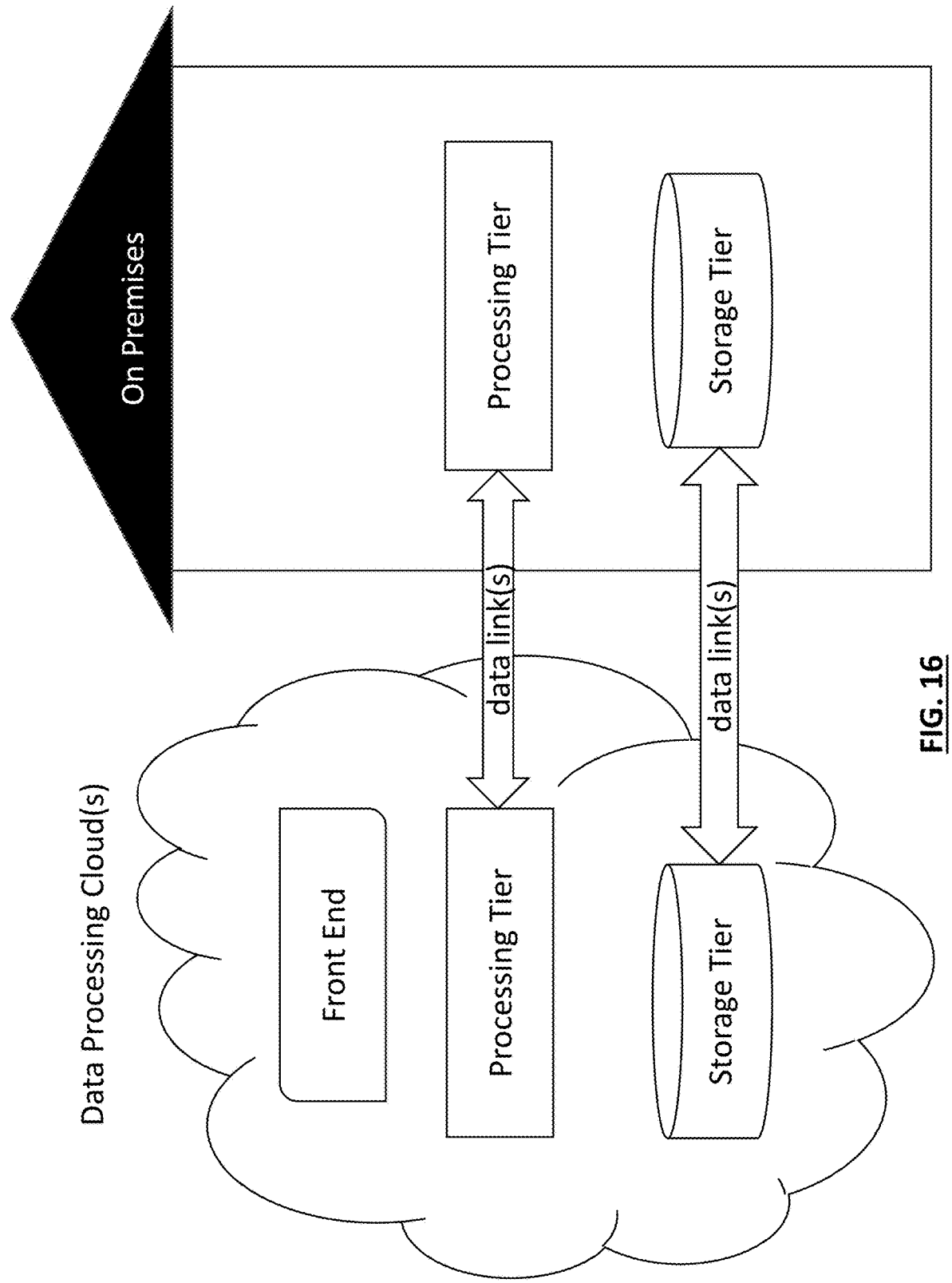
FIG. 16 depicts an exemplary embodiment in which the Processing and Storage Tiers are provisioned partly in Data Processing Cloud(s) and partly On Premises, and the Front End is provisioned in a Data Processing Cloud.
Figure 17:
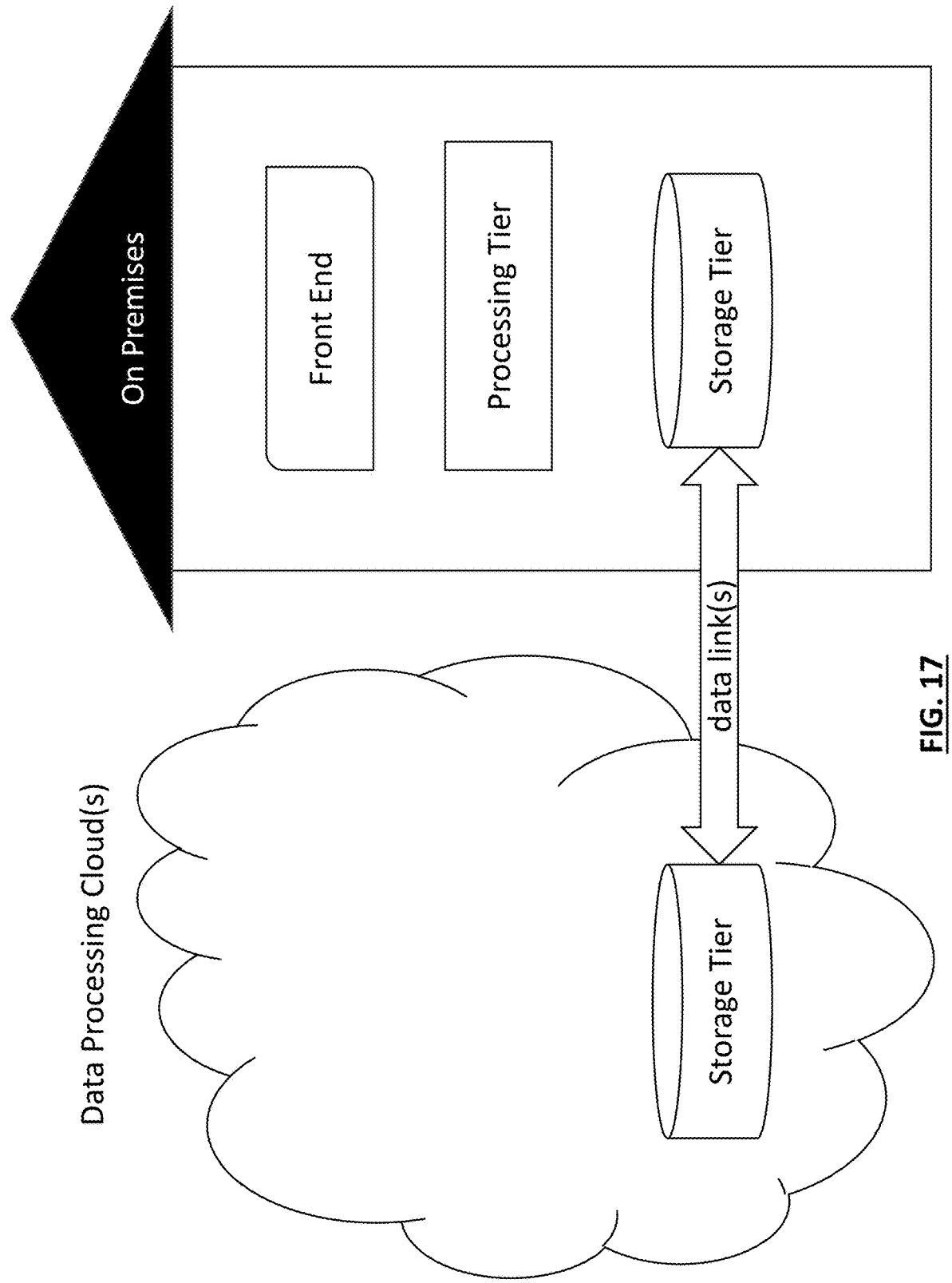
FIG. 17 depicts an exemplary embodiment in which the Storage Tier is provisioned partly in a Data Processing Cloud and partly On Premises, and the Front End and Processing Tier are provisioned On Premises.
Figure 18:
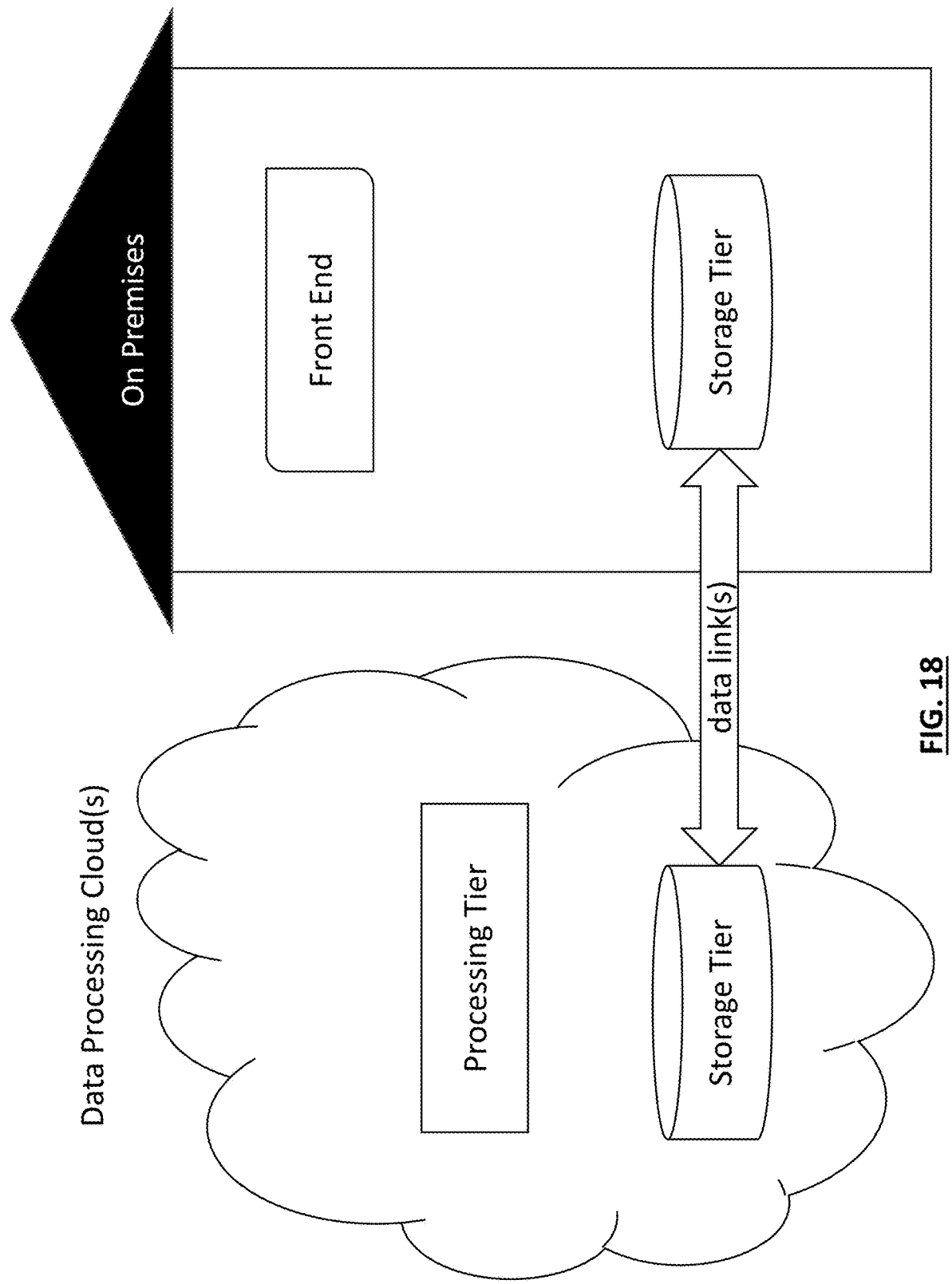
FIG. 18 depicts an exemplary embodiment in which the Storage Tier is provisioned partly in a Data Processing Cloud and partly On Premises, the Front End is provisioned On Premises, and the Processing Tier is provisioned in a Data Processing Cloud.
Figure 19:
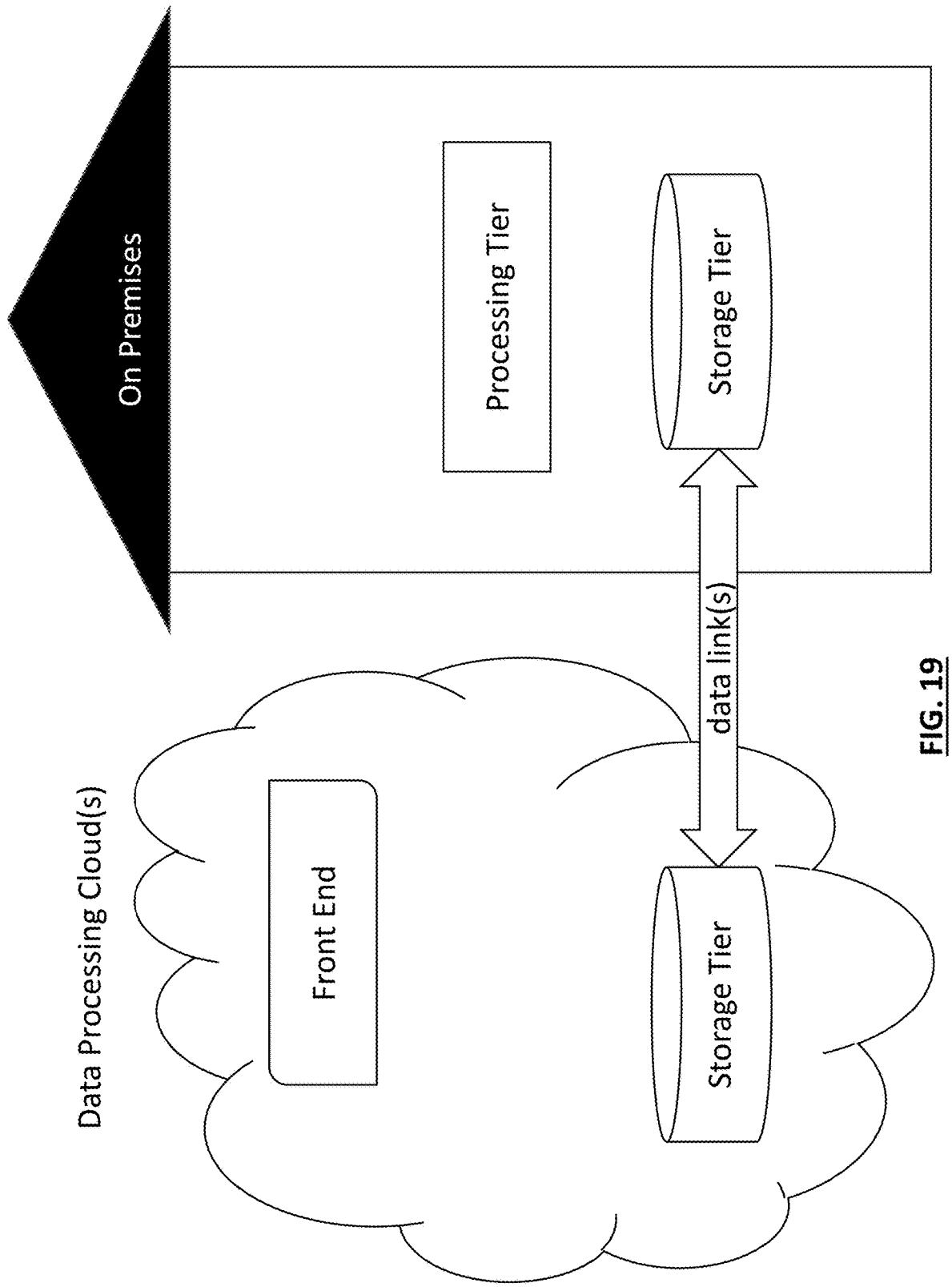
FIG. 19 depicts an exemplary embodiment in which the Storage Tier is provisioned partly in a Data Processing Cloud and partly On Premises, the Processing Tier is provisioned On Premises, and the Front End is provisioned in a Data Processing Cloud.
Figure 20:
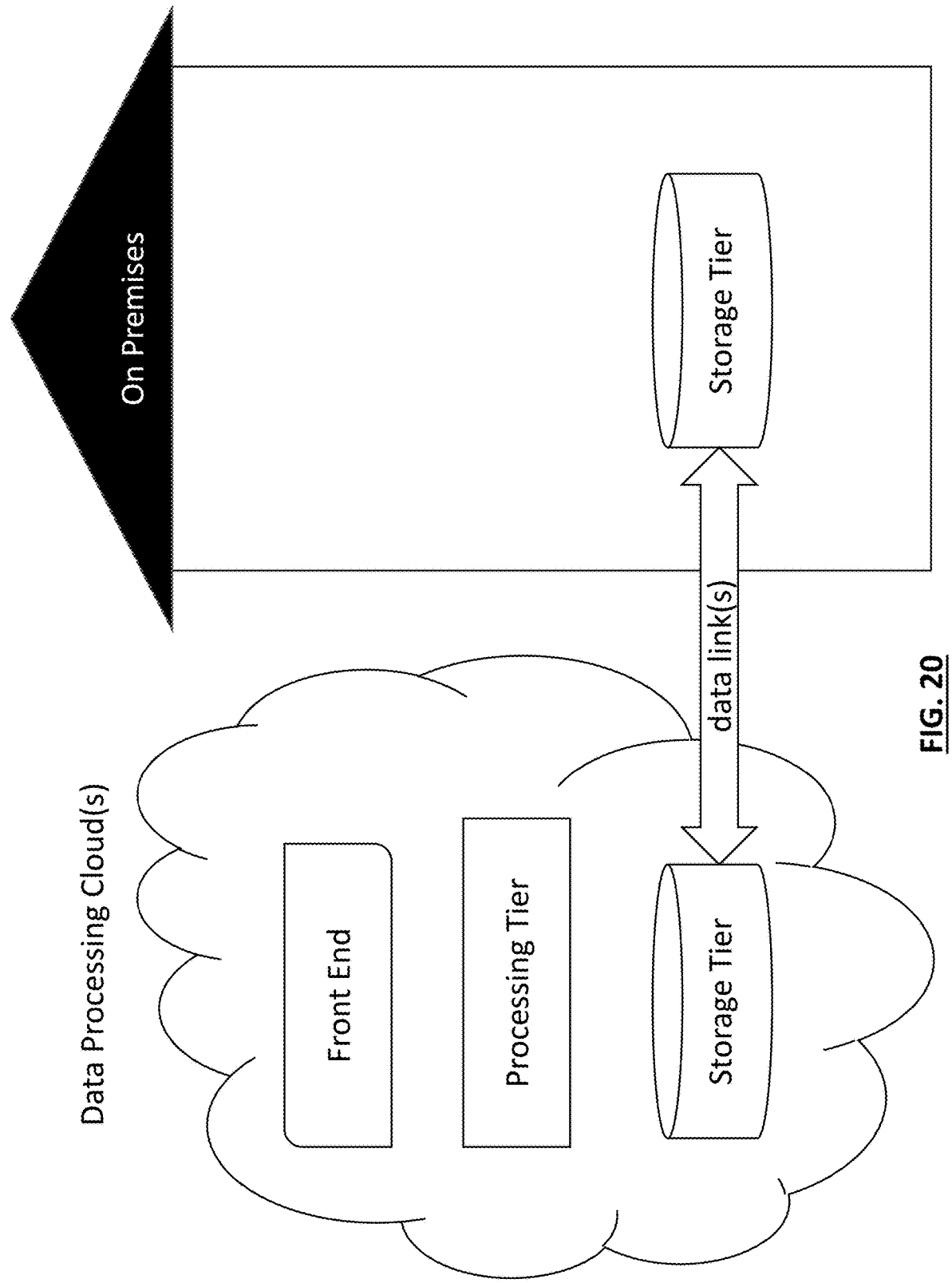
FIG. 20 depicts an exemplary embodiment in which the Storage Tier is provisioned partly in a Data Processing Cloud and partly On Premises, and the Front End and Processing Tier are provisioned in Data Processing Cloud(s)
Figure 21:
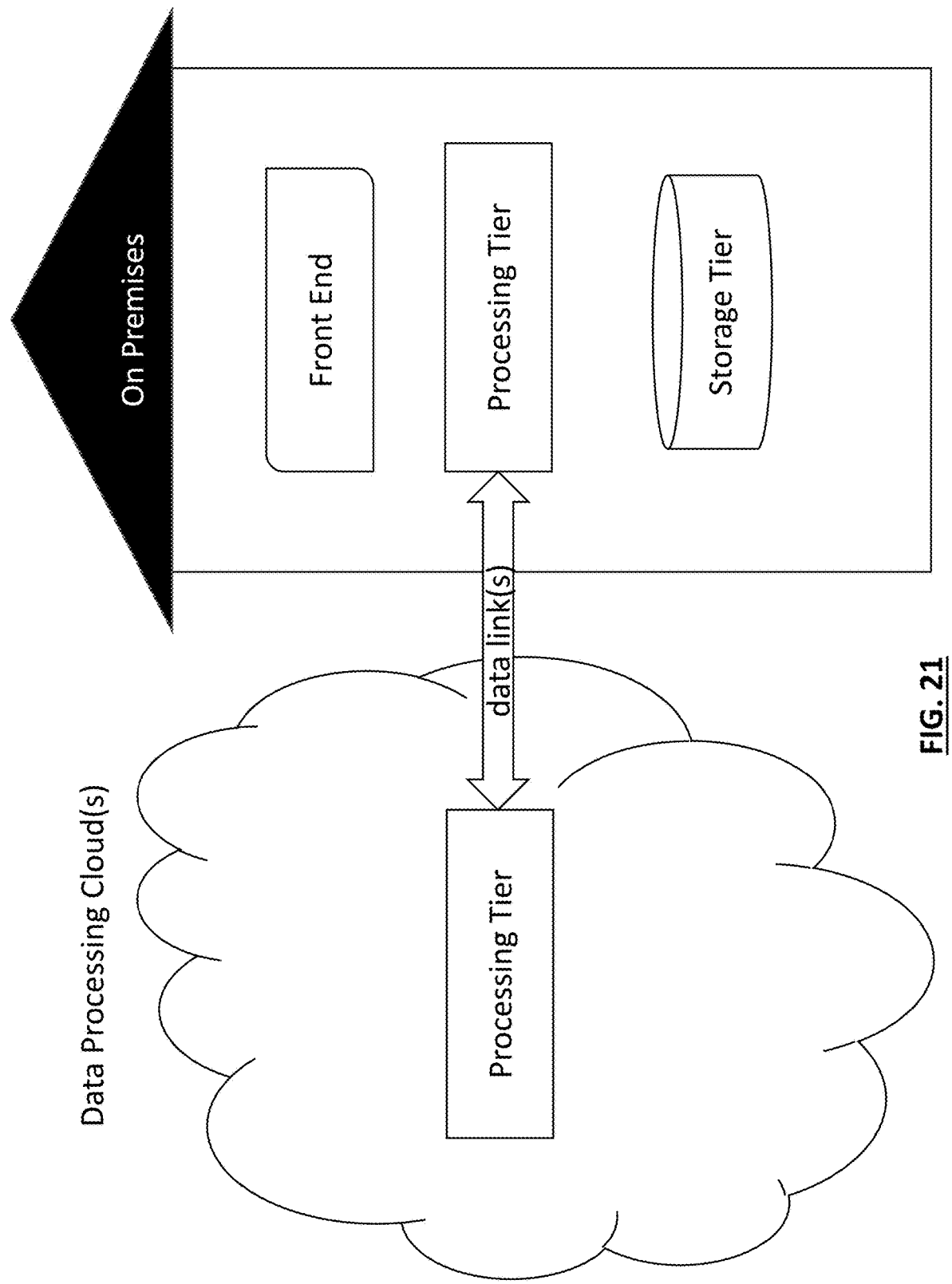
FIG. 21 depicts an exemplary embodiment in which the Processing Tier is provisioned partly in a Data Processing Cloud and partly On Premises, and the Front End and Storage Tier are provisioned On Premises.
Figure 22:
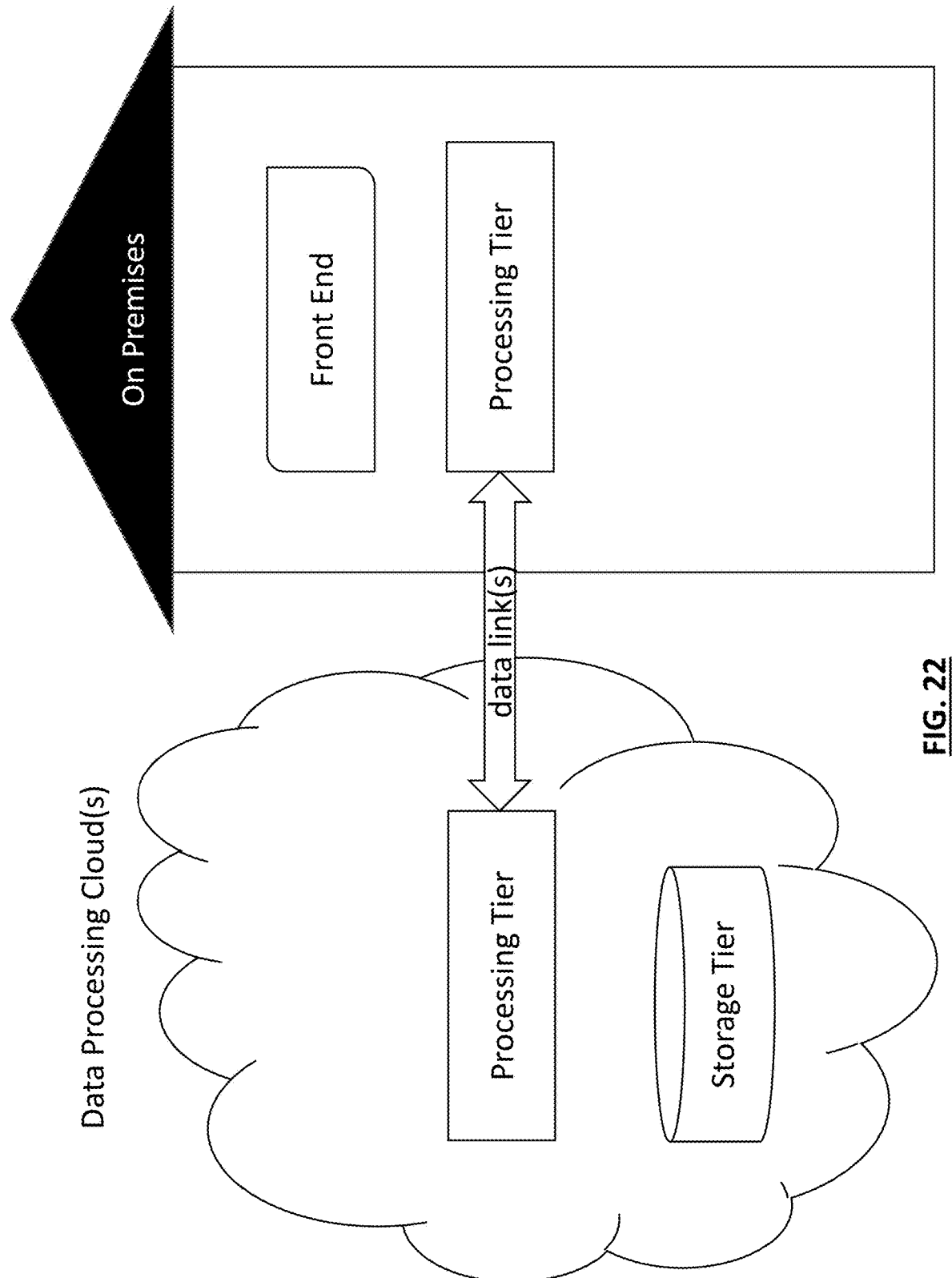
FIG. 22 depicts an exemplary embodiment in which the Processing Tier is provisioned partly in a Data Processing Cloud and partly On Premises, the Front End is provisioned On Premises, and the Storage Tier is provisioned in a Data Processing Cloud.
Figure 23:
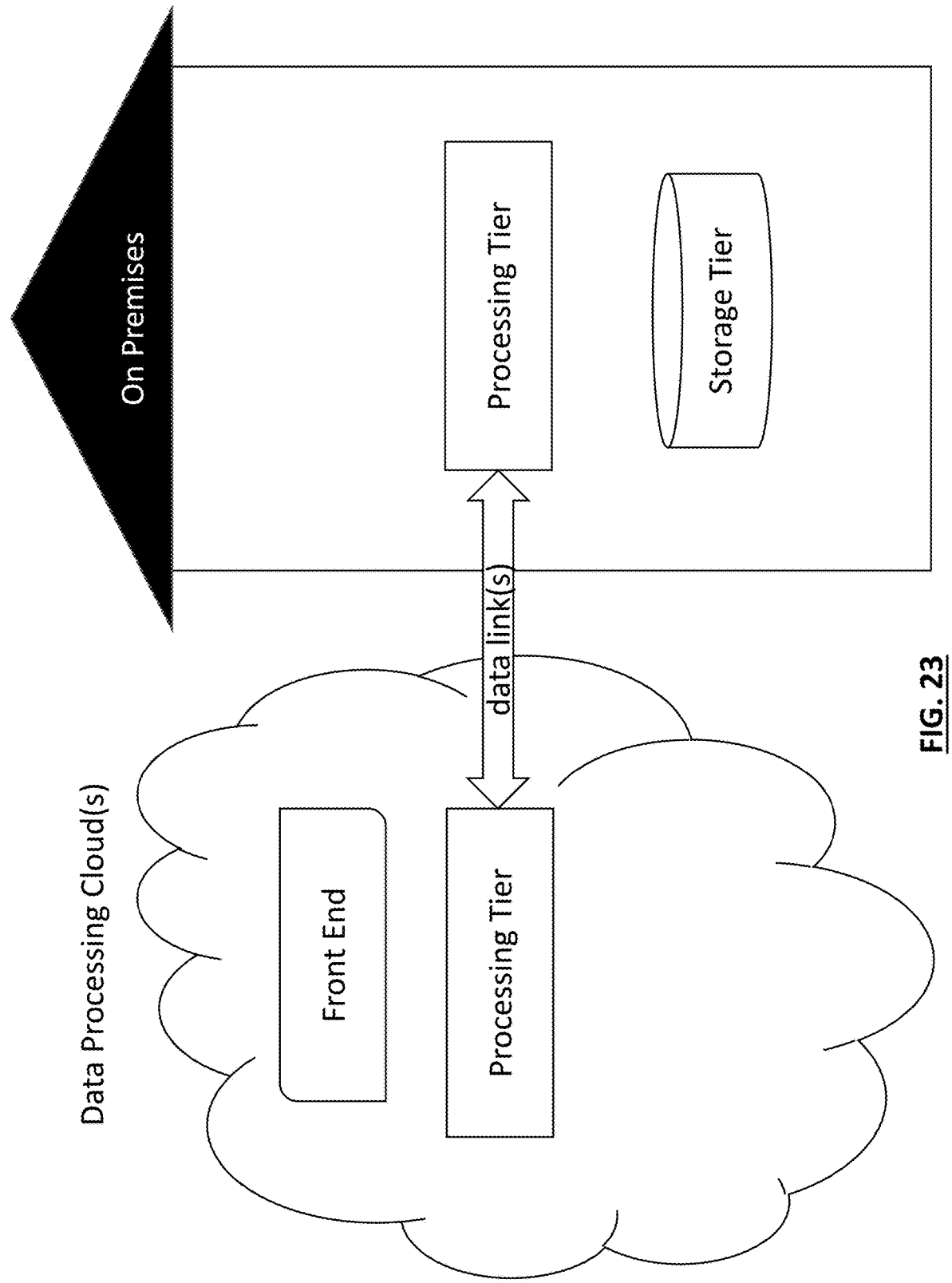
FIG. 23 depicts an exemplary embodiment in which the Processing Tier is provisioned partly in a Data Processing Cloud and partly On Premises, the Storage Tier is provisioned On Premises, and the Front End is provisioned in a Data Processing Cloud.
Figure 24:
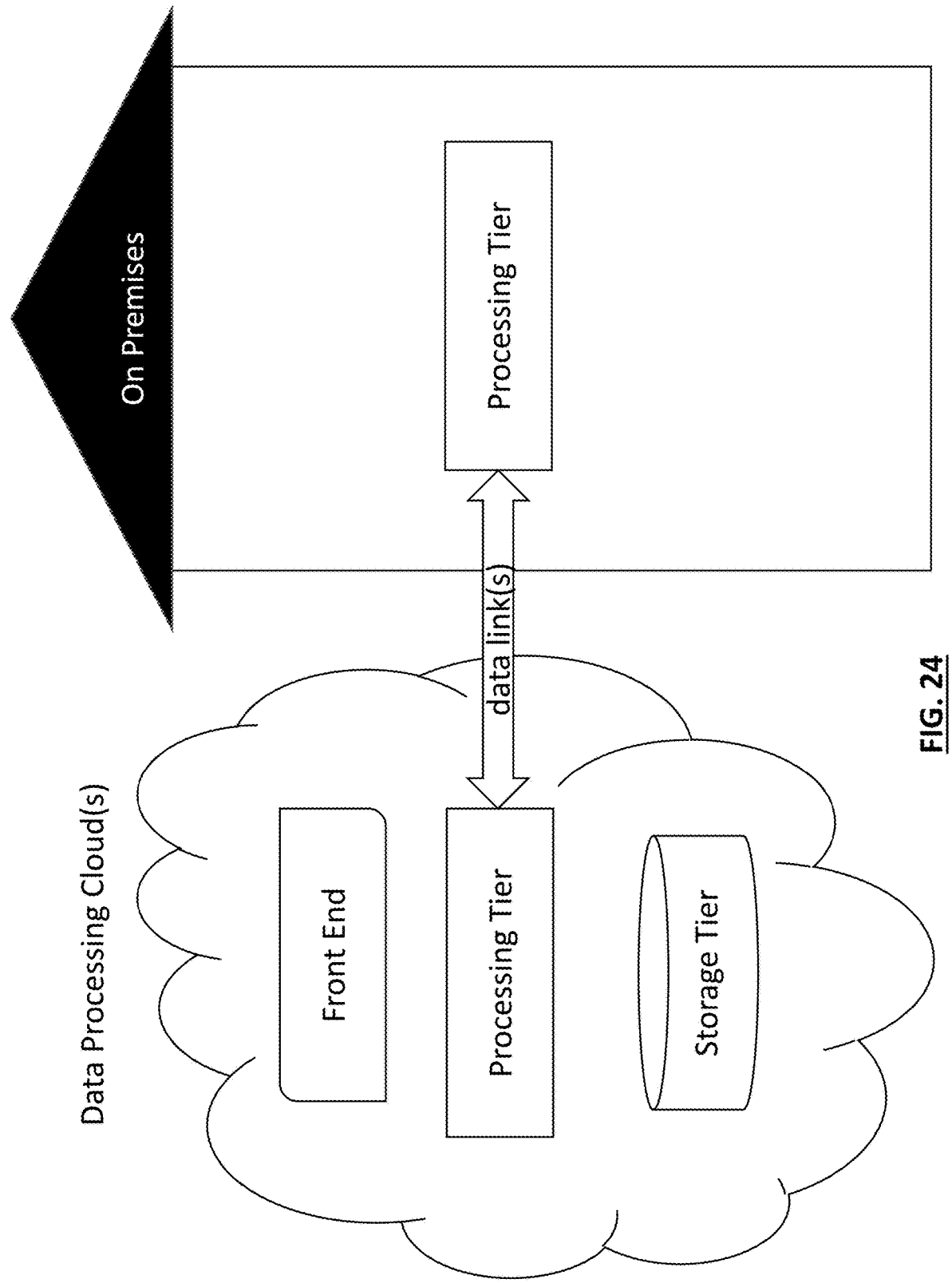
FIG. 24 depicts an exemplary embodiment in which the Processing Tier is provisioned partly in a Data Processing Cloud and partly On Premises, and the Front End and Storage Tier are provisioned in Data Processing Cloud(s)
Figure 25:
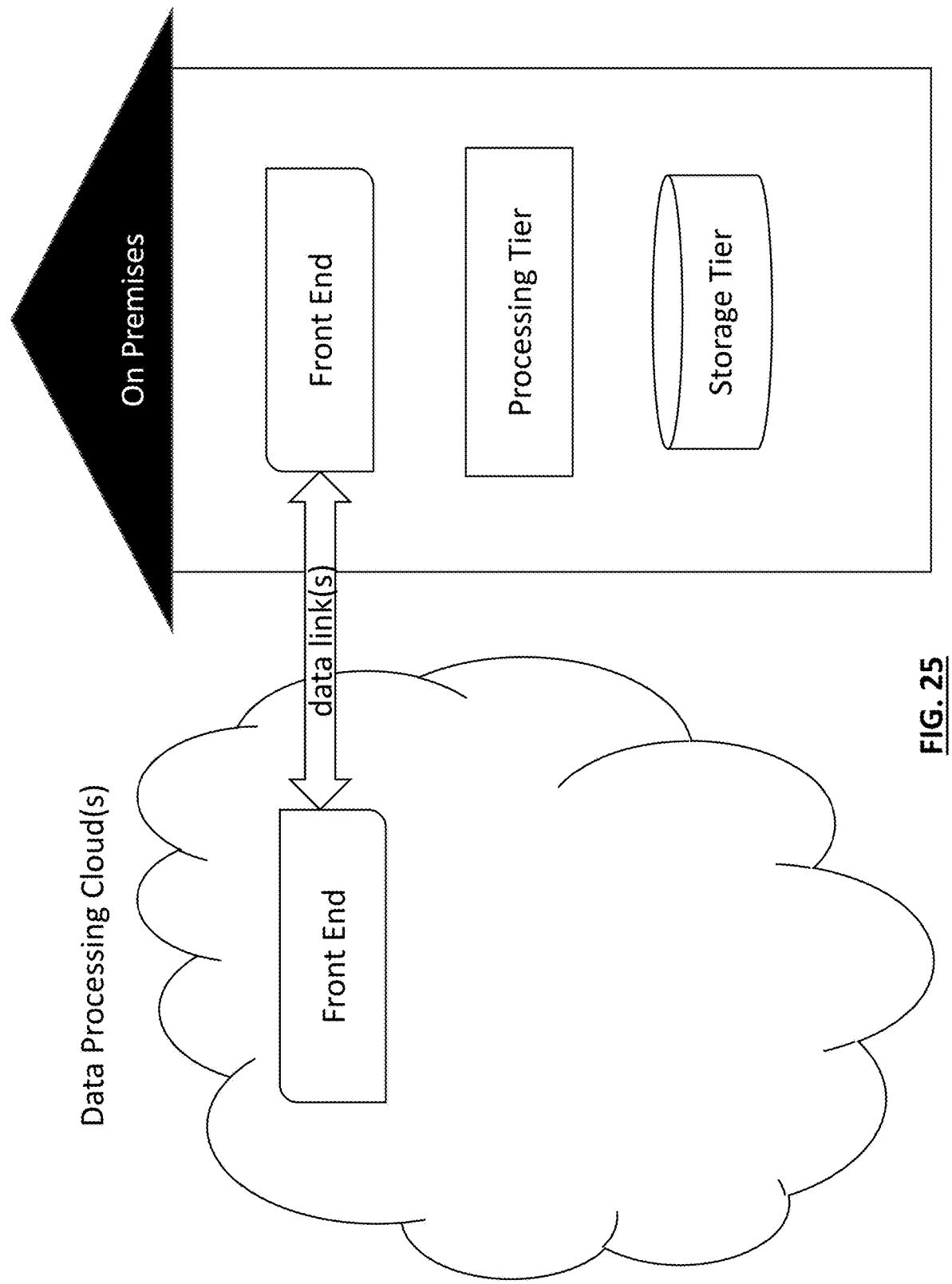
FIG. 25 depicts an exemplary embodiment in which the Front End is provisioned partly in a Data Processing Cloud and partly On Premises, and the Processing and Storage Tiers are provisioned On Premises.
Figure 26:
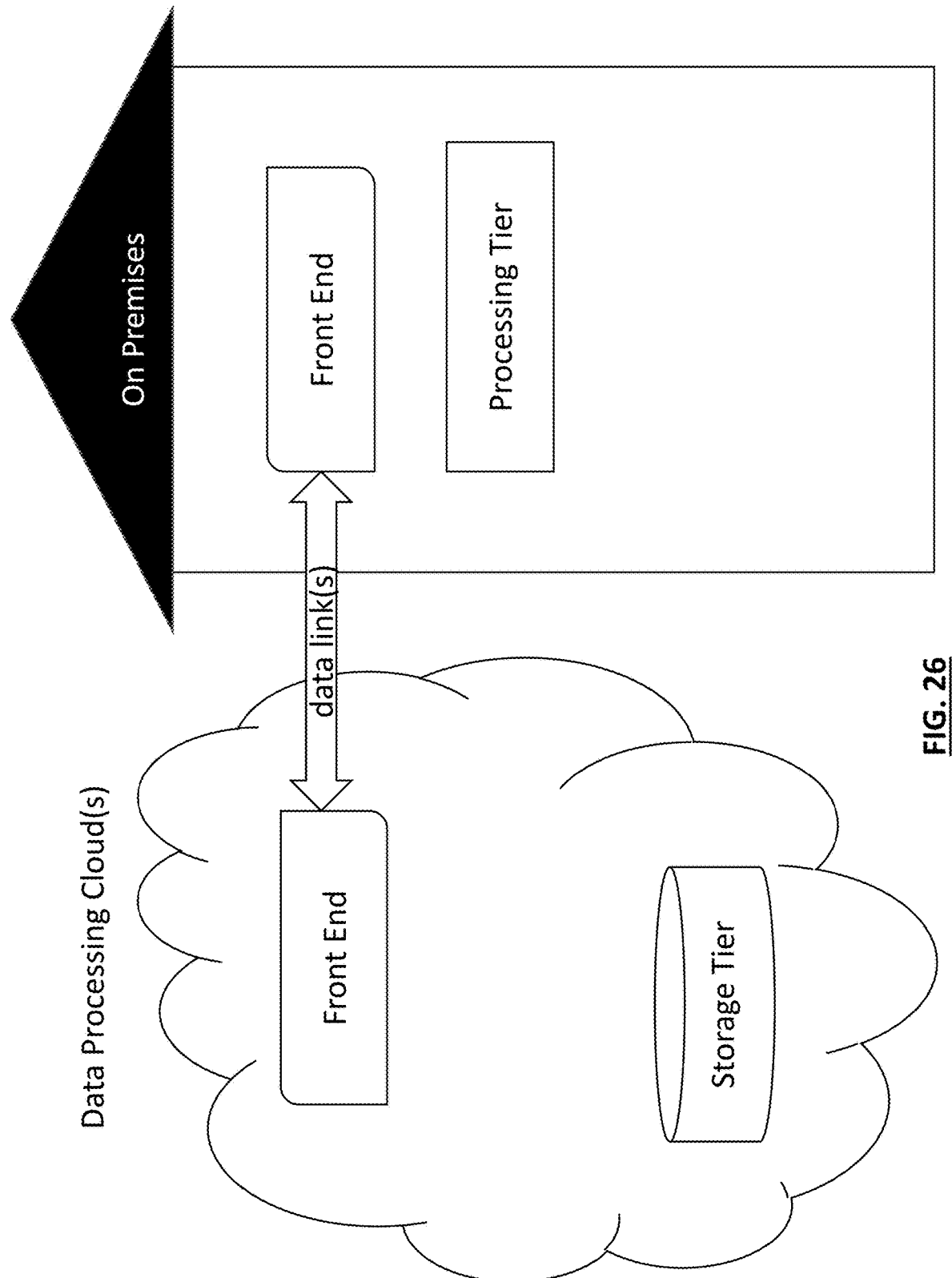
FIG. 26 depicts an exemplary embodiment in which the Front End is provisioned partly in a Data Processing Cloud and partly On Premises, the Processing Tier is provisioned On Premises, and the Storage Tier is provisioned in a Data Processing Cloud.
Figure 27:
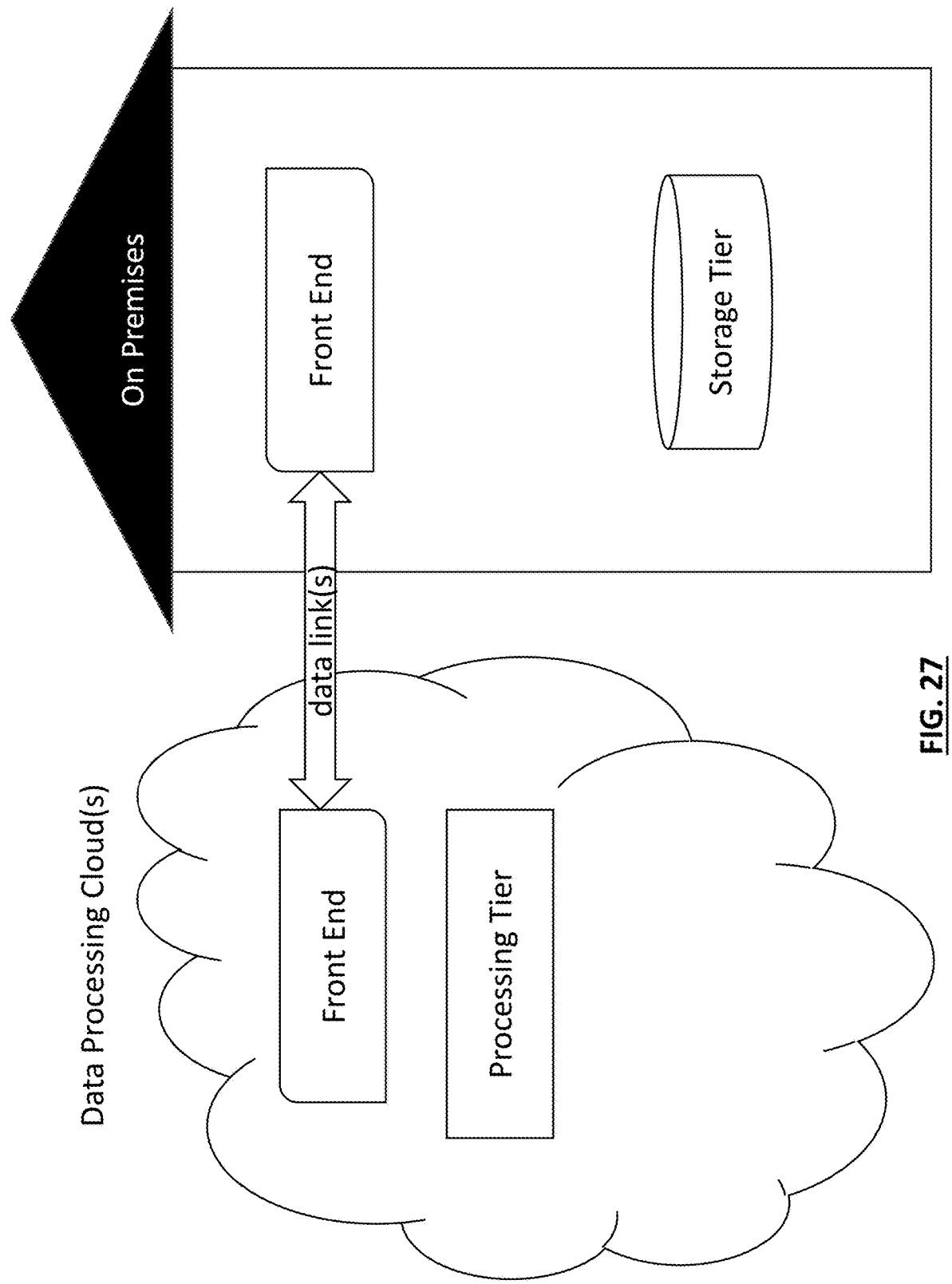
FIG. 27 depicts an exemplary embodiment in which the Front End is provisioned partly in a Data Processing Cloud and partly On Premises, the Storage Tier is provisioned On Premises, and the Processing Tier is provisioned in a Data Processing Cloud.
Figure 28:
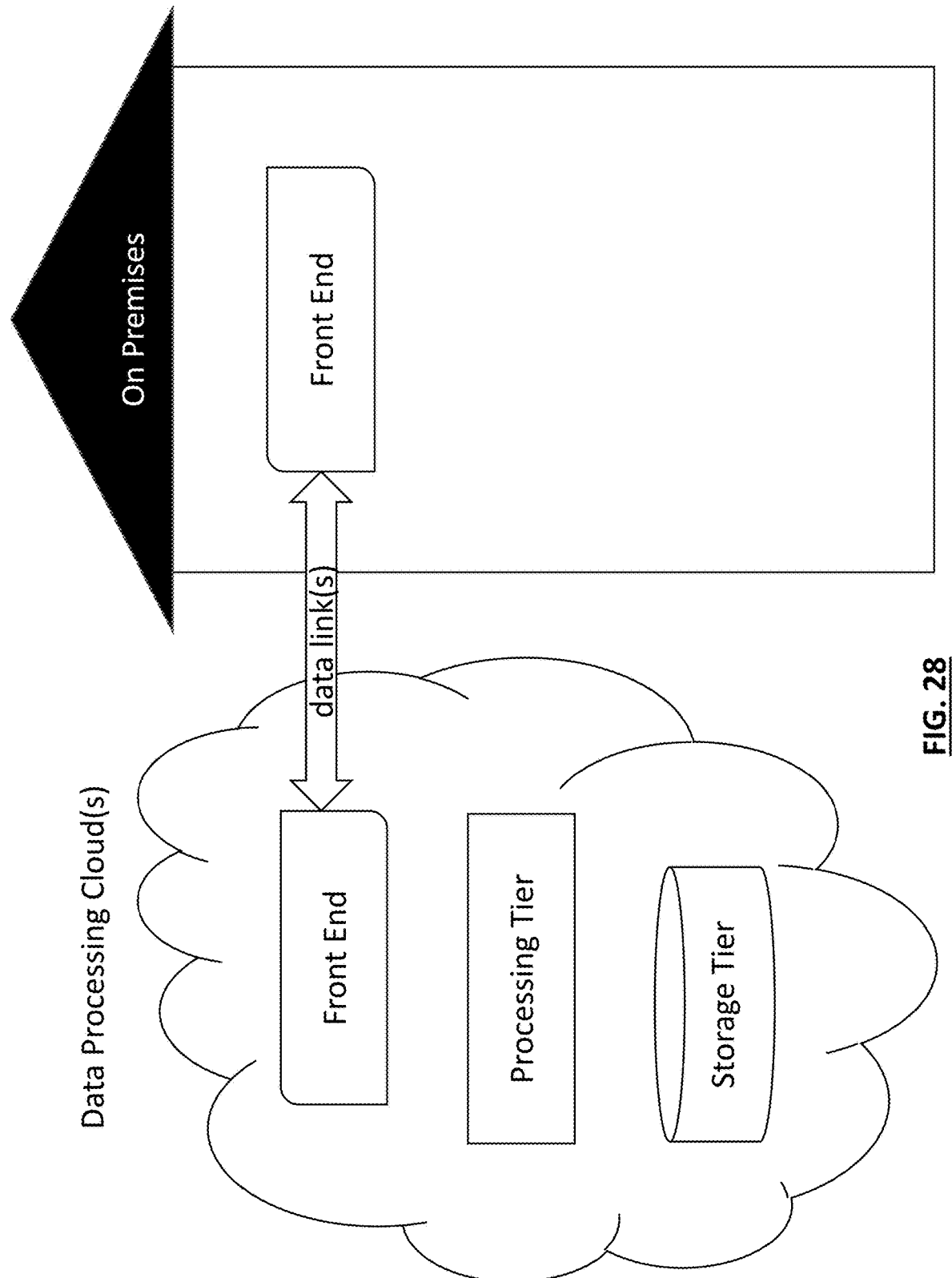
FIG. 28 depicts an exemplary embodiment in which the Front End is provisioned partly in a Data Processing Cloud and partly On Premises, and the Processing and Storage Tiers are provisioned in Data Processing Cloud(s)
Figure 29:
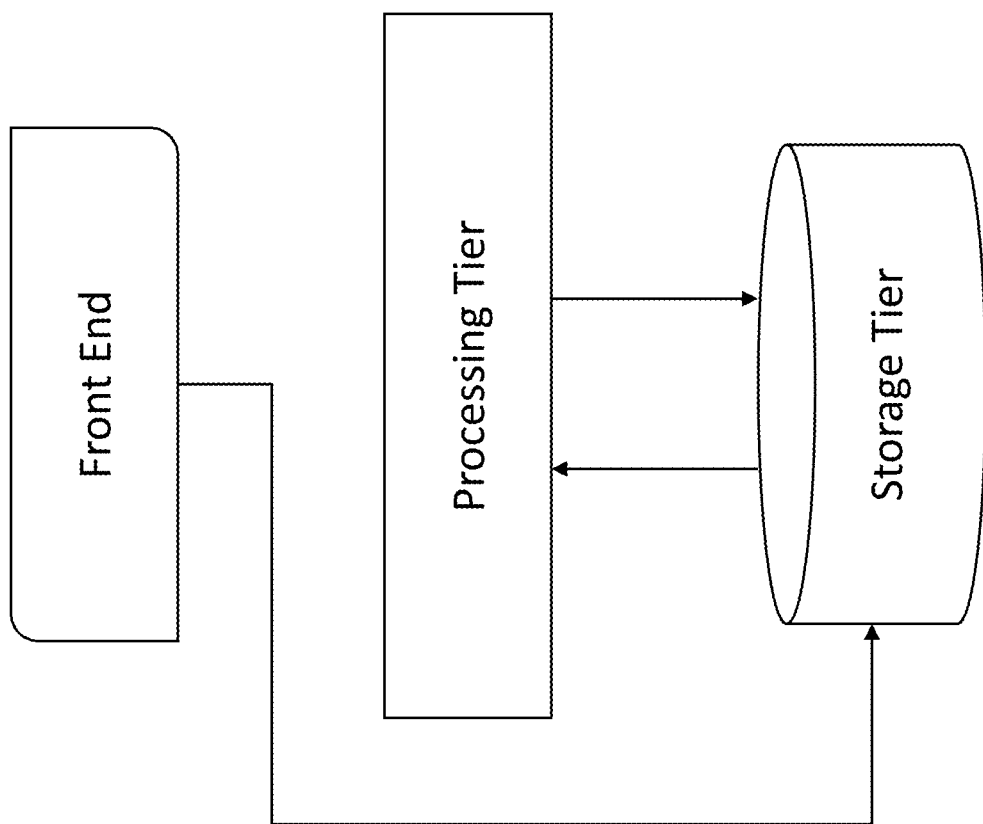
FIGS. 29-31 show three examples of possible data flows between the Front End, Processing Tier, and Storage Tier, in accordance with the various exemplary embodiments herein.
Figure 30:
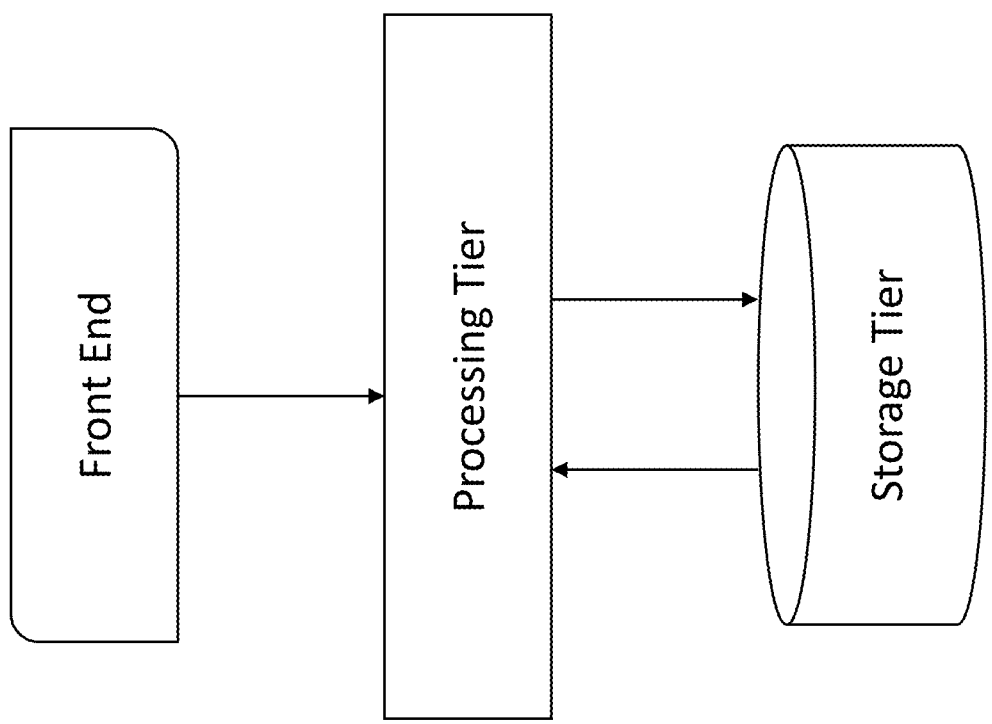
Figure 31:
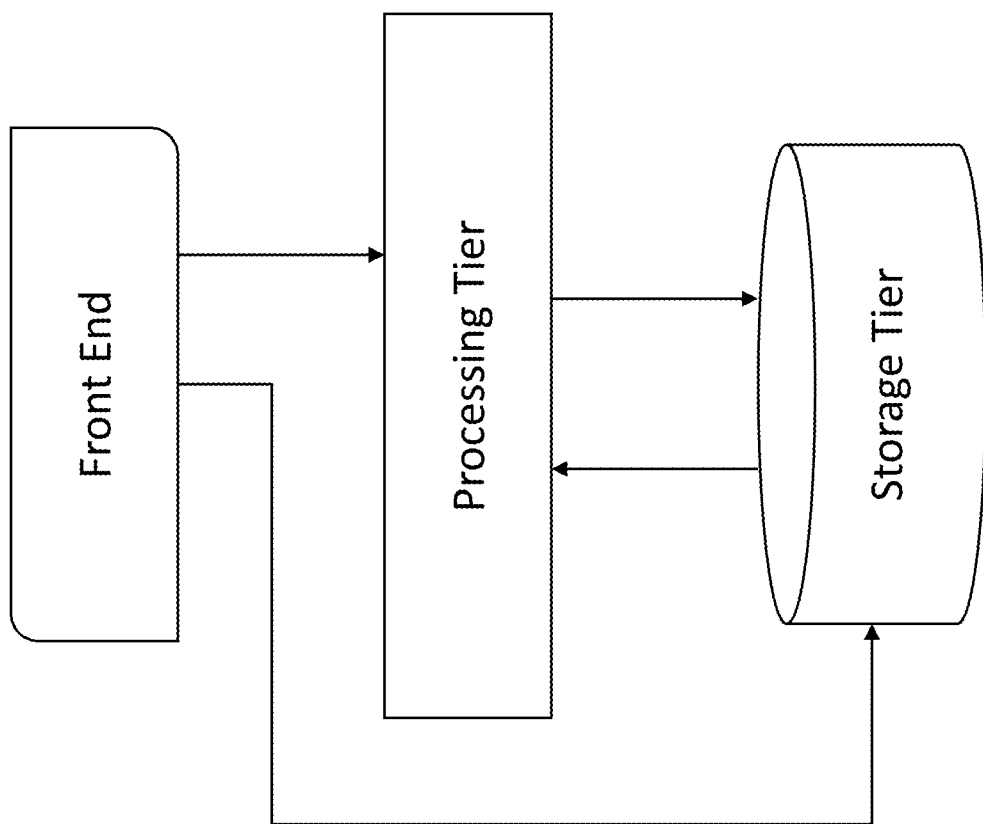
Figure 32:
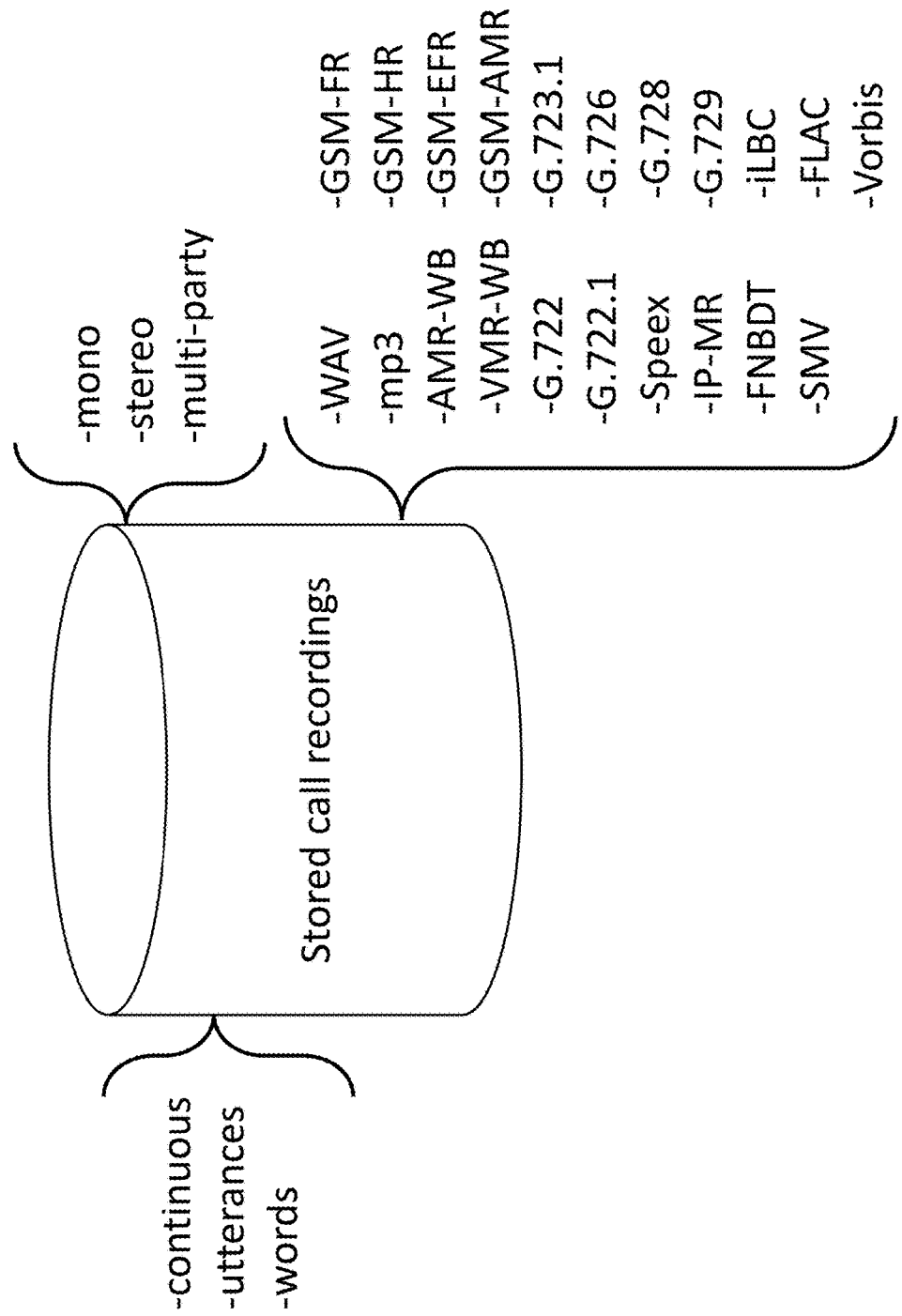
FIG. 32 depicts a stored call database, in accordance with certain exemplary embodiments herein.
Figure 33:
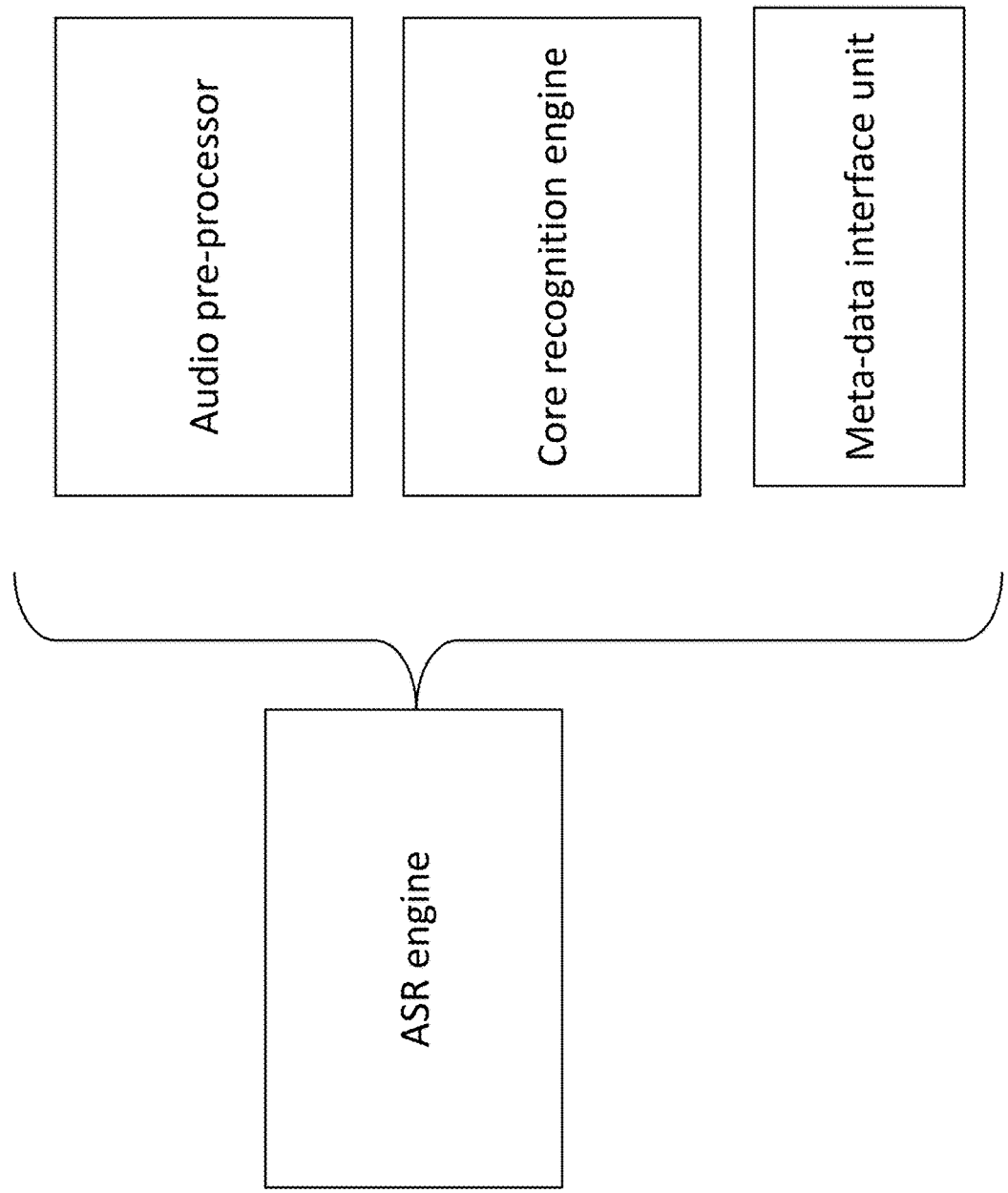
FIG. 33 depicts a block diagram of an ASR engine, in accordance with certain exemplary embodiments herein.
Figure 34:
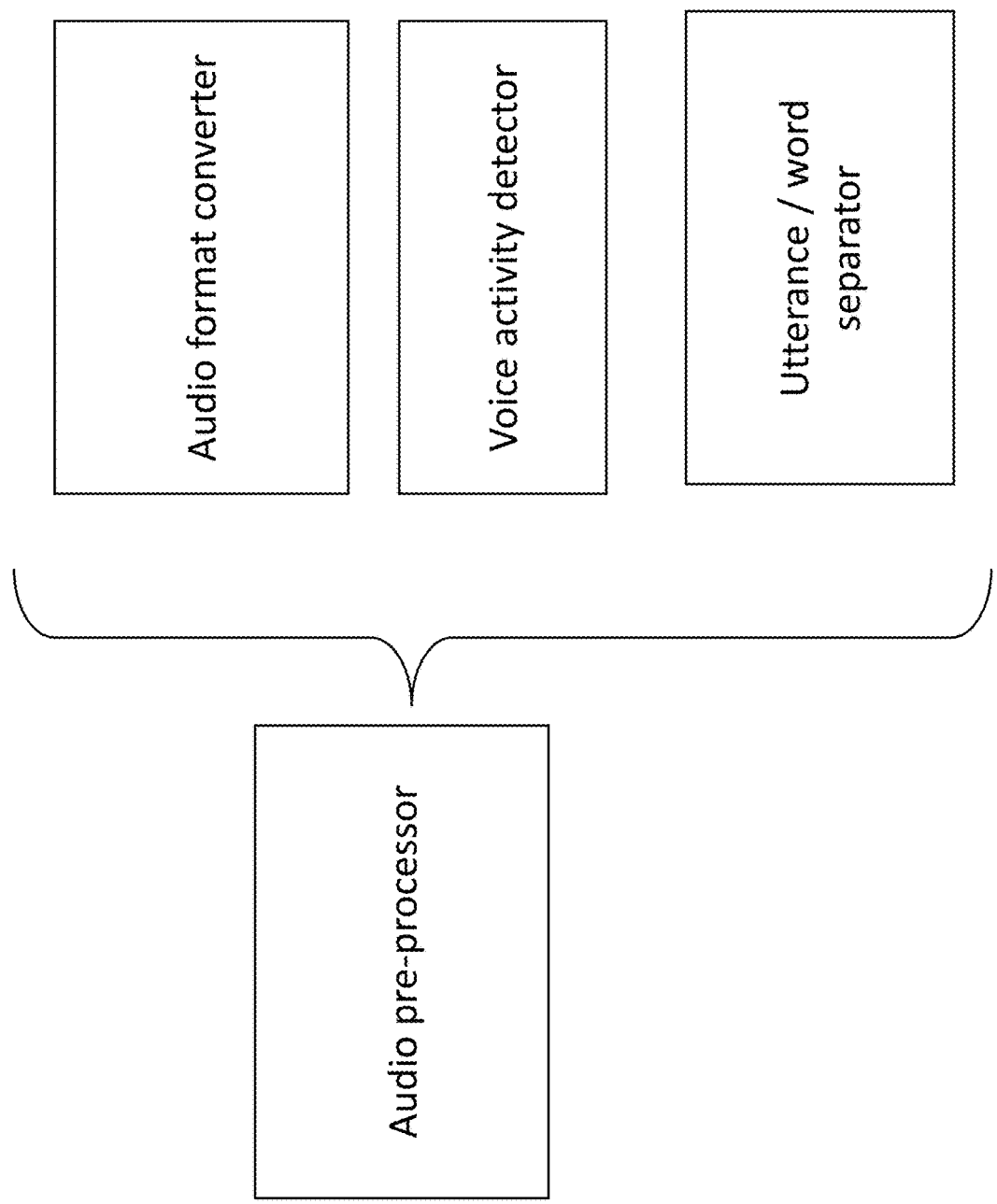
FIG. 34 depicts a block diagram of an audio pre-processor, in accordance with certain exemplary embodiments herein.
Figure 35:
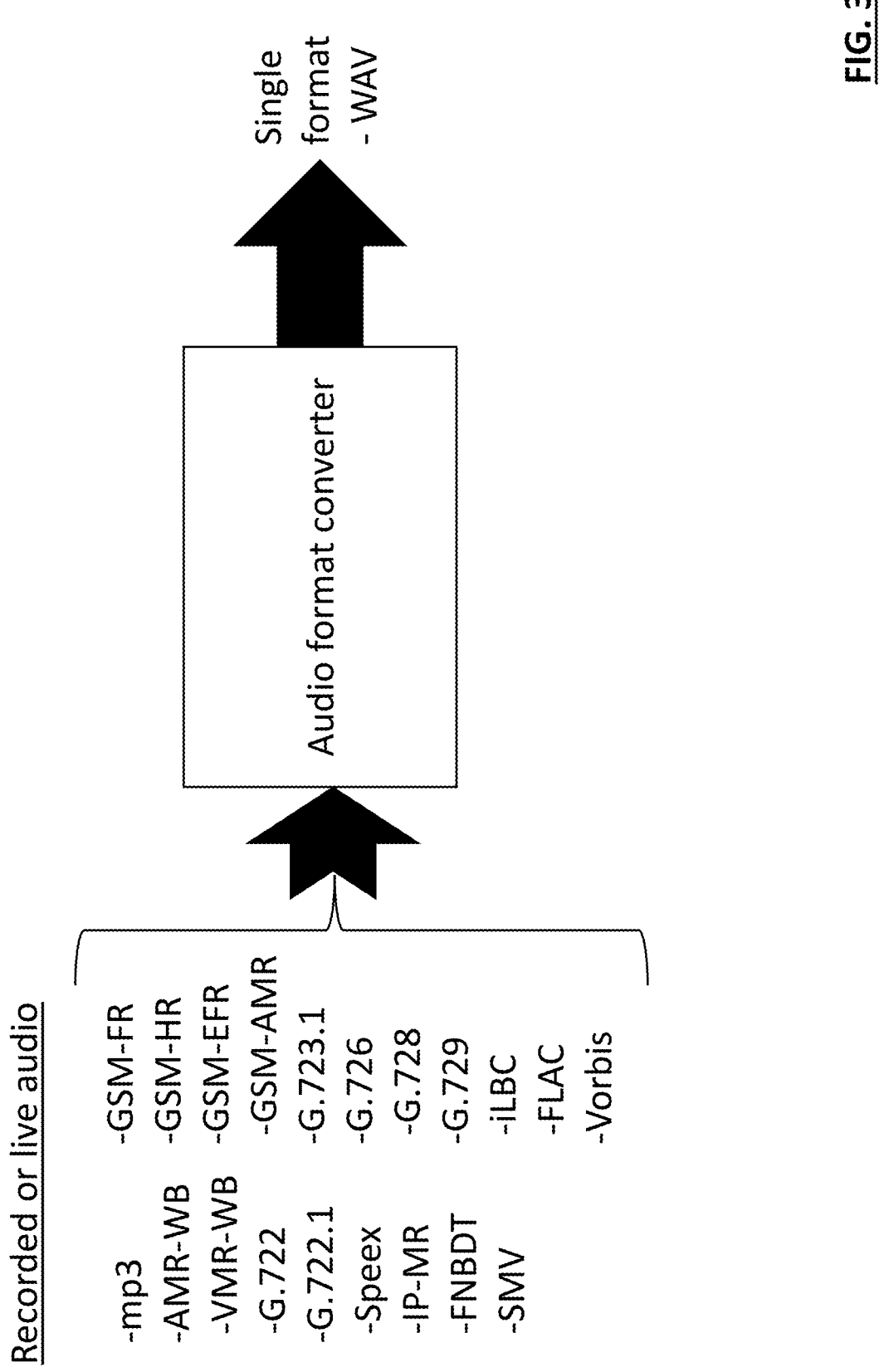
FIG. 35 depicts the operation of an audio format converter (or transcoder), in accordance with certain exemplary embodiments herein.
Figure 36:
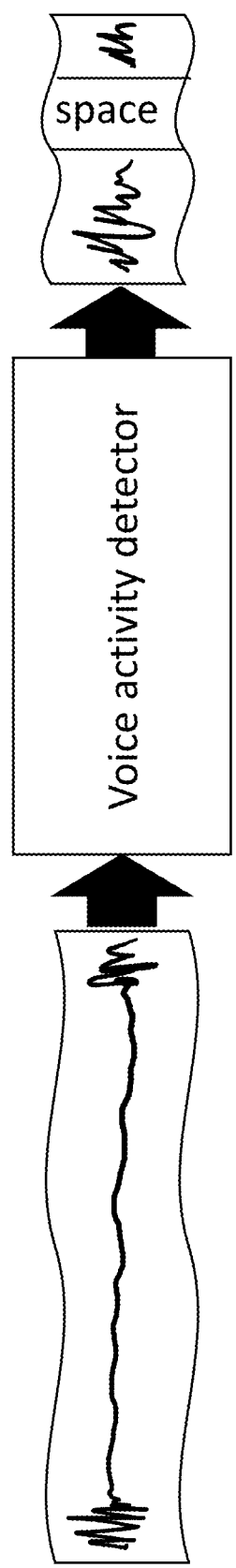
FIG. 36 depicts the operation of a voice activity detector (VAD), in accordance with certain exemplary embodiments herein.
Figure 37:
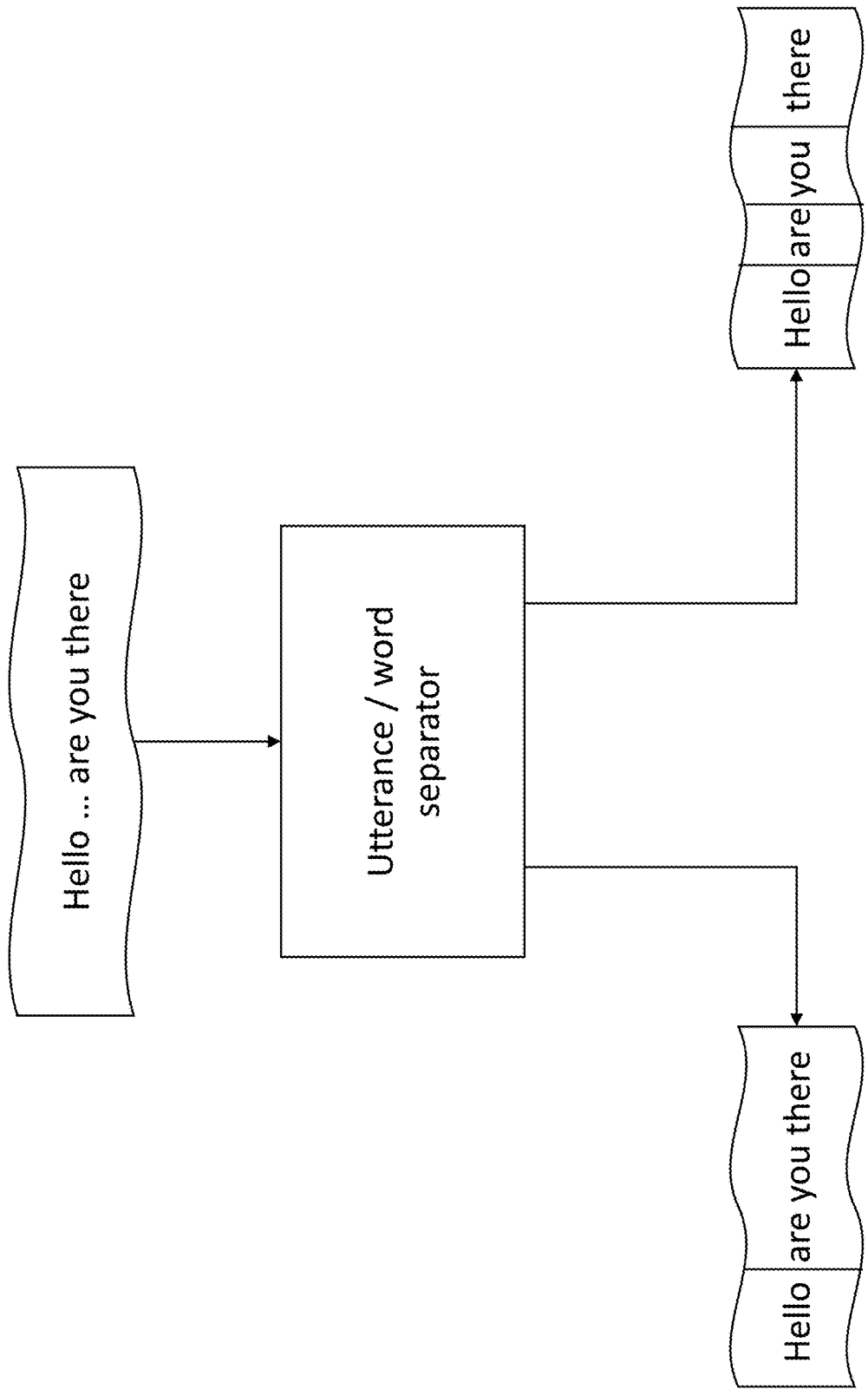
FIG. 37 depicts the operation of a word/utterance separator, in accordance with certain exemplary embodiments herein.
Figure 38:
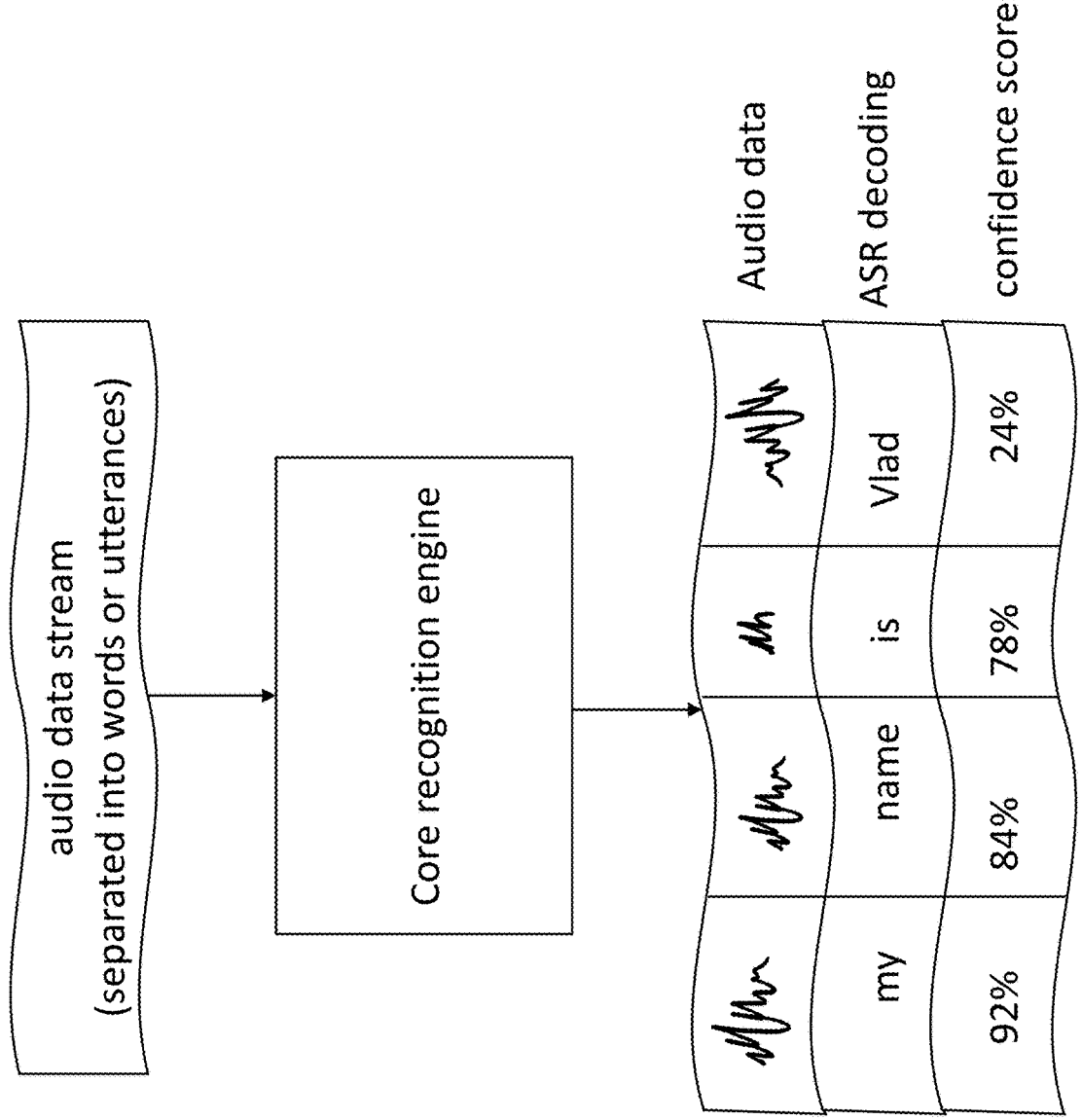
FIG. 38 depicts the operation of an ASR engine, in accordance with certain exemplary embodiments herein.
Figure 39:
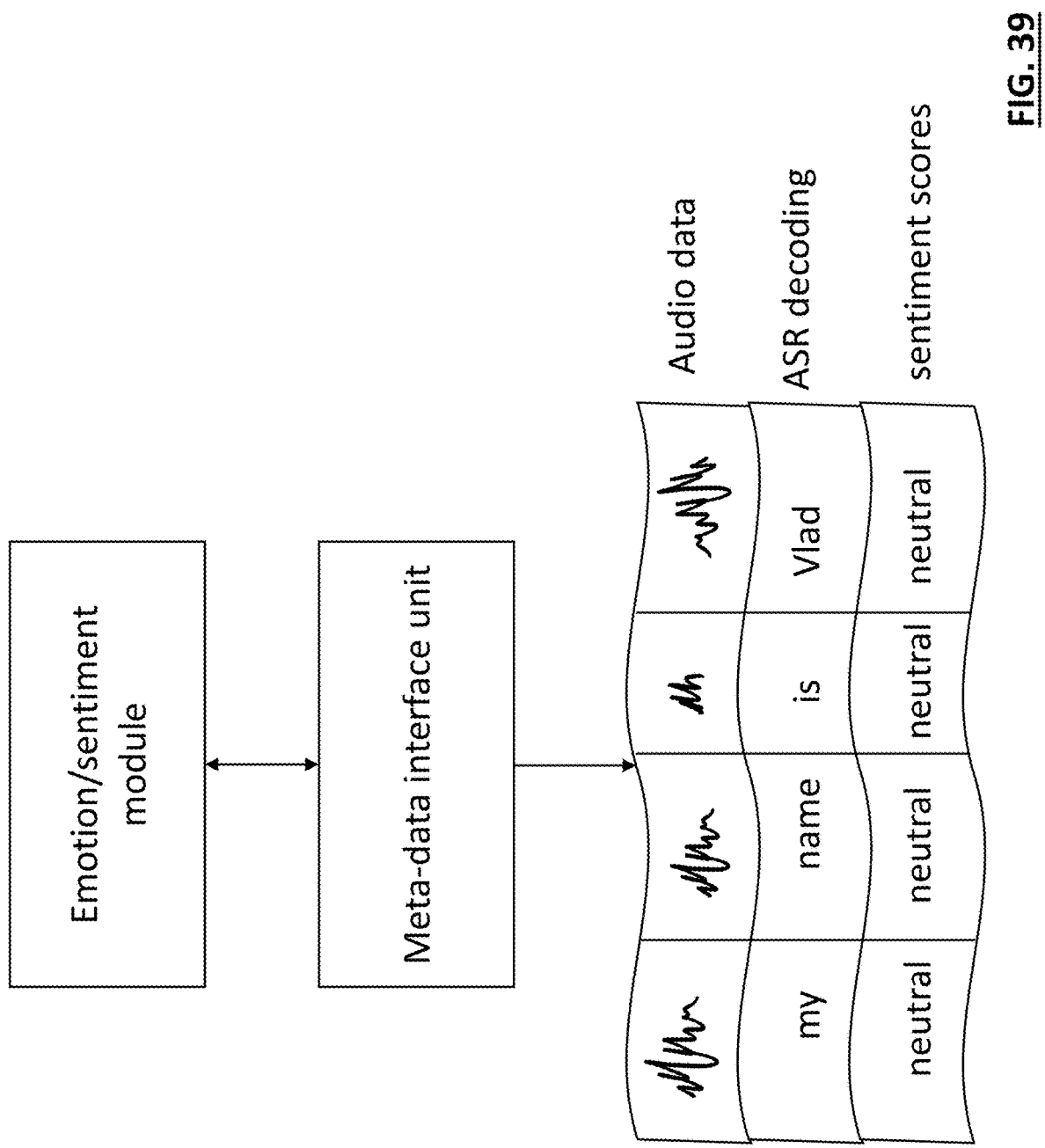
FIG. 39 depicts the operation of an emotion/sentiment module, in accordance with certain exemplary embodiments herein.
Figure 40:
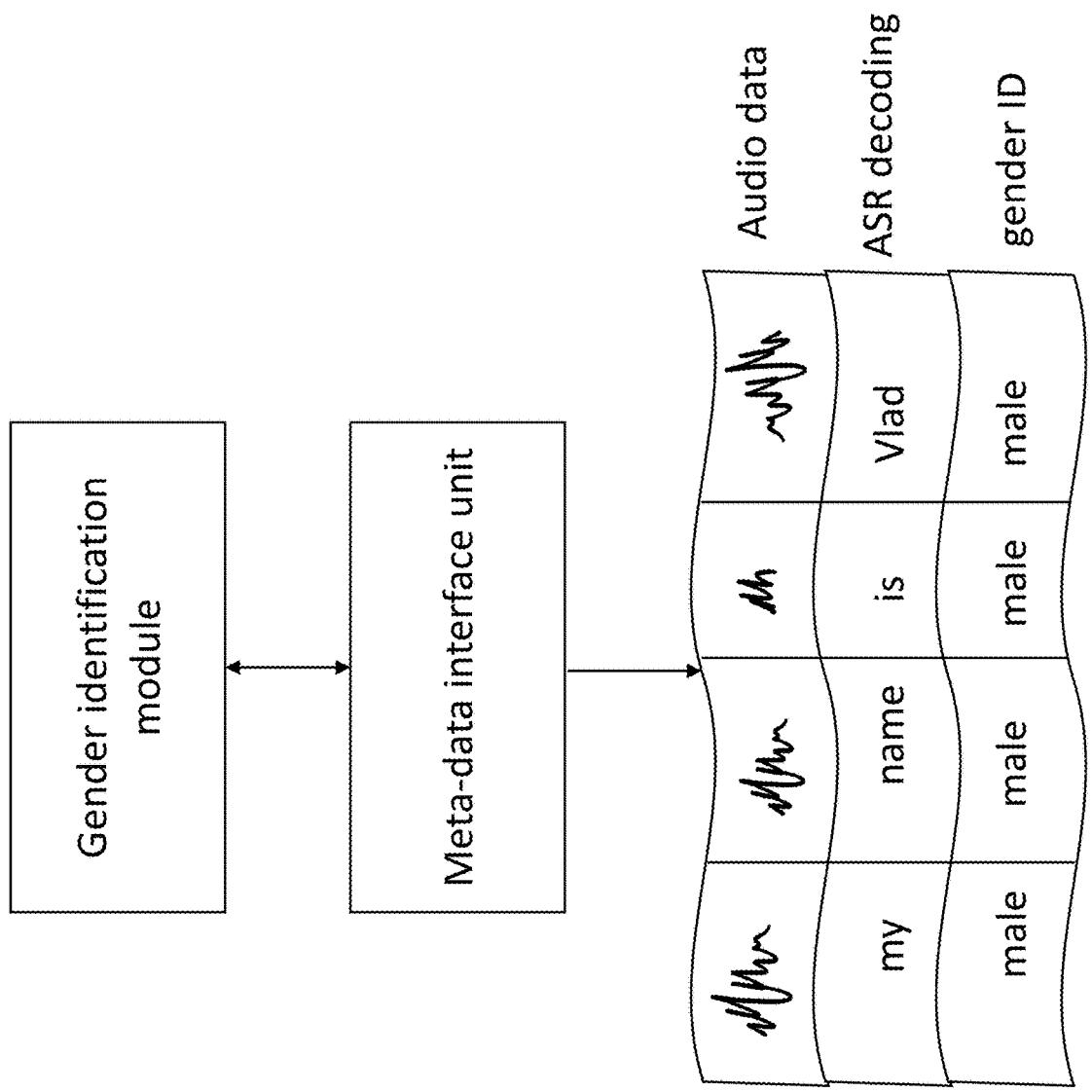
FIG. 40 depicts the operation of a gender identification module, in accordance with certain exemplary embodiments herein.
Figure 41:
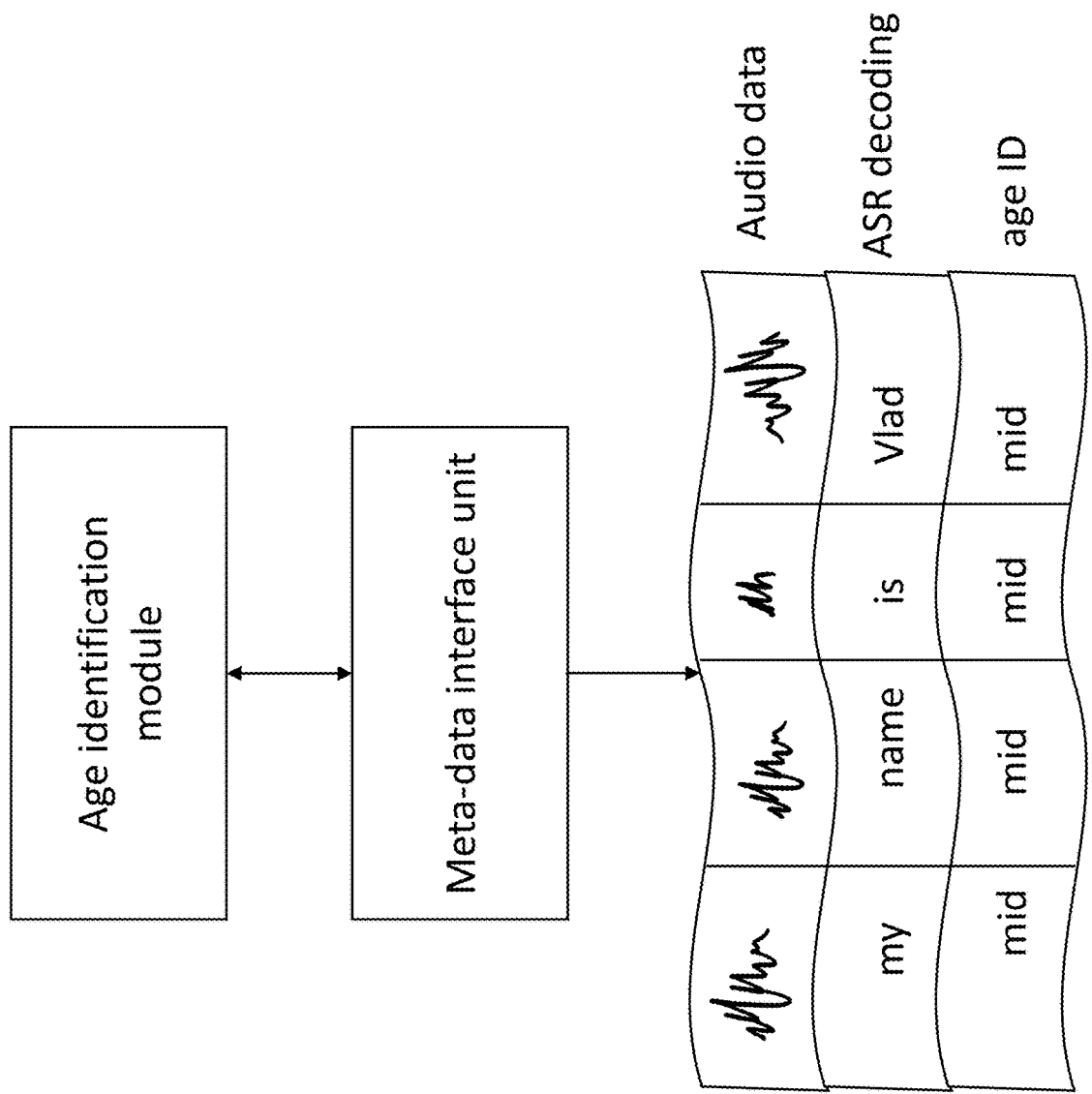
FIG. 41 depicts the operation of an age identification module, in accordance with certain exemplary embodiments herein.
Figure 42:
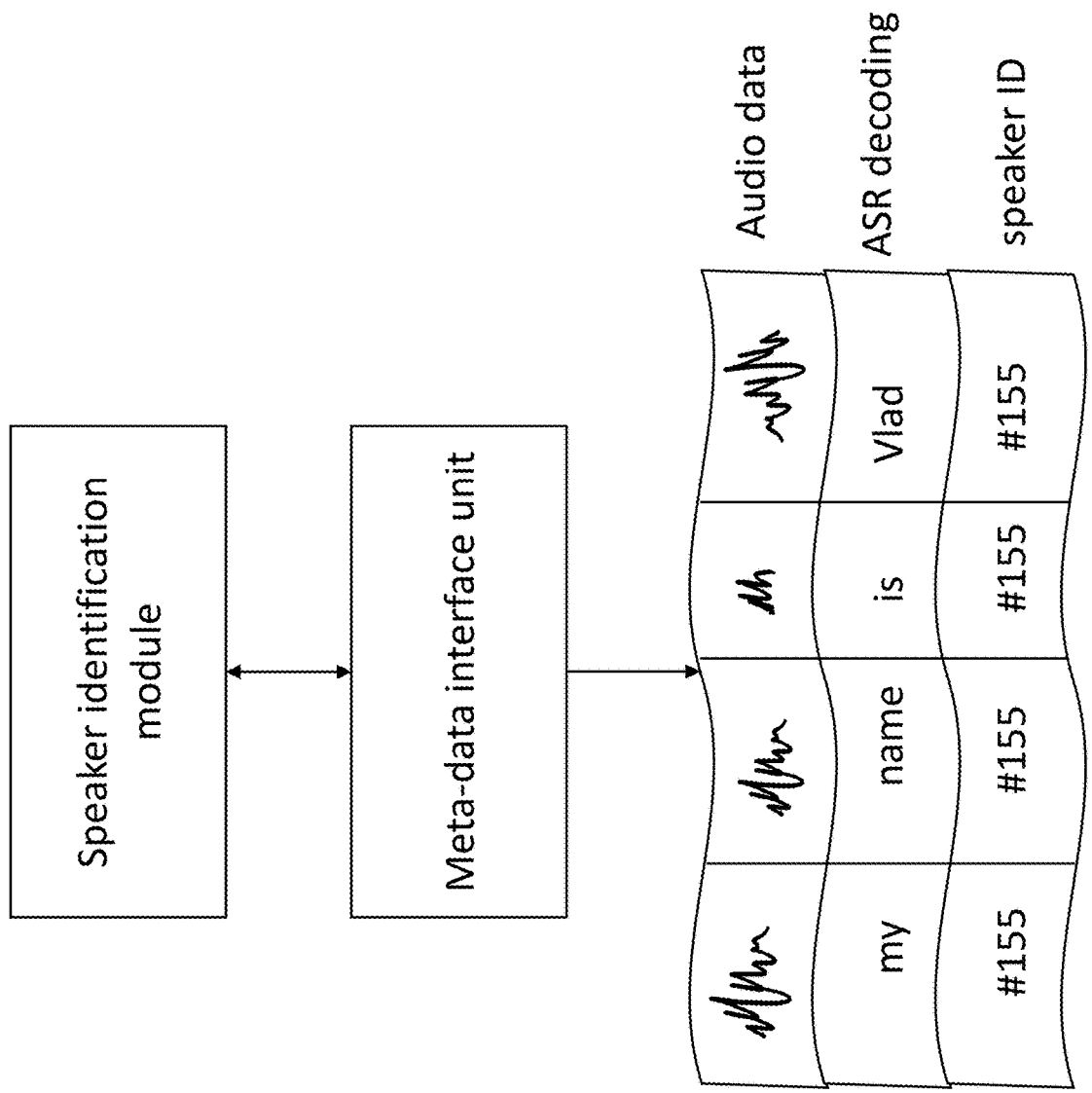
FIG. 42 depicts the operation of a speaker identification module, in accordance with certain exemplary embodiments herein.
Figure 43:
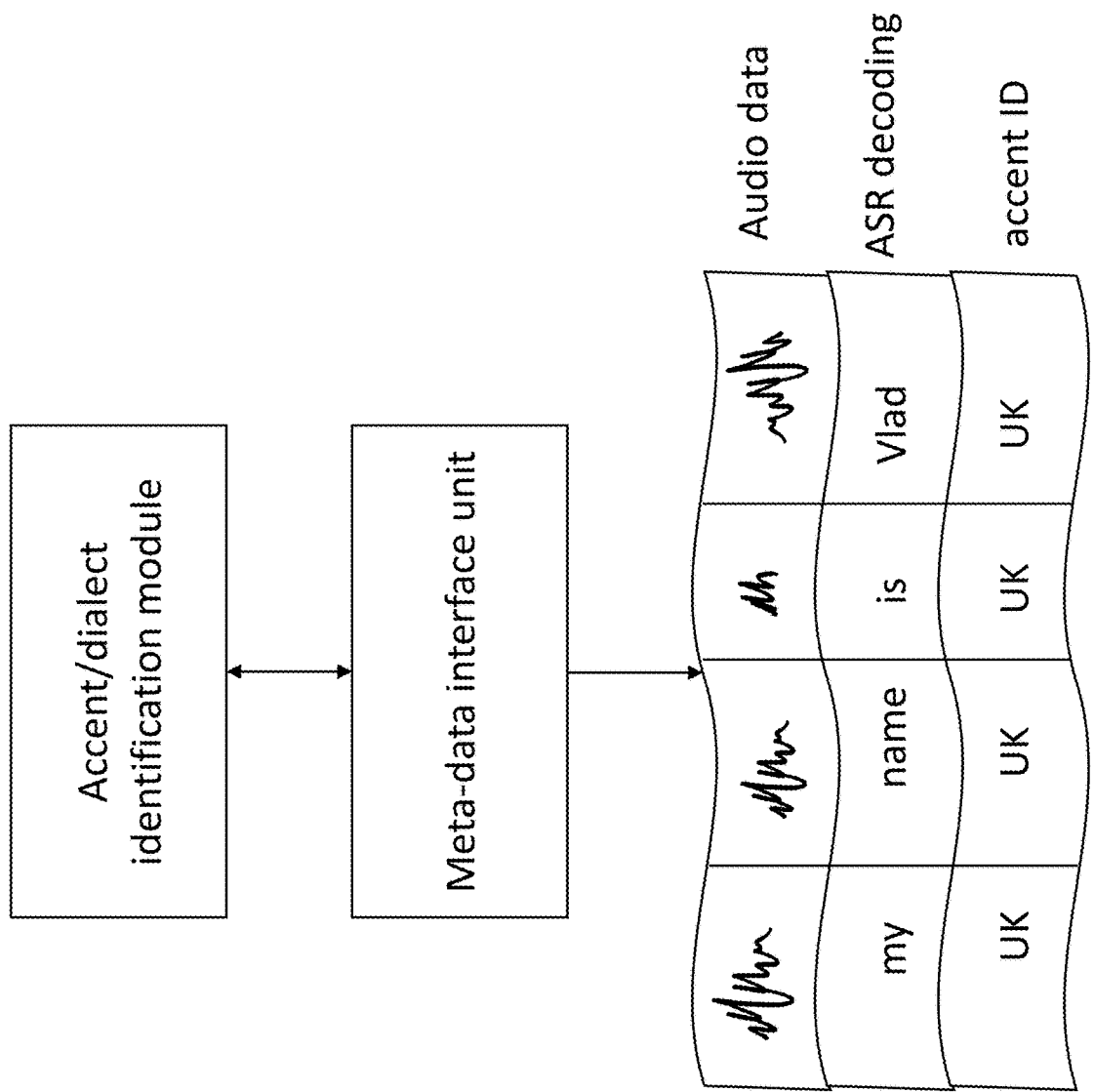
FIG. 43 depicts the operation of an accent identification module, in accordance with certain exemplary embodiments herein.
Figure 45:
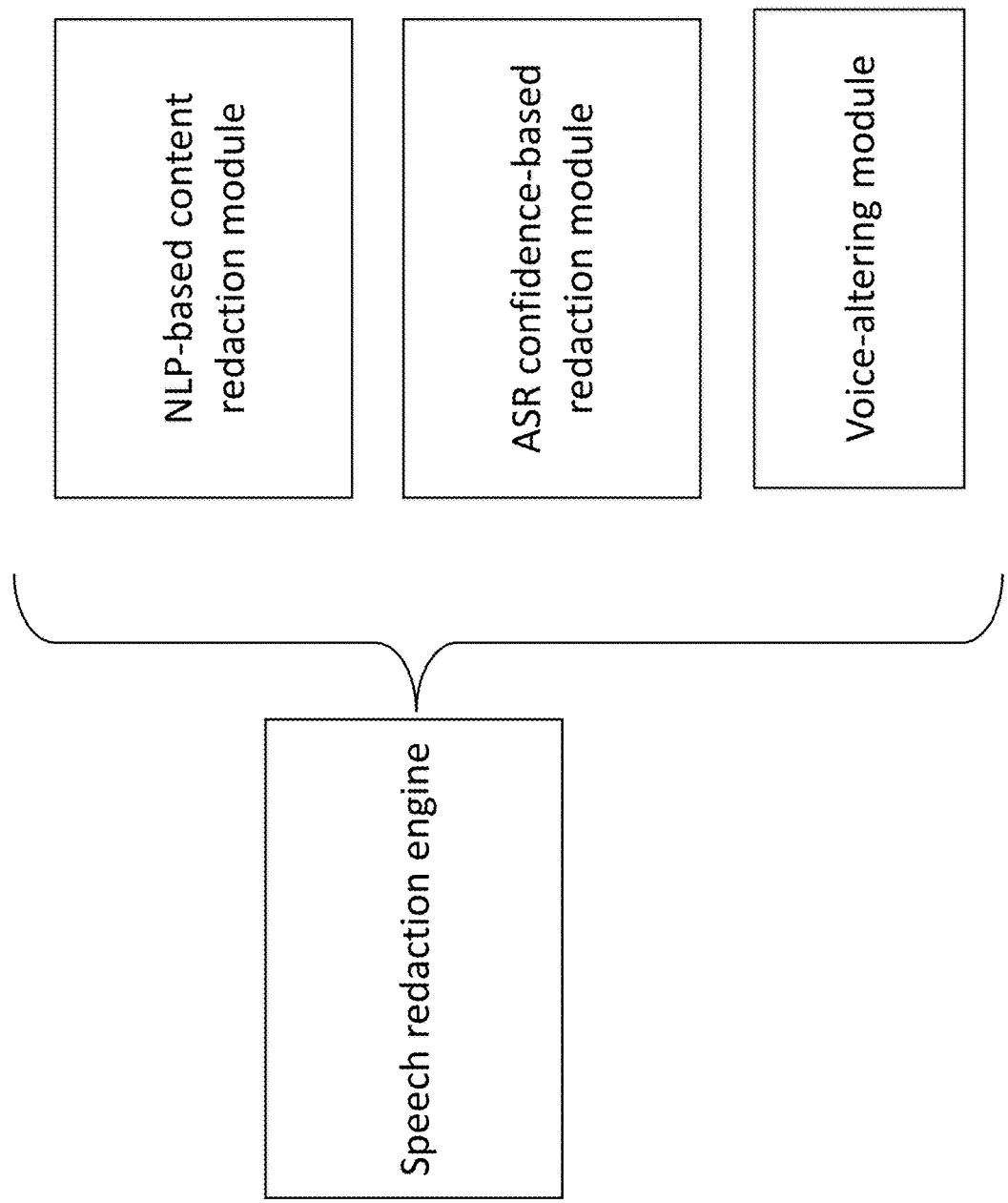
FIG. 45 contains a block diagram of a speech redaction engine, in accordance with certain exemplary embodiments herein.

Reference is now made to FIGS. 29-31, which show three examples of possible data flows between the Front End, Processing Tier, and Storage Tier, in accordance with the various exemplary embodiments herein. While the arrows depict the directionality of "data" transfers (such as audio data, text, meta-data, etc.), it will be understood that there will or may exist additional signaling and control flows that may simultaneously operate in other directions or between other components. For example, in FIG. 29, data flow from the Front End to the Storage Tier is indicated as one way; however, those skilled in the art will appreciate that there will likely be some signaling channel or pathway that, for example, permits the Storage Tier to signal its readiness to receive data to the Storage Tier.

FIG. 29 depicts an exemplary embodiment in which data is collected by or originates in the Front End, is then "sent" or "routed"—by, for example, a push protocol (see, e.g., https://en.wikipedia.org/wiki/Push_technology, incorporated by reference herein) or a pull/get protocol (see e.g., https://en.wikipedia.org/wiki/Pull_technology, incorporated by reference herein)—to the Storage Tier. Data is then sent from the Storage Tier to the Processing Tier for processing, with the processed data sent back to the Storage Tier for storage/archiving. This embodiment also permits data that already exists in the Storage Tier, or is sent there through other network connections, to be routed to the Processing Tier for processing and sent back for storage/archiving.

FIG. 30 depicts an exemplary embodiment in which data is collected by or originates in the Front End, is then sent directly to the Processing Tier for processing, and then sent to the Storage Tier for storage/archiving. Such direct data transfer from the Front End to the Processing Tier reduces latency, which is important in the case of systems that have "real time" monitoring or alerting aspects. This embodiment also permits data that already exists in the Storage Tier, or is sent there through other network connections, to be routed to the Processing Tier for processing and sent back for storage/archiving. Additionally, though not depicted in FIG. 30, "real time" systems may interact directly with the Processing Tier to receive processed data without the additional latency associated with the Storage Tier.

FIG. 31 depicts a "hybrid" embodiment, in which data is collected by or originates in the Front End, some or all of which may be then sent directly to the Processing Tier for processing, then sent to the Storage Tier for storage/archiving, and some or all of which may also be sent to the Storage Tier, from which it is then sent to the Processing Tier for processing, with the processed data sent back to the Storage Tier for storage/archiving. This permits use of the direct data routing approach for "real time" audio feeds, and lower cost "batch mode" processing for other data feeds, which can be processed during time(s) when power and cloud resources are cheaper, for example.

Figure 46:
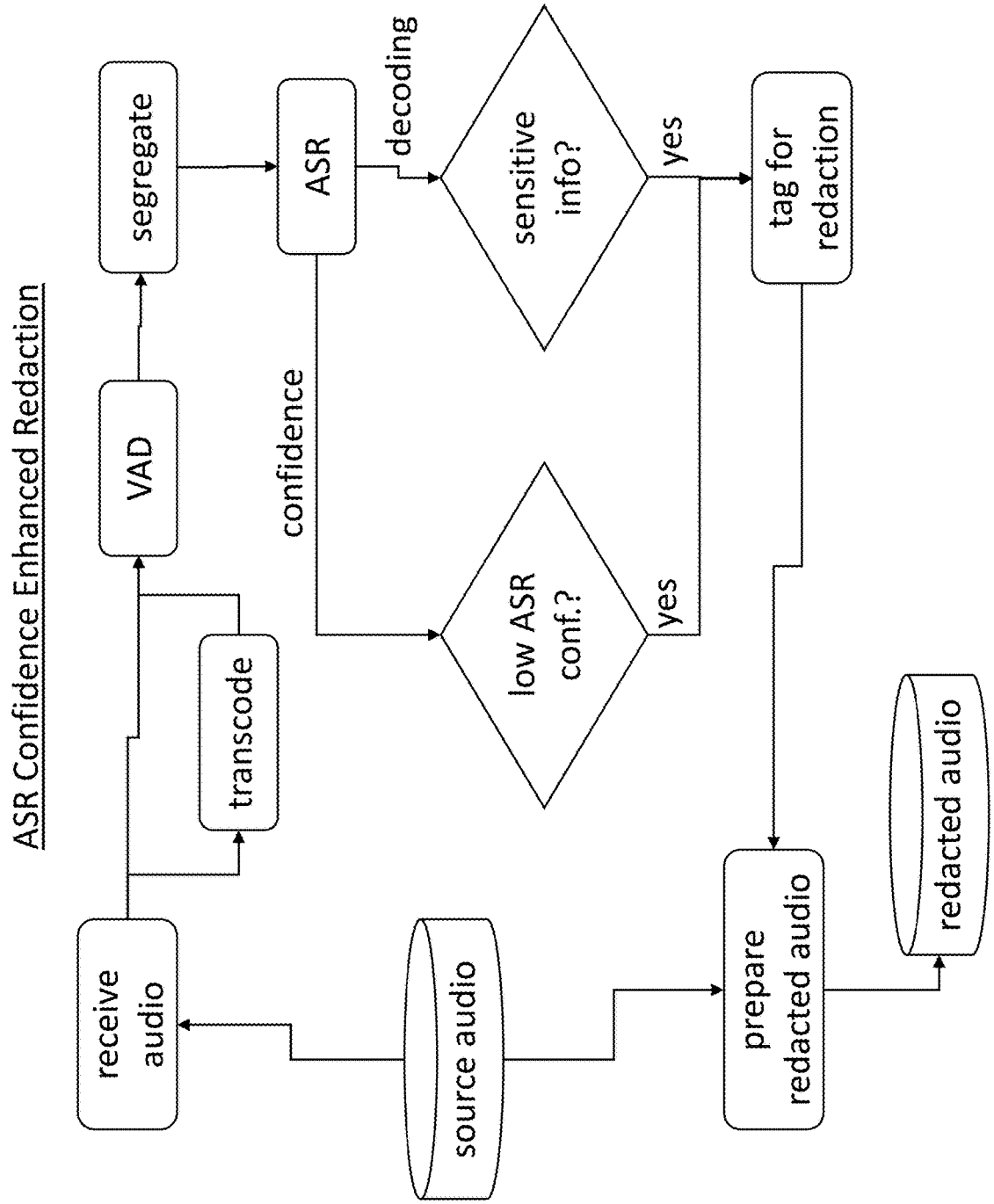
FIG. 46 depicts a first enhanced redaction flow, in accordance with one of the exemplary embodiments herein.
Figure 47:
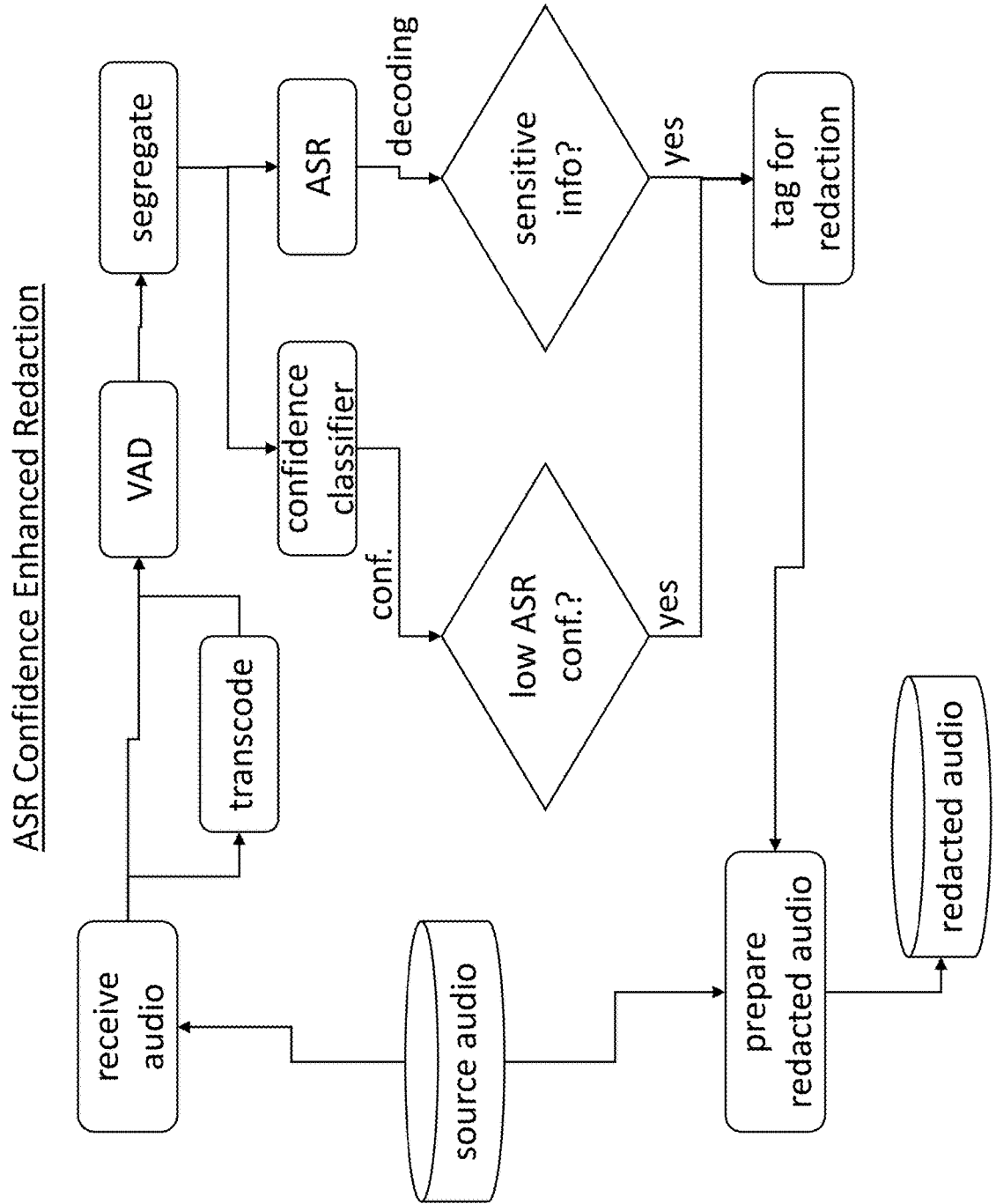
FIG. 47 depicts a second enhanced redaction flow, in accordance with another of the exemplary embodiments herein.
Figure 48:
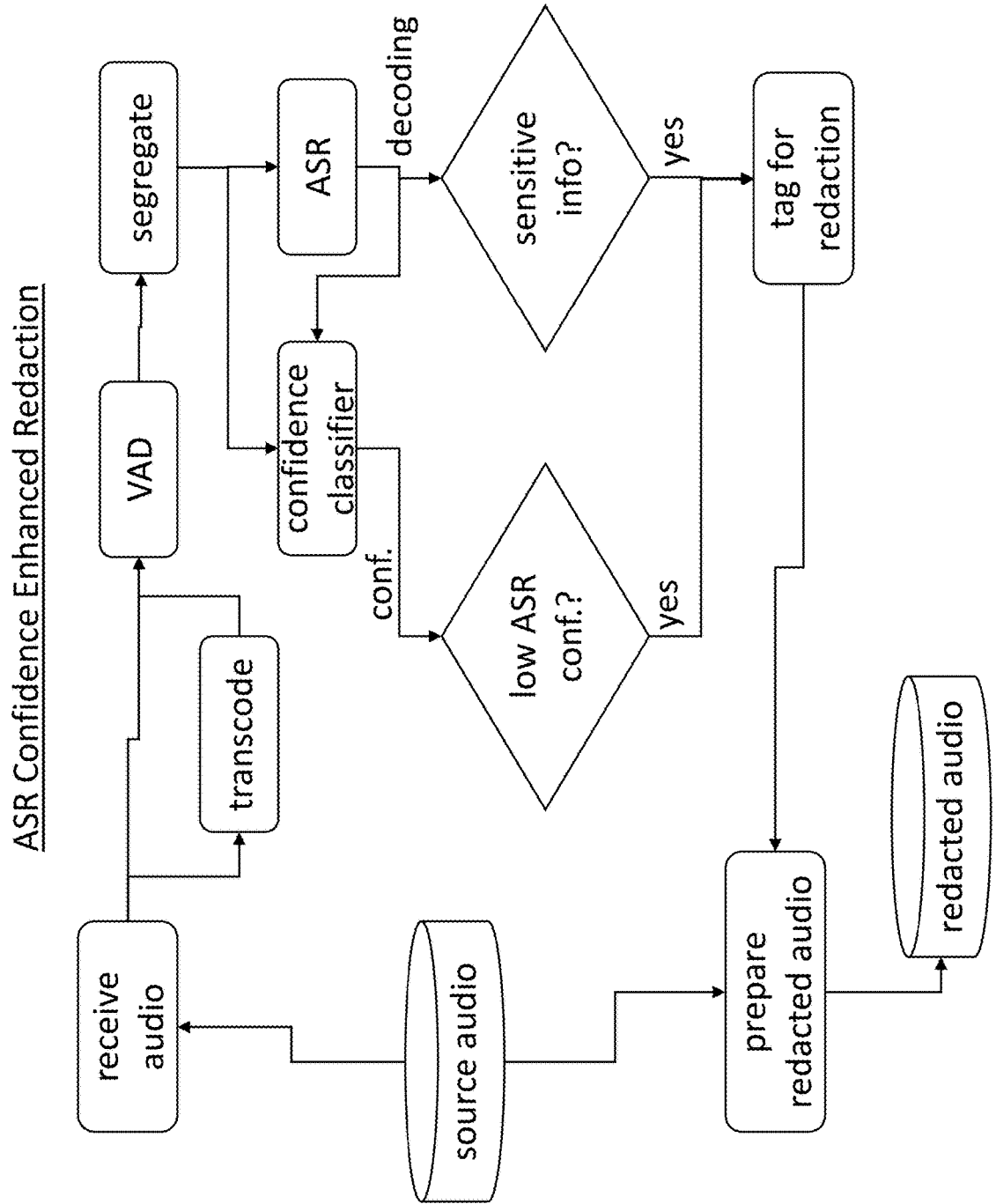
FIG. 48 depicts a third enhanced redaction flow, in accordance with another of the exemplary embodiments herein.
Figure 49:
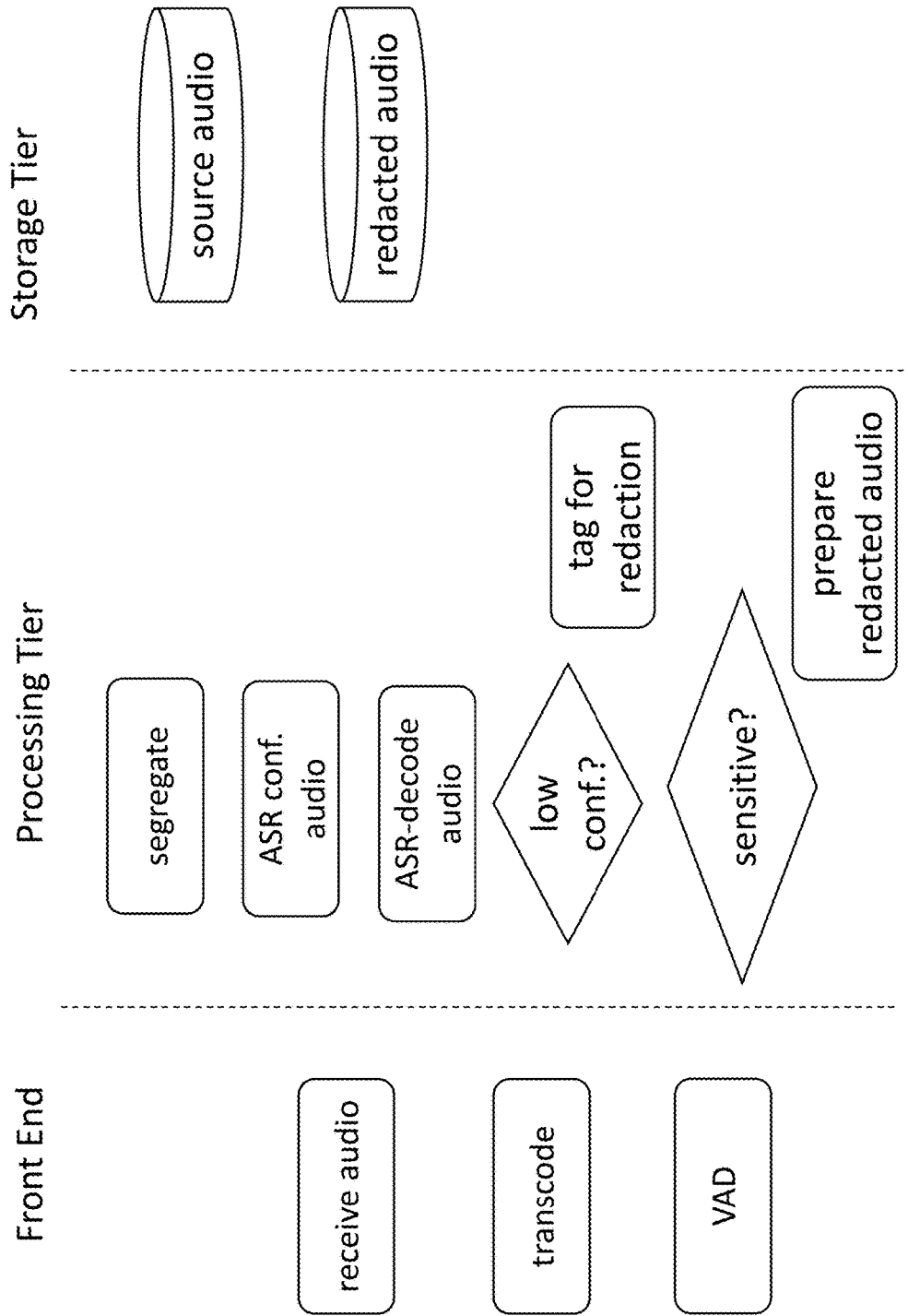
FIG. 49 depicts a first exemplary assignment of the enhanced redaction flow elements (of FIGS. 46-48) between the Front End, Processing, and Storage Tiers, in accordance with certain exemplary embodiments herein.
Figure 50:
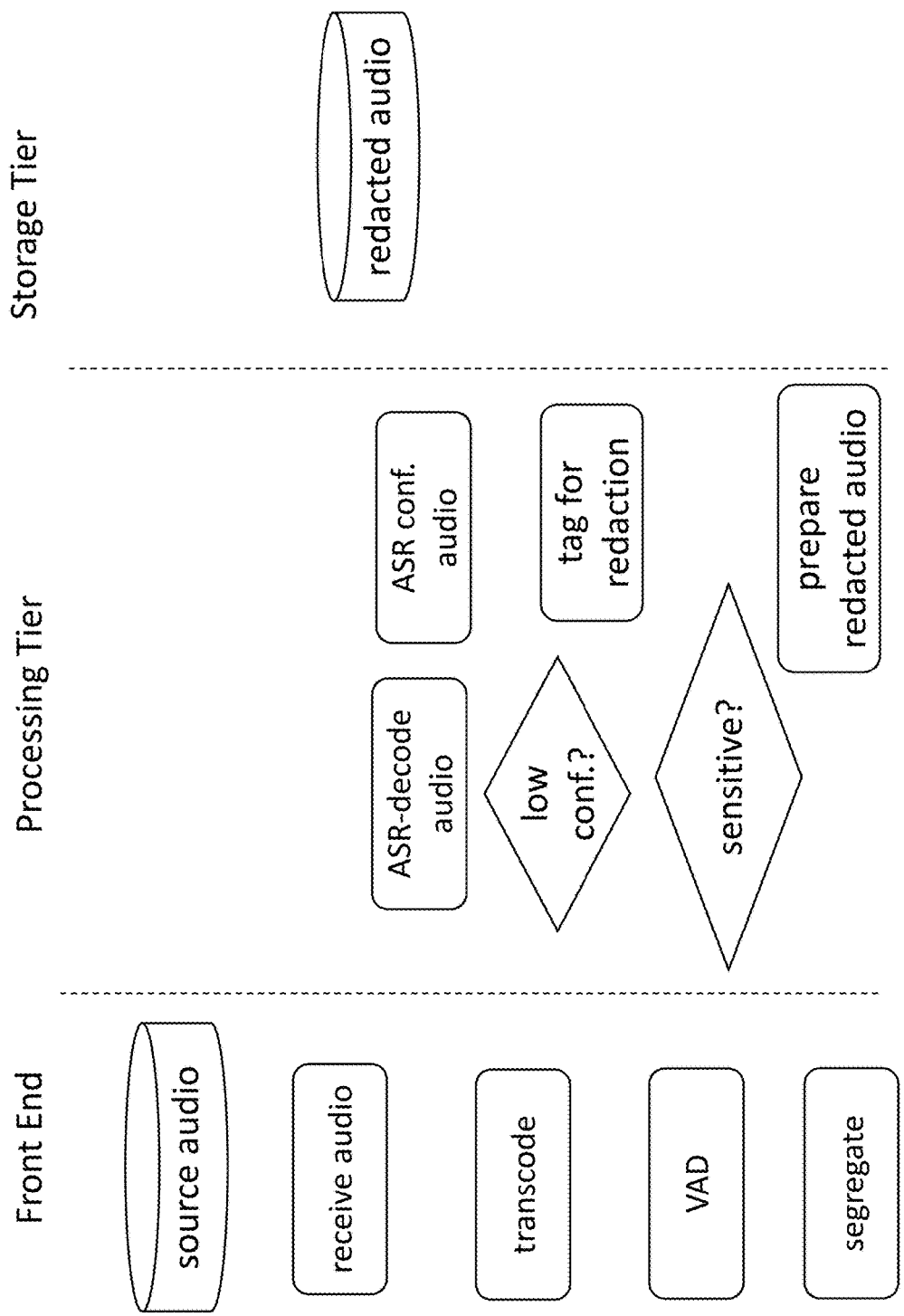
FIG. 50 depicts a second exemplary assignment of the enhanced redaction flow elements between the Front End, Processing, and Storage Tiers, in accordance with certain exemplary embodiments herein.
Figure 51:
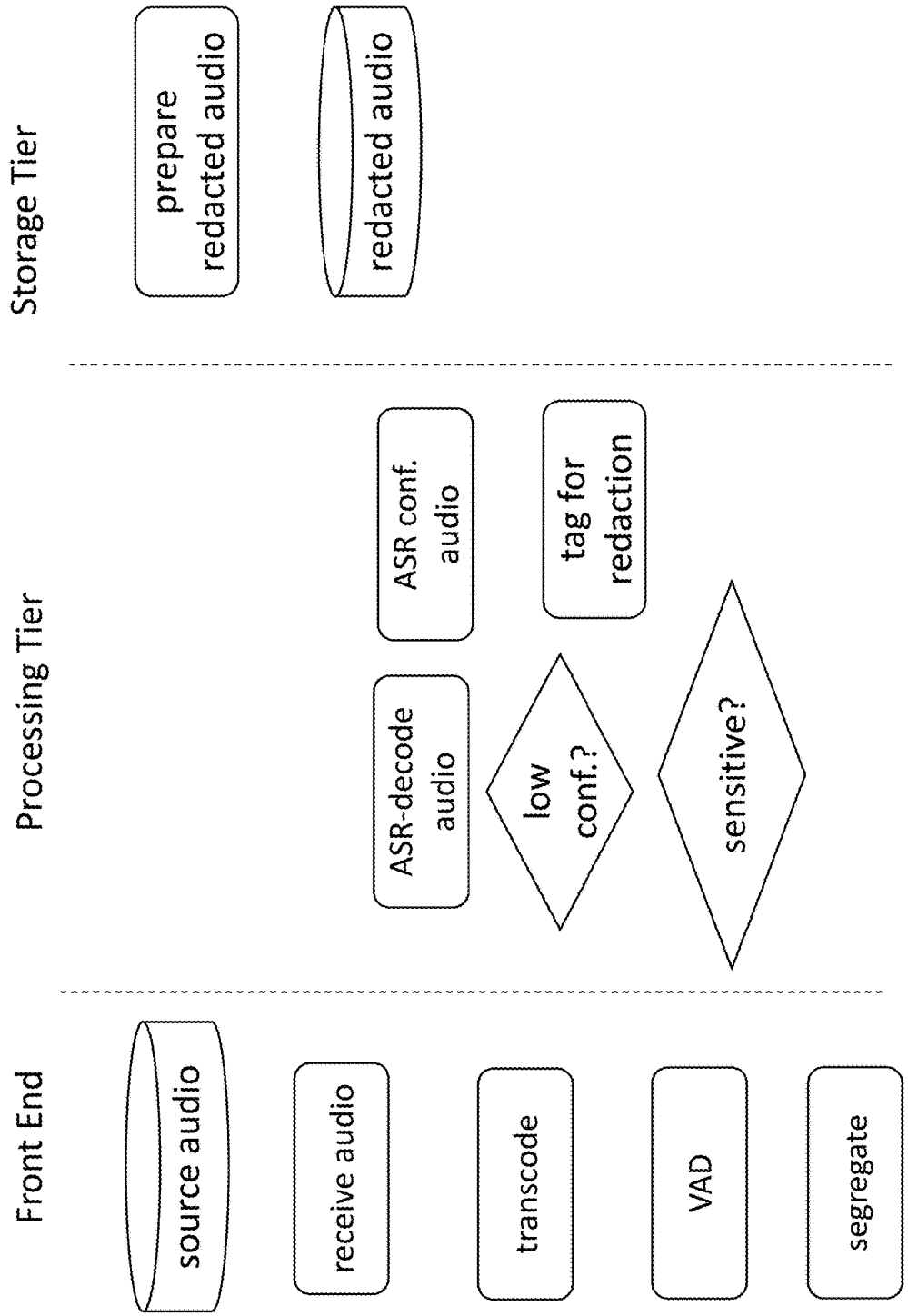
FIG. 51 depicts a third exemplary assignment of the enhanced redaction flow elements between the Front End, Processing, and Storage Tiers, in accordance with certain exemplary embodiments herein.
Figure 52:
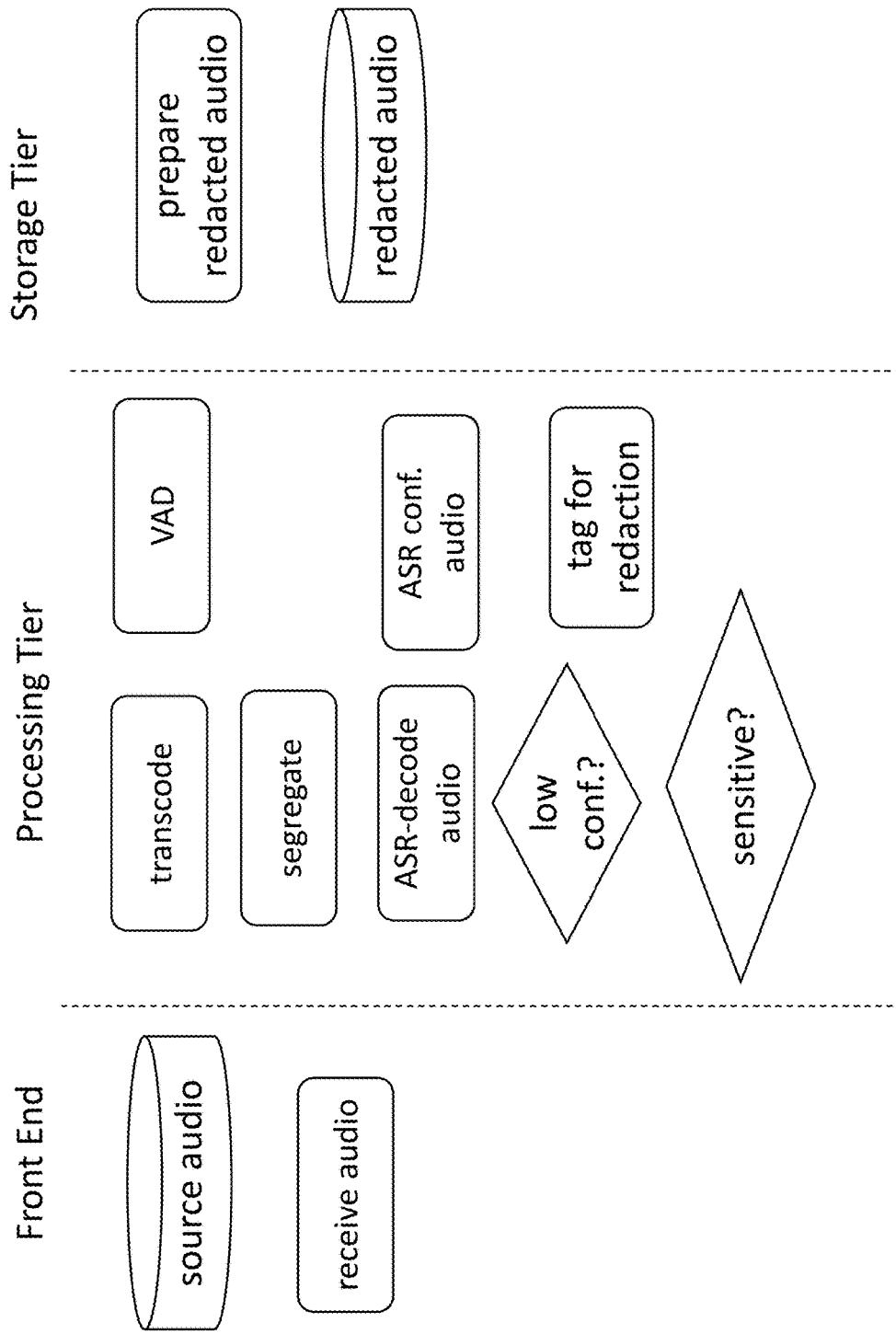
FIG. 52 depicts a fourth exemplary assignment of the enhanced redaction flow elements between the Front End, Processing, and Storage Tiers, in accordance with certain exemplary embodiments herein.
Figure 53:
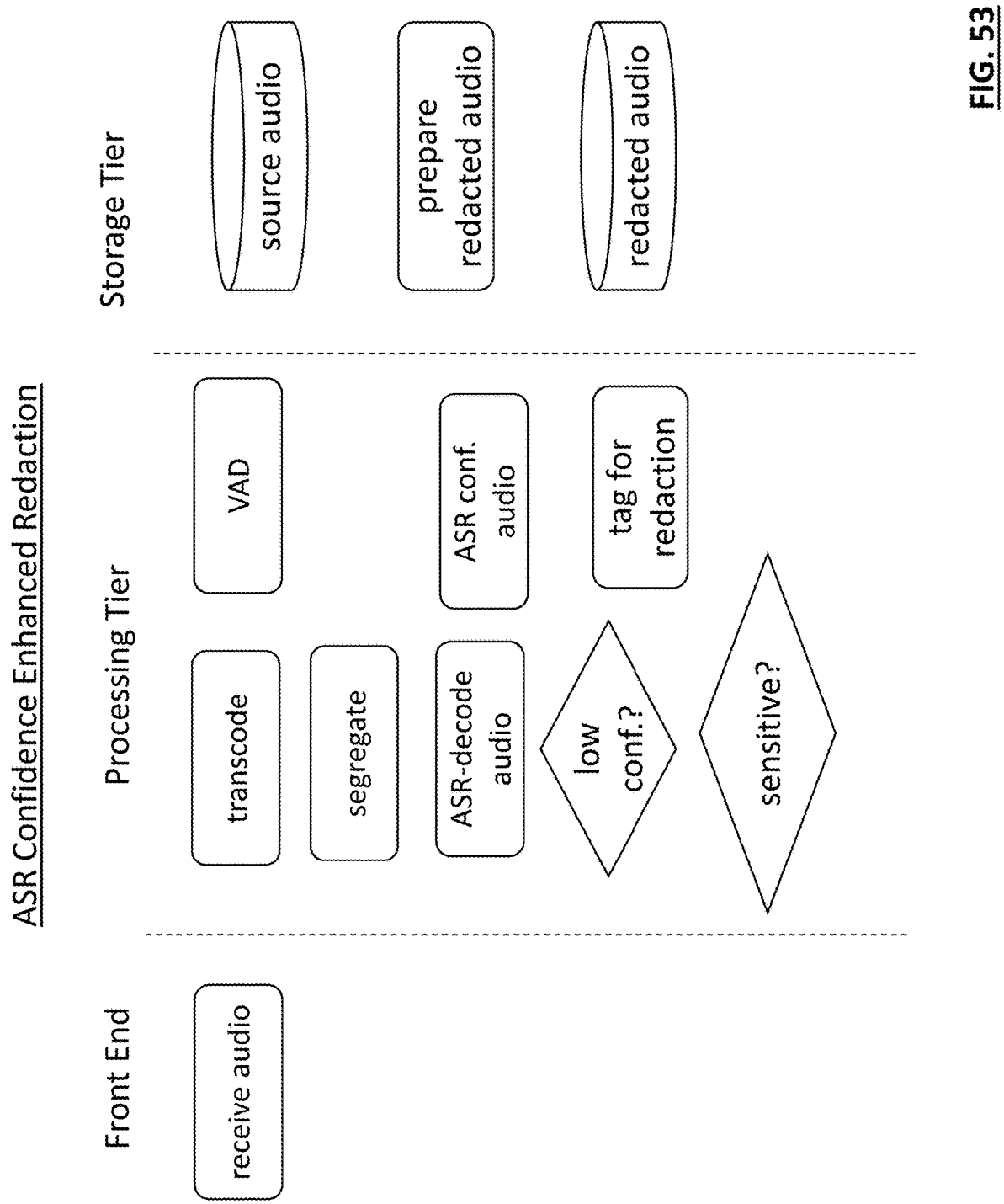
FIG. 53 depicts a fifth exemplary assignment of the enhanced redaction flow elements between the Front End, Processing, and Storage Tiers, in accordance with certain exemplary embodiments herein; and, FIG. 54 depicts a sixth exemplary assignment of the enhanced redaction flow elements between the Front End, Processing, and Storage Tiers, in accordance with certain exemplary embodiments herein.
Figure 54:
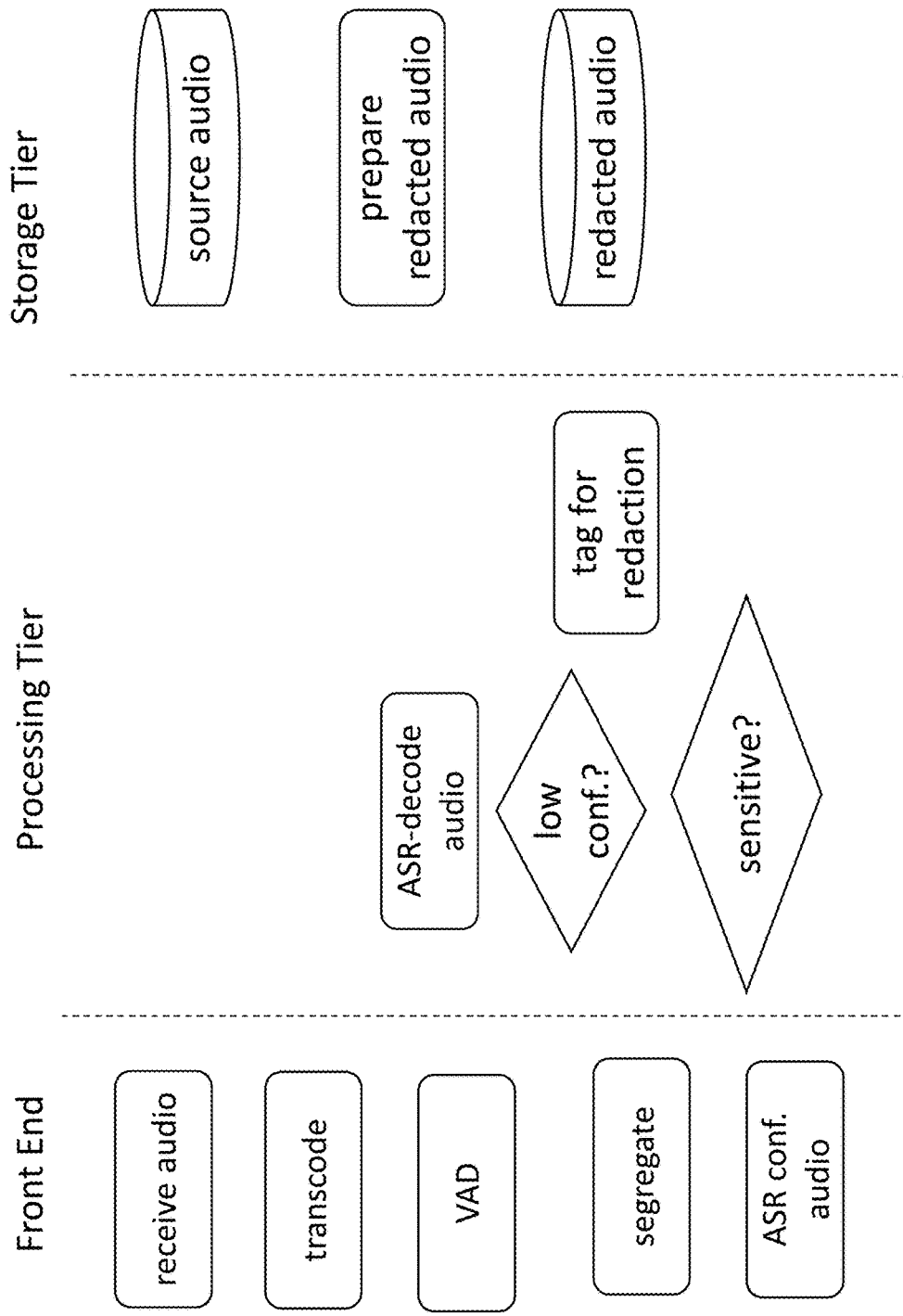

Referring now to FIGS. 46-48, which depict exemplary flow diagrams for improved automatic redaction flows that employ ASR confidence to avoid or minimize the effect of poor recognition on redaction completeness, additional detail regarding the depicted elements is as follows:

Receive audio: Audio may be received or obtained from any source, whether a "live" feed (such as CTI, VOIP tap, PBX) or a recorded source (such as on-prem storage, cloud storage, or a combination thereof). Thus, the depicted Source Audio may be a disk, or a provisioned portion of a data processing cloud (configured as a cloud PBX), for example.

Transcode: Audio transcoding is the direct digital-to-digital conversion of one audio encoding format to another (e.g., MP3 to WAV). This is an optional step. Typically, all audio is transcoded to a single, least-compressed format (such as WAV) prior to ingestion into an ASR engine. Numerous audio transcoders are available free of charge. See https://en.wikipedia.org/wiki/List_of_audio_conversion_software (incorporated by reference herein).

VAD: Voice activity detection is another optional step. Its main function is to eliminate dead space, to improve utilization efficiency of more compute-intensive resources, such as the ASR engine, or of storage resources. VAD algorithms are well known in the art. See https://en.wikipedia.org/wiki/Voice_activity_detection (incorporated by reference herein).

Segregate: Segregation of the speech input into words or utterances (preferred) is performed as an initial step to ASR decoding. Though depicted as a distinct step, it may be performed as part of the VAD or ASR processes.

Confidence: Confidence may be determined either by the ASR engine (as per FIG. 46) or using a separate confidence classifier (as per FIGS. 47 and 48). As shown in FIG. 47, the confidence classifier may operate from the same input stream as the ASR, or may utilize both the input and output of the ASR in its computation, as per FIG. 48.

Sensitive Information: Identifying sensitive information may utilize simple text queries (such as simple number searches) or more sophisticated NLP and/or language classification techniques. As previously discussed, numerous techniques are known and available for identifying redaction targets in unstructured text.

Low ASR confidence: If ASR confidence dips below a "threshold" value, then a word, phrase, or utterance that would ordinarily be passed unredacted will nevertheless be flagged for redaction. In some embodiments, the "threshold" is preset; whereas in other embodiments, it may vary dynamically, based for example on the moving average of confidence values being seen by the redaction module.

Prepare redacted audio: This process involves removing (or masking with noise or voice-over token, e.g., "name", "health condition") those portions of the source audio that have been flagged for redaction. Preparing redacted audio preferably involves the creating of a structured data record (e.g., FIG. 44) that would include associated meta-data, as well as unredacted records encoded with appropriate levels of encryption. In some embodiments, additional processing of the source audio may be employed to eliminate all personally identifiable characteristics by, for example, using voice de-identification processing and/or accent normalization, as previously discussed.

Redacted audio: The redacted audio may be stored in any means of permanent or temporary data storage (e.g., disk or cloud), or may be immediately passed on for ingestion into an analytics or real-time alerting system.

FIGS. 49-54 depict how these functions/modules can be assigned amongst the Front End, Processing Tier, and Storage Tier, in accordance with the invention herein. These, however, are merely illustrative, and not meant to be in any way limiting. Furthermore, FIGS. 2-28 illustrate how the Front End, Processing Tier, and Storage Tier functions may be provisioned in cloud(s), on premises, or in embodiments that bridge the on-prem/cloud boundary with secure data links.

The invention claimed is:

1. A computer-implemented process for automatically removing sensitive information from an audio recording, comprising at least the following computer-implemented acts:
   (1) receiving a digitally encoded audio recording;
   (2) transcoding, if necessary, the audio recording to a pre-defined audio format;
   (3) using a voice activity detector to identify periods of voice activity and/or inactivity in the audio recording;
   (4) using an utterance or word separator to segregate the audio recording into a sequence of separated audio utterances or words;
   (5) streaming the sequence of separated utterances or words to an automatic speech recognition (ASR) server;
   (6) using the ASR server to recognize the audio utterances or words and, for each audio utterance or word, generate (i) an associated ASR decoding and (ii) an ASR confidence score related to confidence in the associated ASR decoding;
   (7) for each audio utterance or word, receiving, from the ASR server, the associated ASR decoding, and the associated ASR confidence score generated by the ASR server;
   (8) automatically identifying for redaction a first audio utterance or word if the associated ASR decoding for the first utterance or word includes sensitive information;
   (9) automatically identifying for redaction a second audio utterance or word if the associated ASR confidence score for the second utterance or word is less than a redaction threshold;
   (10) preparing a redacted audio recording by eliminating or masking the first audio utterance or word in response to identification of the first audio utterance or word for redaction and further by eliminating or masking the second audio utterance or word in response to identification of the second audio utterance or word for redaction;
   (11) preparing an encrypted unredacted audio recording that includes the first audio utterance or word and/or the second utterance or word that were eliminated or masked from the redacted audio recording; and
   (12) storing the redacted audio recording and the encrypted unredacted audio recording in a memory component.

2. A process, as defined in claim 1, wherein the ASR confidence scores are derived from normalized likelihood scores.

3. A process, as defined in claim 1, wherein the ASR confidence scores are computed using an N-best homogeneity analysis.

4. A process, as defined in claim 1, wherein the ASR confidence scores are computed using an acoustic stability analysis.

5. A process, as defined in claim 1, wherein the ASR confidence scores are computed using a word graph hypothesis density analysis.

6. A process, as defined in claim 1, wherein the ASR confidence scores are derived from associated state, phoneme, or word durations.

7. A process, as defined in claim 1, wherein the ASR confidence scores are derived from language model (LM) scores or LM back-off behaviors.

8. A process, as defined in claim 1, wherein the ASR confidence scores are computed using a posterior probability analysis.

9. A process, as defined in claim 1, wherein the ASR confidence scores are computed using a log-likelihood-ratio analysis.

10. A process, as defined in claim 1, wherein the ASR confidence scores are computed using a neural net that includes word identity and aggregated words as predictors.

11. A process, as defined in claim 1 further comprising identifying associated ASR decoding contains sensitive information by determining whether the ASR decoding includes Personally Identifiable Information (PII).

12. A process, as defined in claim 1 further comprising identifying associated ASR decoding contains sensitive information by determining whether the ASR decoding contains Nonpublic Personal information (NPI).

13. A process, as defined in claim 1 further comprising identifying associated ASR decoding contains sensitive information by determining whether the ASR decoding contains Personal Health Information (PHI).

14. A process, as defined in claim 1 further comprising identifying associated ASR decoding contains sensitive information by determining whether the ASR decoding contains Sensitive Personal Information (SPI).

15. A process, as defined in claim 1 further comprising identifying associated ASR decoding contains sensitive information by determining whether the ASR decoding contains Personal Credit Information (PCI).

16. A process, as defined in claim 1 further comprising identifying associated ASR decoding contains sensitive information using a redaction strictness factor that, depending upon its setting, affects the likelihood of a given ASR decoding being identified as containing sensitive information.

17. A process, as defined in claim 1, wherein the eliminating or the masking includes retaining an encrypted version of the eliminated word(s)/utterance(s).

18. A process, as defined in claim 1, wherein preparing a redacted audio recording further includes de-identifying the voices of speak(s) in the redacted audio recording.

19. A process, as defined in claim 1 further comprising normalizing accent associated with the audio recording.

20. A process, as defined in claim 1, wherein the redacted audio recording is a structured data that includes metadata associated therewith.

21. A process, as defined in claim 1 further comprising de-identifying the redacted audio recording.

* * * * *